United States Patent
Hu et al.

(10) Patent No.: US 12,540,138 B2
(45) Date of Patent: Feb. 3, 2026

(54) SUBSTITUTED OXASPIRO[4.5]DECANES AS MOR RECEPTOR AGONISTS

(71) Applicants: SHANGHAI HAIYAN PHARMACEUTICAL TECHNOLOGY CO., LTD., Shanghai (CN); YANGTZE RIVER PHARMACEUTICAL GROUP CO., LTD., Jiangsu (CN)

(72) Inventors: Bin Hu, Shanghai (CN); Kai Zhang, Shanghai (CN); Huiping Guan, Shanghai (CN)

(73) Assignees: SHANGHAI HAIYAN PHARMACEUTICAL TECHNOLOGY CO., LTD., Shanghai (CN); YANGTZE RIVER PHARMACEUTICAL GROUP CO., LTD., Jiangsu (CN)

( * ) Notice: Subject to any disclaimer, the term of this patent is extended or adjusted under 35 U.S.C. 154(b) by 770 days.

(21) Appl. No.: 17/758,899

(22) PCT Filed: Jan. 15, 2021

(86) PCT No.: PCT/CN2021/072018
§ 371 (c)(1),
(2) Date: Jul. 15, 2022

(87) PCT Pub. No.: WO2021/143803
PCT Pub. Date: Jul. 22, 2021

(65) Prior Publication Data
US 2023/0147833 A1 May 11, 2023

(30) Foreign Application Priority Data

Jan. 17, 2020 (CN) .......................... 202010052007.3
Dec. 9, 2020 (CN) .......................... 202011432101.8

(51) Int. Cl.
*A61K 31/352* (2006.01)
*C07D 311/96* (2006.01)
*C07D 487/04* (2006.01)

(52) U.S. Cl.
CPC ................. *C07D 487/04* (2013.01)

(58) Field of Classification Search
CPC .......................... A61K 31/352; C07D 311/96
USPC ......................................... 514/456; 549/396
See application file for complete search history.

(56) References Cited

U.S. PATENT DOCUMENTS

2019/0343819 A1  11/2019  Yamashita et al.

FOREIGN PATENT DOCUMENTS

| CA | 3164581 A1 * | 7/2021 | ............. A61P 29/00 |
|---|---|---|---|
| CN | 106588899 | 4/2017 | |
| CN | 108366997 | 8/2018 | |
| CN | 109516982 | 3/2019 | |
| CN | 111662284 A | 9/2020 | |
| EA | 025456 | 12/2016 | |
| JP | 2014508811 A | 4/2014 | |
| JP | 2018534257 A | 11/2018 | |
| JP | 2019503351 A | 2/2019 | |
| JP | 2019504113 A | 2/2019 | |
| JP | 2023510622 A | 3/2023 | |
| RU | 2459806 | 8/2012 | |
| WO | 2012129495 | 9/2012 | |
| WO | 2017063509 | 4/2017 | |
| WO | 2017106306 | 6/2017 | |
| WO | 2017106547 | 6/2017 | |
| WO | 2018188641 | 10/2018 | |
| WO | 2019205983 | 10/2019 | |

OTHER PUBLICATIONS

Jordan, V. C. Nature Reviews: Drug Discovery, 2, 2003, 205.*
Vippagunta, et al. Advanced Drug Delivery Reviews, 48, 2001, 18.*
(Continued)

*Primary Examiner* — Douglas M Willis
(74) *Attorney, Agent, or Firm* — Hodgson Russ LLP

(57) ABSTRACT

Disclosed are an optically pure oxaspiro-substituted pyrrolopyrazole derivative, a preparation method therefor and the pharmaceutical use thereof. The compounds are compounds as shown in formula (I) and formula (II) or a pharmaceutically acceptable salt thereof, or a solvate thereof, or a prodrug thereof. Also disclosed are a preparation method therefor and the use thereof.

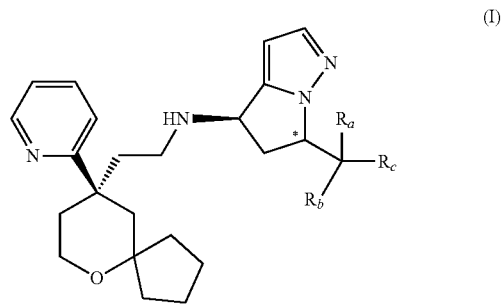

(I)

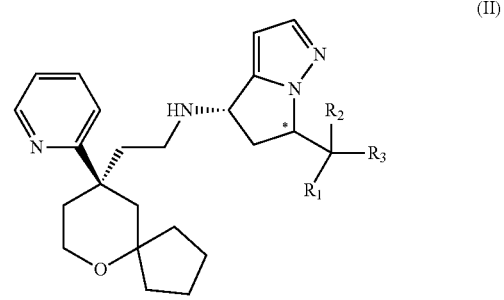

(II)

22 Claims, 2 Drawing Sheets

(56) References Cited

OTHER PUBLICATIONS

Wolff, Manfred E., Ed. Burger's Medicinal Chemistry and Drug Discovery—Fifth Edition, vol. 1: Principles and Practice, New York: John Wiley & Sons, 1994, 975-977.*
FSIP, Office Action for RU Application No. 2022121885/04(046509), Feb. 22, 2023.
CNIPA, First Office Action for CN Application No. 202180001786.7, Mar. 11, 2023.
JPO, Office Action for JP Application No. 2022-543554, Dec. 26, 2023.
CNIPA, Second Office Action for CN Application No. 202180001786.7, Sep. 21, 2023.
ISDEC, Office Action for CA Application No. 3164581, Aug. 30, 2023.
IPA, Office Action for AU Application No. 2021207143, Mar. 22, 2023.
FSIP, Office Action for RU Application No. 2022121885.04, Jul. 3, 2023.
JPO, Office Action for JP Application No. 2022-543554, Aug. 22, 2023.
Larsen, "Novel Parham-type Cycloacylations of 1H-Pyrazole-1-alkanoic Acids," Synlett, Aug. 1997.
WIPO, International Search Report for PCT/CN2021/072018, Mar. 26, 2021.
CNIPA, Notification to Grant Patent Right for Invention for CN Application No. 202180001786.7, Jan. 31, 2024.
IPA, Notice of Grant for AU Patent No. 2021207143, Mar. 28, 2024.
EPO, Communication for EP Application No. 21740741.0, Feb. 20, 2024.

* cited by examiner

SUBSTITUTED OXASPIRO[4.5]DECANES AS MOR RECEPTOR AGONISTS

CROSS-REFERENCE TO RELATED APPLICATIONS

This application is a U.S. national stage entry of International Application No. PCT/CN2021/072018, filed Jan. 15, 2021, which claims priority to Chinese Application No. 202010052007.3, filed Jan. 17, 2020, and Chinese Application No. 202011432101.8, filed Dec. 9, 2020, the entire disclosures of which are incorporated herein by reference.

TECHNICAL FIELD

The present disclosure relates to a class of optically pure oxaspiro-substituted pyrrolopyrazole derivatives, preparation methods thereof, pharmaceutical compositions containing the derivatives, use thereof as therapeutic agents, particularly as MOR receptor agonists, and use thereof in the preparation of drugs for treating and preventing pain and pain-associated diseases.

BACKGROUND

Opioid receptors are an important class of G protein-coupled receptors (GPCRs), to which endogenous opioid peptides and opioid drugs bind. Endogenous opioid peptides are opioid-like active substances that are naturally produced in mammals, and the known endogenous opioid peptides are broadly classified into enkephalins, endorphins, dynorphins, and neoendorphins. Corresponding opioid receptors, namely μ (MOR) receptor, δ (DOR) receptor, κ (KOR) receptor, and the like, are present in the central nervous system. Studies have found that an analgesic effect of endogenous opioid peptides mainly depends on the expression level of opioid receptors, the targets on which analgesic effects of opioid drugs as well as endogenous opioid peptides act.

Current studies suggest that GPCRs mediate and regulate physiological functions mainly through two pathways: the G protein pathway and the β-arrestin pathway. After a conventional GPCR agonist binds to a receptor, the G protein signaling pathway, which includes second-messenger systems such as calcium ions, adenyl cyclase (AC), and mitogen-activated protein kinases (MAPK), is activated, while a β-arrestin-biased ligand mainly activates the β-arrestin pathway. When mediating GPCR responses, β-arrestin mainly functions as follows: 1) as a negative regulator, it acts with G protein-coupled receptor kinase (GRK) to desensitize GPCRs and stop G protein signal transduction; 2) as a scaffold protein, it recruits endocytic proteins and induces endocytosis of GPCRs; and 3) as an adapter protein, it forms a complex with downstream signaling molecules of GPCRs to activate signal transduction molecules, such as MAPK, Src protein tyrosine kinase, and Akt, in a G protein-independent manner. The differences in ligand-stimulated G protein signaling and/or β-arrestin signaling ultimately determine the ligand-specific cell biological effects of GPCRs.

MOR is an effect target of endogenous enkephalins and opioid analgesics such as morphine. Early studies have shown that endogenous enkephalins and opioid drugs such as etorphine can activate G proteins and trigger endocytosis of receptors, but morphine does not trigger endocytosis of receptors at all because morphine is too weak to agonize the phosphorylation of MOR and can only recruit a trace amount of β-arrestin to the cell membrane (Zhang et al., Proc Natl Acad Sci USA, 1998, 95(12): 7157-7162). Such ligands exert their physiological functions exclusively through the G protein signaling pathway rather than the β-arrestin pathway. Studies have found that an analgesic effect under the mediation of G-protein signaling is stronger and maintained for a longer time after injection of morphine into β-arrestin 2 knockout mice (Bohn et al., Science, 1999). It can be anticipated that if such ligands are much negatively β-arrestin-biased and can even escape from β-arrestin-mediated receptor desensitization, the ligands can lead to prolonged G-protein signaling and more potent analgesic effects.

Currently, MOR agonists have been disclosed in patent applications WO2017106547, WO2017063509, WO2012129495, WO2017106306, etc.

Long-term use of opioid drugs produces tolerance as well as side effects such as respiratory depression and constipation, which have been shown to be closely related to the functions of β-arrestin. To reduce the side effects of opioid drugs, drugs can be designed on the basis of the negatively β-arrestin-biased ligands of MOR so as to reduce β-arrestin-mediated side effects and enhance therapeutic effects.

SUMMARY

An objective of the present disclosure is to provide a compound with a novel structure, which can be used as an MOR receptor agonist.

In a first aspect, the present disclosure provides a compound as shown in Formula (I), or a pharmaceutically acceptable salt, solvate, or prodrug thereof:

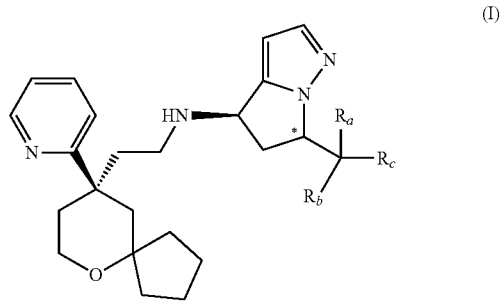

(I)

wherein, $R_a$ and $R_b$ are each independently hydrogen, halogen (preferably F or Cl), $C_{1-6}$ alkyl (preferably $C_{1-3}$ alkyl), halogenated $C_{1-6}$ alkyl (preferably halogenated $C_{1-3}$ alkyl), or halogenated $C_{1-6}$ alkoxyl (preferably halogenated $C_{1-3}$ alkoxyl); or $R_a$ and $R_b$ together with the carbon atom linked thereto form a four- to six-membered saturated monoheterocyclic ring or a three- to six-membered saturated monocyclic ring, in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO($C_{1-3}$ alkyl), —NHCONR$_{a1}$R$_{b1}$, —NHSO$_2$($C_{1-3}$ alkyl), —NHSO$_2$NR$_{a1}$R$_{b1}$, and —NHSO$_2$($C_{3-6}$ cycloalkyl);

$R_c$ is hydrogen, halogen (preferably F or Cl), $C_{1-6}$ alkyl (preferably $C_{1-3}$ alkyl), $C_{2-6}$ alkenyl (preferably $C_{2-4}$ alkenyl), $C_{2-6}$ alkynyl (preferably $C_{2-4}$ alkynyl), $C_{1-6}$ alkoxyl (preferably $C_{1-3}$ alkoxyl), halogenated $C_{1-6}$ alkyl (preferably halogenated $C_{1-3}$ alkyl), halogenated $C_{1-6}$ alkoxyl (preferably halogenated $C_{1-3}$ alkoxyl), —CO($C_{1-6}$ alkyl) (preferably —CO($C_{1-3}$ alkyl)), —CONR$_{a1}$R$_{b1}$, NR$_{a1}$R$_{b1}$, —NHCO($C_{1-6}$ alkyl) (preferably —NHCO($C_{1-3}$ alkyl)), —NHCONR$_{a1}$R$_{b1}$, —NHSO$_2$($C_{1-3}$ alkyl), —NHSO$_2$NR$_{a1}$R$_{b1}$, —NHSO$_2$ ($C_{3-6}$ cycloalkyl), —SO$_2$($C_{1-3}$ alkyl), —SO$_2$NR$_{a1}$R$_{b1}$, a four- to six-membered saturated monoheterocyclic ring, $C_{6-10}$ aryl, or a five- or six-membered monocyclic heteroaryl, in which the four- to six-membered saturated monoheterocyclic ring, the $C_{6-10}$ aryl, and the five- or six-membered monocyclic heteroaryl are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO($C_{1-3}$ alkyl), —NHCONR$_{a1}$R$_{b1}$, —NHSO$_2$($C_{1-3}$ alkyl), —NHSO$_2$NR$_{a1}$R$_{b1}$, and —NHSO$_2$($C_{3-6}$ cycloalkyl);

R$_{a1}$ and R$_{b1}$ are each independently hydrogen, $C_{1-6}$ alkyl (preferably $C_{1-3}$ alkyl), halogenated $C_{1-6}$ alkyl (preferably halogenated $C_{1-3}$ alkyl), $C_{3-6}$ cycloalkyl, or a four- to six-membered saturated monoheterocyclic ring; or R$_{a1}$ and R$_{b1}$ together with the nitrogen atom linked thereto form a four- to six-membered saturated monoheterocyclic ring, in which the four-to six-membered saturated monoheterocyclic ring is unsubstituted or substituted with one, two, or three $C_{1-3}$ alkyl groups; and \* indicates an R or S configuration.

In another preferred embodiment, the compound as shown in Formula (I) has a structure as shown in Formula (I-a) or Formula (I-b):

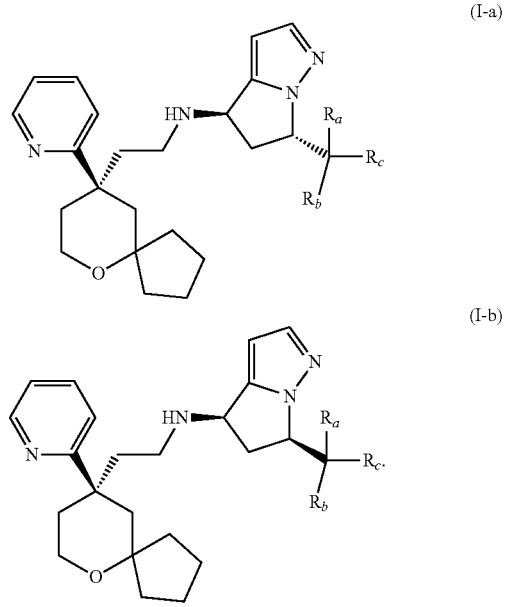

In another preferred embodiment, R$_a$ and R$_b$ together with the carbon atom linked thereto form a four- to six-membered saturated monoheterocyclic ring that is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, R$_a$ and R$_b$ together with the carbon atom linked thereto form a three- to six-membered saturated monocyclic ring that is selected from the group consisting of a cyclopropyl ring, a cyclobutyl ring, a cyclopentyl ring, and a cyclohexyl ring.

In another preferred embodiment, the five- or six-membered monocyclic heteroaryl related to R$_c$ is selected from thiophene, furan, thiazole, imidazole, oxazole, pyrrole, pyrazole, triazole, 1,2,3-triazole, 1,2,4-triazole, 1,2,5-triazole, 1,3,4-triazole, tetrazole, isoxazole, oxadiazole, 1,2,3-oxadiazole, 1,2,4-oxadiazole, 1,2,5-oxadiazole, 1,3,4-oxadiazole, thiadiazole, pyridine, pyridazine, pyrimidine, or pyrazine.

In another preferred embodiment, the four- to six-membered saturated monoheterocyclic ring related to R$_c$ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, the four- to six-membered saturated monoheterocyclic ring related to R$_{a1}$ and R$_{b1}$ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, the four- to six-membered saturated monoheterocyclic ring related to R$_{a1}$ and R$_{b1}$ is selected from the group consisting of azetidine, tetrahydropyrrole, piperidine, piperazine, morpholine, thiomorpholine, and thiomorpholine-1,1-dioxide.

In another preferred embodiment, R$_a$ and R$_b$ are each independently hydrogen, halogen, or $C_{1-3}$ alkyl; or it and R$_b$ together with the carbon atom linked thereto form a three-to six-membered saturated monocyclic ring.

In another preferred embodiment, it and R$_b$ are each independently hydrogen, fluorine, methyl, or ethyl.

In another preferred embodiment, it and R$_b$ together with the carbon atom linked thereto form a cyclopropyl ring, cyclobutyl ring, or cyclopentyl ring.

In another preferred embodiment, R$_c$ is hydrogen, halogen, $C_{1-3}$ alkyl, $C_{1-3}$ alkoxyl, or halogenated $C_{1-3}$ alkyl.

In another preferred embodiment, R$_c$ is hydrogen, fluorine, methyl, ethyl, methoxy, or trifluoromethyl.

In another preferred embodiment, it and R$_b$ are each independently hydrogen, fluorine, or methyl; and R$_c$ is hydrogen, fluorine, methyl, ethyl, methoxy, or trifluoromethyl.

In another preferred embodiment, it and R$_b$ are each methyl; and R$_c$ is hydrogen, fluorine, methyl, ethyl, methoxy, or trifluoromethyl.

In another preferred embodiment, it and R$_b$ are fluorine; and R$_c$ is hydrogen, fluorine, methyl, or ethyl.

In another preferred embodiment, R$_a$ and R$_b$ are each hydrogen; and R$_c$ is hydrogen, fluorine, methyl, ethyl, or trifluoromethyl.

In another preferred embodiment, R$_a$ is hydrogen; R$_b$ is methyl; and R$_c$ is methyl or ethyl.

In another preferred embodiment, R$_a$ and R$_b$ together with the carbon atom linked thereto form a cyclopropyl ring, a cyclobutyl ring, or a cyclopentyl ring; and R$_c$ is hydrogen, fluorine, methyl, ethyl, methoxy, or trifluoromethyl.

In a second aspect, the present disclosure provides a compound as shown in Formula (II), or a pharmaceutically acceptable salt, solvate, or prodrug thereof:

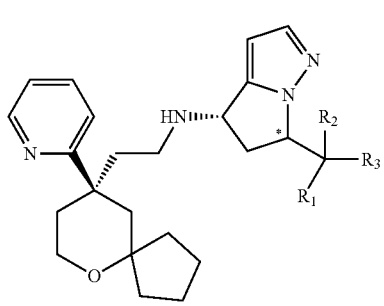

(II)

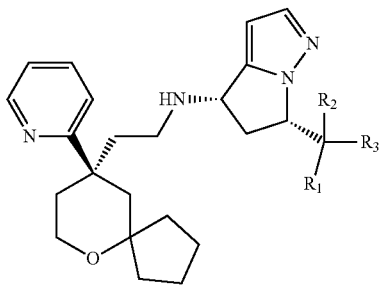

(II-a)

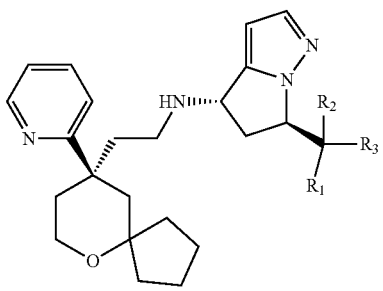

(II-b)

in which,

R₁ and R₂ are each independently hydrogen, halogen (preferably F or Cl), $C_{1-6}$ alkyl (preferably $C_{1-3}$ alkyl), halogenated $C_{1-6}$ alkyl (preferably halogenated $C_{1-3}$ alkyl), or halogenated $C_{1-6}$ alkoxyl (preferably halogenated $C_{1-3}$ alkoxyl); or R₁ and R₂ together with the carbon atom linked thereto form a four- to six-membered saturated monoheterocyclic ring or a three- to six-membered saturated monocyclic ring, in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR₁₁R₁₂, NR₁₁R₁₂, —NHCO($C_{1-3}$ alkyl), —NHCONR₁₁R₁₂, —NHSO₂($C_{1-3}$ alkyl), —NHSO₂NR₁₁R₁₂, and —NHSO₂($C_{3-6}$ cycloalkyl);

R₃ is hydrogen, halogen (preferably F or Cl), $C_{1-6}$ alkyl (preferably $C_{1-3}$ alkyl), $C_{2-6}$ alkenyl (preferably $C_{2-4}$ alkenyl), $C_{2-6}$ alkynyl (preferably $C_{2-4}$ alkynyl), $C_{1-6}$ alkoxyl (preferably $C_{1-3}$ alkoxyl), halogenated $C_{1-6}$ alkyl (preferably halogenated $C_{1-3}$ alkyl), halogenated $C_{1-6}$ alkoxyl (preferably halogenated $C_{1-3}$ alkoxyl), —CO($C_{1-6}$ alkyl) (preferably —CO($C_{1-3}$ alkyl)), —CONR₁₁R₁₂, NR₁₁R₁₂, —NHCO($C_{1-6}$ alkyl) (preferably —NHCO($C_{1-3}$ alkyl)), —NHCONR₁₁R₁₂, —NHSO₂($C_{1-3}$ alkyl), —NHSO₂NR₁₁R₁₂, —NHSO₂($C_{3-6}$ cycloalkyl), -502($C_{1-3}$ alkyl), —SO₂NR₁₁R₁₂, a four- to six-membered saturated monoheterocyclic ring, $C_{6-10}$ aryl, or a five- or six-membered monocyclic heteroaryl, and the four- to six-membered saturated monoheterocyclic ring, the $C_{6-10}$ aryl, in which the four- to six-membered saturated monoheterocyclic ring, the $C_{6-10}$ aryl, and the five- or six-membered monocyclic heteroaryl are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR₁₁R₁₂, NR₁₁R₁₂, —NHCO($C_{1-3}$ alkyl), —NHCONR₁₁R₁₂, —NHSO₂($C_{1-3}$ alkyl), —NHSO₂NR₁₁R₁₂, and —NHSO₂($C_{3-6}$ cycloalkyl);

R₁₁ and R₁₂ are each independently hydrogen, $C_{1-6}$ alkyl (preferably $C_{1-3}$ alkyl), halogenated $C_{1-6}$ alkyl (preferably halogenated $C_{1-3}$ alkyl), $C_{3-6}$ cycloalkyl, or a four- to six-membered saturated monoheterocyclic ring; or R₁₁ and R₁₂ together with the nitrogen atom linked thereto form a four- to six-membered saturated monoheterocyclic ring, in which the four-to six-membered saturated monoheterocyclic ring is unsubstituted or substituted with one, two, or three $C_{1-3}$ alkyl groups; and

* indicates an R or S configuration.

In another preferred embodiment, the compound as shown in Formula (II) has a structure as shown in Formula (II-a) or Formula (II-b):

In another preferred embodiment, R₁ and R₂ together with the carbon atom linked thereto form a four- to six-membered saturated monoheterocyclic ring that is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, R₁ and R₂ together with the carbon atom linked thereto form a three- to six-membered saturated monocyclic ring that is selected from the group consisting of a cyclopropyl ring, a cyclobutyl ring, a cyclopentyl ring, and a cyclohexyl ring.

In another preferred embodiment, the five- or six-membered monocyclic heteroaryl related to R₃ is selected from the group consisting of thiophene, furan, thiazole, imidazole, oxazole, pyrrole, pyrazole, triazole, 1,2,3-triazole, 1,2,4-triazole, 1,2,5-triazole, 1,3,4-triazole, tetrazole, isoxazole, oxadiazole, 1,2,3-oxadiazole, 1,2,4-oxadiazole, 1,2,5-oxadiazole, 1,3,4-oxadiazole, thiadiazole, pyridine, pyridazine, pyrimidine, and pyrazine.

In another preferred embodiment, the four- to six-membered saturated monoheterocyclic ring related to R₃ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, the four- to six-membered saturated monoheterocyclic ring related to R₁₁ and R₁₂ is selected from the group consisting of azetidine, oxetane, tetrahydrofuran, tetrahydrothiophene, tetrahydropyrrole, piperidine, piperazine, morpholine, thiomorpholine, thiomorpholine-1,1-dioxide, and tetrahydropyran.

In another preferred embodiment, R₁₁ and R₁₂ together with the nitrogen atom linked thereto form a four- to six-membered saturated monoheterocyclic ring that is selected from the group consisting of azetidine, tetrahydropyrrole, piperidine, piperazine, morpholine, thiomorpholine, and thiomorpholine-1,1-dioxide.

In another preferred embodiment, R₁ and R₂ are each independently hydrogen, halogen, or $C_{1-3}$ alkyl; or R₁ and R₂ together with the carbon atom linked thereto form a three-to six-membered saturated monocyclic ring.

In another preferred embodiment, R₁ and R₂ are each independently hydrogen, fluorine, methyl, or ethyl.

In another preferred embodiment, R₁ and R₂ together with the carbon atom linked thereto form a cyclopropyl ring, a cyclobutyl ring, or a cyclopentyl ring.

In another preferred embodiment, R₃ is hydrogen, halogen, $C_{1-3}$ alkyl, $C_{1-3}$ alkoxyl, or halogenated $C_{1-3}$ alkyl.

In another preferred embodiment, R₃ is hydrogen, fluorine, methyl, ethyl, methoxy, or trifluoromethyl.

In another preferred embodiment, R₁ and R₂ are each independently hydrogen, fluorine, or methyl; and R₃ is hydrogen, fluorine, methyl, ethyl, methoxy, or trifluoromethyl.

In another preferred embodiment, R₁ and R₂ are each methyl; and R₃ is hydrogen, fluorine, methyl, ethyl, methoxy, or trifluoromethyl.

In another preferred embodiment, R₁ and R₂ are each fluorine; and R₃ is hydrogen, fluorine, methyl, or ethyl.

In another preferred embodiment, R₁ and R₂ are each hydrogen; and R₃ is hydrogen, fluorine, methyl, ethyl, or trifluoromethyl.

In another preferred embodiment, R₁ is hydrogen; R₂ is methyl; and R₃ is methyl or ethyl.

In another preferred embodiment, R₁ and R₂ together with the carbon atom linked thereto form a cyclopropyl ring, a cyclobutyl ring, or a cyclopentyl ring; and R₃ is hydrogen, fluorine, methyl, ethyl, methoxy, or trifluoromethyl.

In another preferred embodiment, the four- to six-membered saturated monoheterocyclic ring is selected from the following structures:

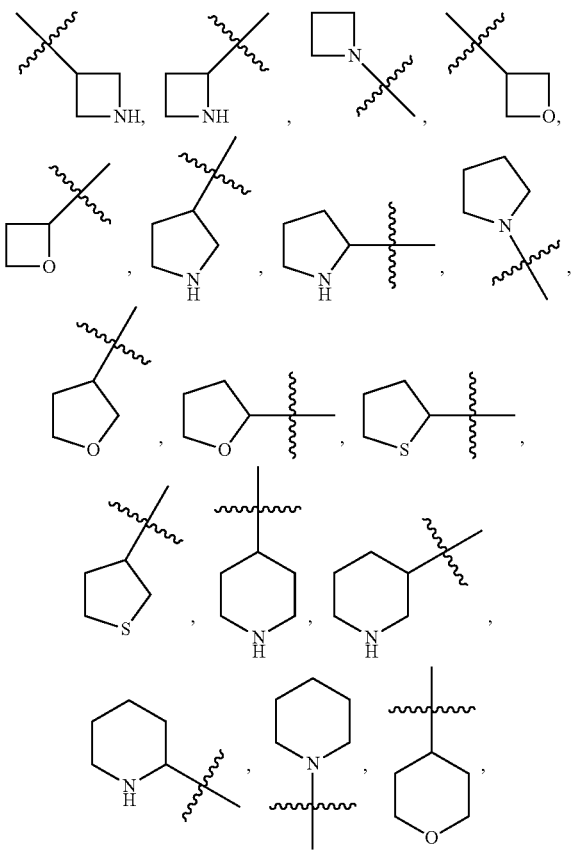

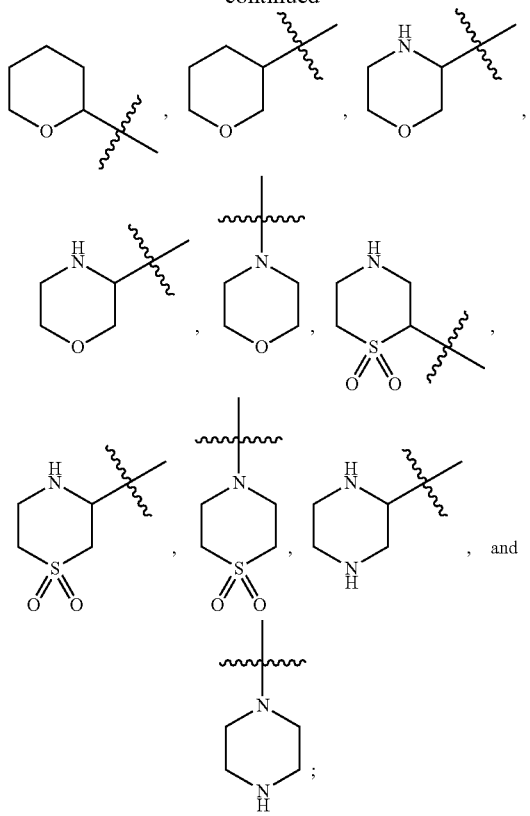

and hydrogen atoms on the four- to six-membered saturated monoheterocyclic ring are optionally substituted by one, two, or three substituent groups each independently selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO($C_{1-3}$ alkyl), —NHCONR$_{a1}$R$_{b1}$, —NHSO$_2$($C_{1-3}$ alkyl), —NHSO$_2$NR$_{a1}$R$_{b1}$, and —NHSO$_2$($C_{3-6}$ cycloalkyl).

In another preferred embodiment, the five- or six-membered monocyclic heteroaryl related to R$_c$ or R₃ is selected from the following structures:

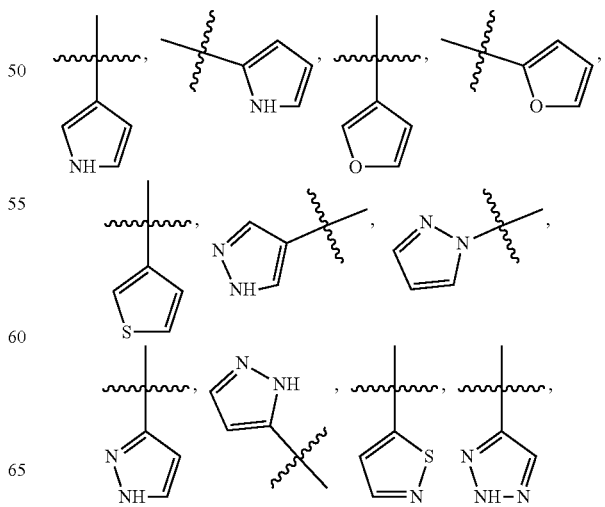

-continued

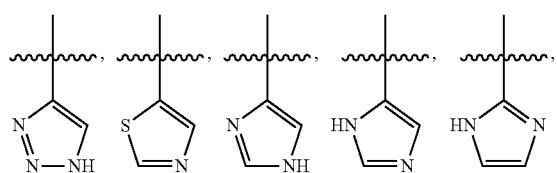

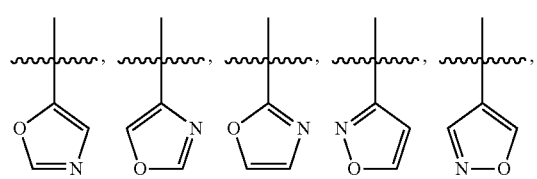

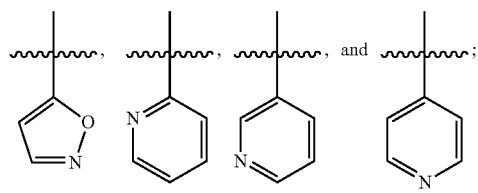

and the five- or six-membered monocyclic heteroaryl is optionally substituted with one, two, or three substituent groups each independently selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO($C_{1-3}$ alkyl), —NHCONR$_{a1}$R$_{b1}$, —NHSO$_2$($C_{1-3}$ alkyl), —NHSO$_2$NR$_{a1}$R$_{b1}$, and —NHSO$_2$($C_{3-6}$ cycloalkyl).

In another preferred embodiment, the compound is selected from the group consisting of:

H-1a

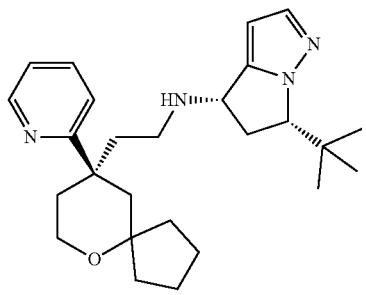

H-1b

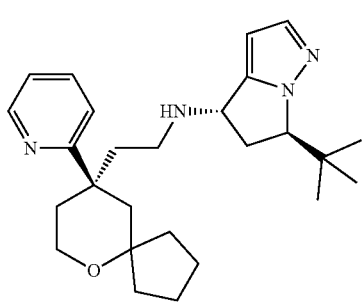

-continued

H-2a

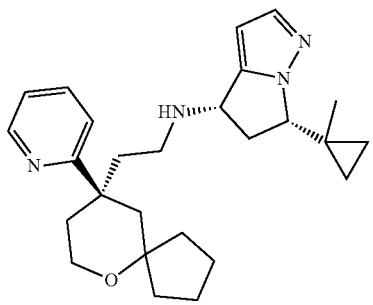

H-2b

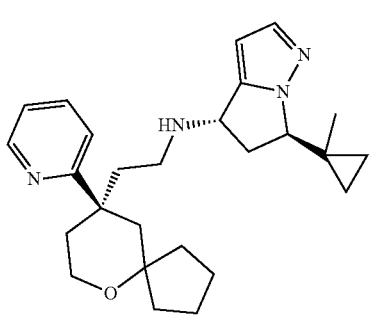

H-3a

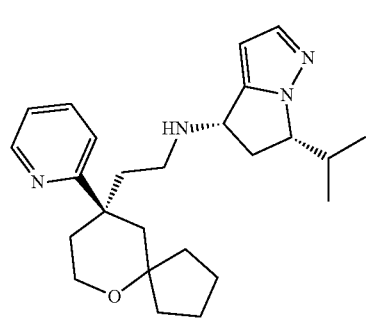

H-3b

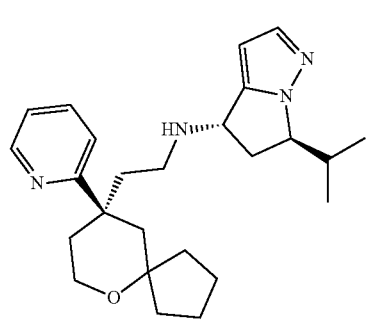

H-4a

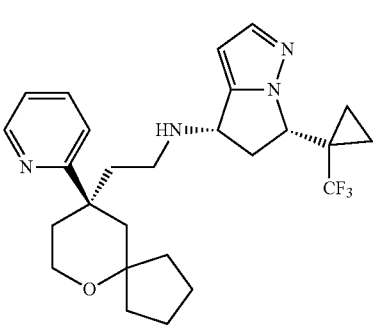

-continued

H-4b
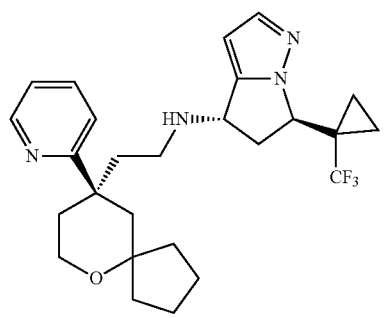

H-5a
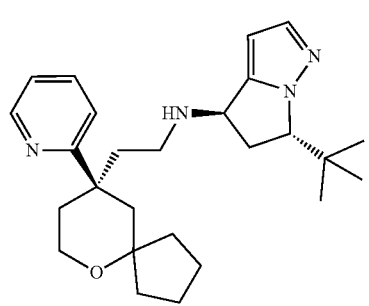

H-5b
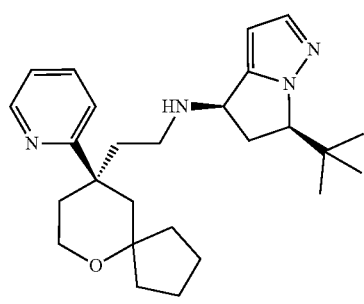

H-6a
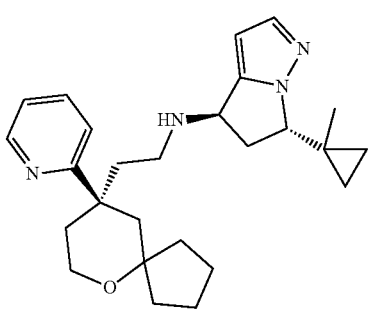

H-6b
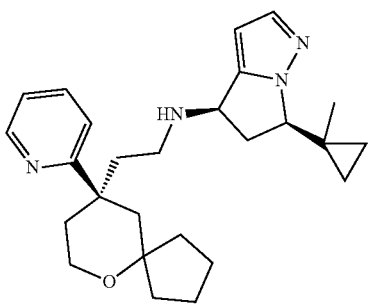

-continued

H-7a
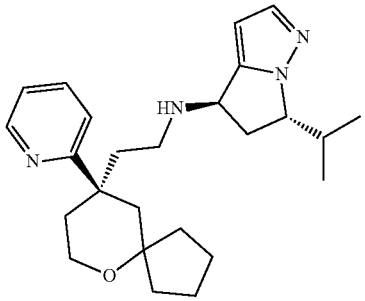

H-7b
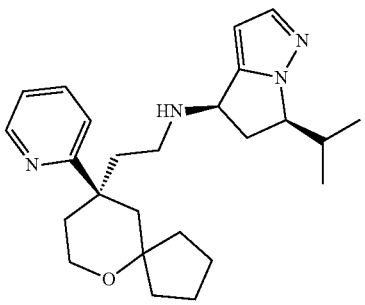

H-8a
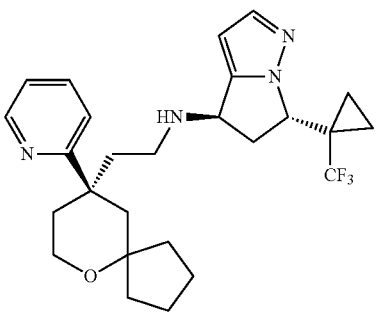

H-8b
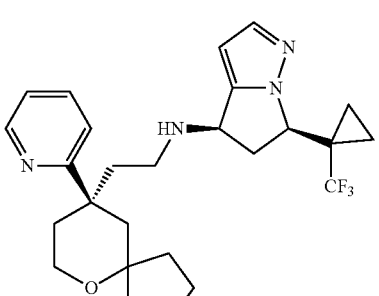

In a third aspect, the present disclosure provides a pharmaceutical composition, which includes the compound, or the pharmaceutically acceptable salt, solvate, or prodrug thereof according to the first or second aspect of the present disclosure; and a pharmaceutically acceptable carrier.

In a fourth aspect, the present disclosure provides use of the compound, or the pharmaceutically acceptable salt, solvate, or prodrug thereof according to the first or second aspect of the present disclosure, or the pharmaceutical composition according to the third aspect of the present disclosure in manufacture of a medicament for preventing and/or treating a MOR receptor agonist-mediated disease.

In a fifth aspect, the present disclosure provides use of the compound, or the pharmaceutically acceptable salt, solvate, or prodrug thereof according to the first or second aspect of the present disclosure, or the pharmaceutical composition according to the third aspect of the present disclosure in manufacture of a medicament for activating or antagonizing MOR receptors.

In a sixth aspect, the present disclosure provides use of the compound, or the pharmaceutically acceptable salt, solvate, or prodrug thereof according to the first or second aspect of the present disclosure, or the pharmaceutical composition according to the third aspect of the present disclosure in manufacture of a medicament for preventing and/or treating pain and a pain-associated disease.

In another preferred embodiment, the MOR receptor agonist-mediated disease is selected from the group consisting of pain, immune dysfunction, inflammation, esophageal reflux, neurological and psychiatric diseases, urological and reproductive diseases, cardiovascular diseases, and respiratory diseases, preferably pain.

In another preferred embodiment, the pain is selected from the group consisting of postoperative pain, pain caused by cancer, neuropathic pain, traumatic pain, and pain caused by inflammation.

In another preferred embodiment, the cancer is selected from the group consisting of breast cancer, endometrial cancer, cervical cancer, skin cancer, prostate cancer, ovarian cancer, fallopian tube tumor, ovarian tumor, hemophilia, and leukemia.

In a seventh aspect, the present disclosure provides a method for preventing and/or treating a MOR receptor agonist-mediated disease, which includes: administrating a therapeutically effective amount of the compound, or the pharmaceutically acceptable salt, solvate, or prodrug thereof according to the first or second aspect of the present disclosure, or the pharmaceutical composition according to the third aspect of the present disclosure to a patient in need thereof.

In an eighth aspect, the present disclosure provides a method for preventing and/or treating pain and a pain-associated disease, which includes: administrating a therapeutically effective amount of the compound, or the pharmaceutically acceptable salt, solvate, or prodrug thereof according to the first or second aspect of the present disclosure, or the pharmaceutical composition according to the third aspect of the present disclosure to a patient in need thereof.

In another preferred embodiment, the MOR receptor agonist-mediated disease is selected from the group consisting of pain, immune dysfunction, inflammation, esophageal reflux, neurological and psychiatric diseases, urological and reproductive diseases, and cardiovascular diseases, and respiratory diseases, preferably pain.

In another preferred embodiment, the pain is selected from the group consisting of postoperative pain, pain caused by cancer, neuropathic pain, traumatic pain, and pain caused by inflammation.

In another preferred embodiment, the cancer is selected from the group consisting of breast cancer, endometrial cancer, cervical cancer, skin cancer, prostate cancer, ovarian cancer, fallopian tube tumor, ovarian tumor, hemophilia, and leukemia.

In a ninth aspect, the present disclosure provides a preparation method for a compound as shown in Formula (I), which includes the following steps:
performing reductive amination on a compound 1b and a compound as shown in Formula (I-1) to obtain the compound as shown in Formula (I),

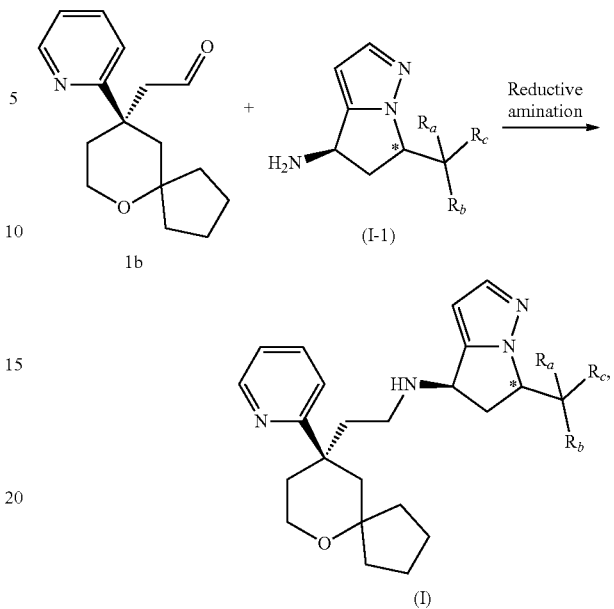

in which groups in each formula are as defined in the description.

In another preferred embodiments, the compound as shown in Formula (I-1) has a structure as shown in Formula (I-1a) or (I-1b):

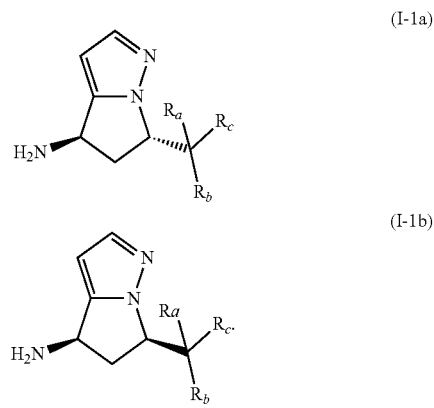

In another preferred embodiment, $R_a$ and $R_b$ are each independently hydrogen, fluorine, or methyl; or $R_a$ and $R_b$ together with the carbon atom linked thereto form a cyclopropyl ring, a cyclobutyl ring, or a cyclopentyl ring; and $R_c$ is hydrogen, fluorine, methyl, ethyl, methoxy, or trifluoromethyl.

In another preferred embodiment, the reductive amination is performed in a reductive system containing an inert solvent and a reducing agent.

In another preferred embodiment, the inert solvent is $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

In another preferred embodiment, the reducing agent is selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane.

In a tenth aspect, the present disclosure provides a preparation method of a compound as shown in Formula (II), which includes the following steps:

performing reductive amination on a compound 1b and a compound as shown in Formula (II-1) to obtain the compound as shown in Formula (II),

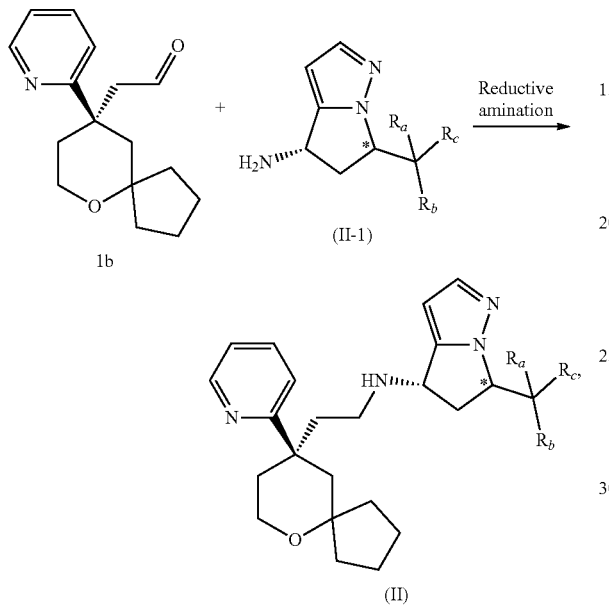

in which groups in each formula are as defined in the description.

In another preferred embodiment, the compound as shown in Formula (II-1) has a structure as shown in Formula (II-1a) or (II-1b):

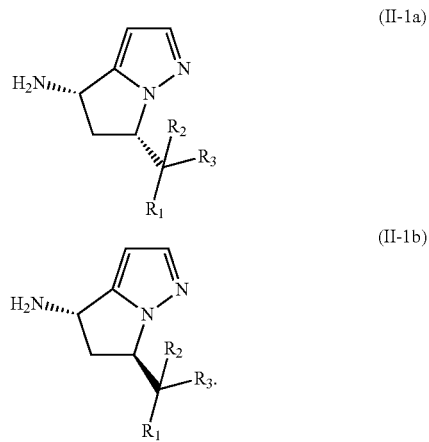

In another preferred embodiment, $R_1$ and $R_2$ are each independently hydrogen, fluorine, or methyl; or $R_1$ and $R_2$ together with the carbon atom linked thereto form a cyclopropyl ring, a cyclobutyl ring, or a cyclopentyl ring; and $R_3$ is hydrogen, fluorine, methyl, ethyl, methoxy, or trifluoromethyl.

In another preferred embodiment, the reductive amination is performed in a reaction system containing an inert solvent and a reducing agent.

In another preferred embodiment, the inert solvent is $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combinations thereof.

In another preferred embodiment, the reducing agent is selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane.

In an eleventh aspect, the present disclosure provides a compound as shown in Formula (III), or a salt, enantiomer, diastereomer, racemate, or mixture of diastereomers thereof:

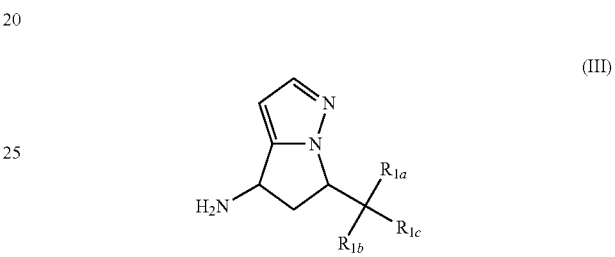

in which, $R_{1a}$ and $R_{1b}$ are each independently hydrogen, halogen (preferably F or Cl), $C_{1-6}$ alkyl (preferably $C_{1-3}$ alkyl), halogenated $C_{1-6}$ alkyl (preferably halogenated $C_{1-3}$ alkyl), or halogenated $C_{1-6}$ alkoxyl (preferably halogenated $C_{1-3}$ alkoxyl); or $R_{1a}$ and $R_{1b}$ together with the carbon atom linked thereto form a four- to six-membered saturated monoheterocyclic ring or a three- to six-membered saturated monocyclic ring, in which the four- to six-membered saturated monoheterocyclic ring and the three- to six-membered saturated monocyclic ring are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO($C_{1-3}$ alkyl), —NHCONR$_{a1}$R$_{b1}$, —NHSO$_2$($C_{1-3}$ alkyl), —NHSO$_2$NR$_{a1}$R$_{b1}$, and —NHSO$_2$($C_{3-6}$ cycloalkyl);

$R_{1c}$ is hydrogen, halogen (preferably F or Cl), $C_{1-6}$ alkyl (preferably $C_{1-3}$ alkyl), $C_{2-6}$ alkenyl (preferably $C_{2-4}$ alkenyl), $C_{2-6}$ alkynyl (preferably $C_{2-4}$ alkynyl), $C_{1-6}$ alkoxyl (preferably $C_{1-3}$ alkoxyl), halogenated $C_{1-6}$ alkyl (preferably halogenated $C_{1-3}$ alkyl), halogenated $C_{1-6}$ alkoxyl (preferably halogenated $C_{1-3}$ alkoxyl), —CO($C_{1-6}$ alkyl) (preferably —CO($C_{1-3}$ alkyl)), —CONR$_{a1}$R$_{b1}$, NR$_{a1}$R$_{b1}$, —NHCO ($C_{1-6}$ alkyl) (preferably —NHCO($C_{1-3}$ alkyl)), —NHCONR$_{a1}$R$_{b1}$, —NHSO$_2$($C_{1-3}$ alkyl), —NHSO$_2$NR$_{a1}$R$_{b1}$, —NHSO$_2$($C_{3-6}$ cycloalkyl), —SO$_2$($C_{1-3}$ alkyl), —SO$_2$NR$_{a1}$R$_{b1}$, a four- to six-membered saturated monoheterocyclic ring, $C_{6-10}$ aryl, or a five- or six-membered monocyclic heteroaryl, in which the four- to six-membered saturated monoheterocyclic ring, the $C_{6-10}$ aryl, and the five- or six-membered monocyclic heteroaryl are each unsubstituted or substituted with one, two, or three substituent groups selected from the group consisting of cyano, hydroxyl, hydroxymethyl, cyanomethyl, halogen, $C_{1-3}$ alkoxyl, $C_{1-3}$ alkyl, —CO($C_{1-3}$ alkyl), —CONR$_{a1}$R$_{b1}$, NR$_{a1}$R$_{b1}$, —NHCO(C$_{1-3}$ alkyl), —NHCONR$_{a1}$R$_{b1}$, —NHSO$_2$(C$_{1-3}$ alkyl), —NHSO$_2$NR$_{a1}$R$_{b1}$, and —NHSO$_2$(C$_{3-6}$ cycloalkyl); and R$_{a1}$ and R$_{b1}$ are each independently hydrogen, C$_{1-6}$ alkyl (preferably C$_{1-3}$ alkyl), halogenated C$_{1-6}$ alkyl (preferably halogenated C$_{1-3}$ alkyl), C$_{3-6}$ cycloalkyl, or a four- to six-membered saturated monoheterocyclic ring; or R$_{a1}$ and R$_{b1}$ together with the nitrogen atom linked thereto form a four- to six-membered saturated monoheterocyclic ring, in which the four-to six-membered saturated monoheterocyclic ring is unsubstituted or substituted with one, two, or three C$_{1-3}$ alkyl groups.

In some embodiments, R$_{1a}$ and R$_{1b}$ are each independently hydrogen, halogen, or C$_{1-3}$ alkyl; or R$_{1a}$ and R$_{1b}$ together with the carbon atom linked thereto form a three- to six-membered saturated monocyclic ring.

In some embodiments, R$_{1a}$ and R$_{1b}$ are each independently hydrogen, fluorine, methyl, or ethyl.

In some embodiments, R$_{1a}$ and R$_{1b}$ together with the carbon atom linked thereto form a cyclopropyl ring, a cyclobutyl ring, or a cyclopentyl ring.

In some embodiments, R$_{1c}$ is hydrogen, halogen, C$_{1-3}$ alkyl, C$_{1-3}$ alkoxyl, or halogenated C$_{1-3}$ alkyl.

In some embodiment, R$_{1c}$ is hydrogen, fluorine, methyl, ethyl, methoxy, or trifluoromethyl.

In some embodiment, R$_{1a}$ and R$_{1b}$ are each independently hydrogen, fluorine, or methyl; and R$_{1c}$ is hydrogen, fluorine, methyl, ethyl, methoxy, or trifluoromethyl.

In some embodiments, R$_{1a}$ and R$_{1b}$ are each methyl; and R$_{1c}$ is hydrogen, fluorine, methyl, ethyl, methoxy, or trifluoromethyl.

In some embodiments, R$_{1a}$ and R$_{1b}$ are each fluorine; and R$_{1c}$ is hydrogen, fluorine, methyl, or ethyl.

In some embodiment, R$_{1a}$ and R$_{1b}$ are each hydrogen; and R$_{1c}$ is hydrogen, fluorine, methyl, ethyl, or trifluoromethyl.

In some embodiments, R$_{1a}$ is hydrogen; R$_{1b}$ is methyl; and R$_{1c}$ is methyl or ethyl.

In some embodiments, R$_{1a}$ and R$_{1b}$ together with the carbon atom linked thereto form a cyclopropyl ring, a cyclobutyl ring, or a cyclopentyl ring; and R$_{1c}$ is hydrogen, fluorine, methyl, ethyl, methoxy, or trifluoromethyl.

In some embodiments, the compound as shown in Formula (III) has a structure as shown in Formula (I-1) or Formula (II-1):

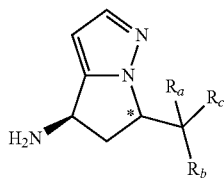

(I-1)

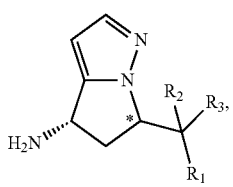

(II-1)

in which, R$_a$, R$_b$, and R$_c$ in Formula (I-1) are as defined in the compound as shown in Formula (I); R$_1$, R$_2$, and R$_3$ in Formula (II-1) are as defined in the compound as shown in Formula (II); and * represents a chiral carbon atom in an R or S configuration.

In some embodiments, the compound as shown in Formula (I-1) has a structure as shown in Formula (I-1a) or Formula (I-Tb); and the compound as shown in Formula (II-1) has a structure as shown in Formula (II-1a) or Formula (II-1b):

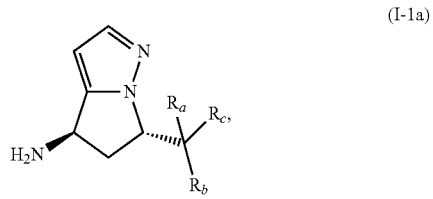

(I-1a)

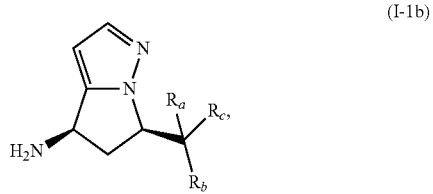

(I-1b)

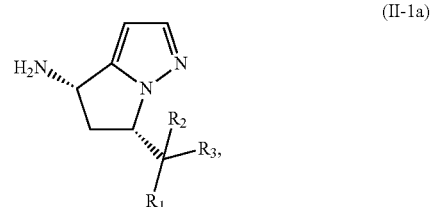

(II-1a)

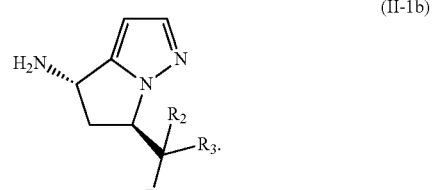

(II-1b)

In some embodiments, the compound as shown in Formula (I-1a) is selected from the following structures:

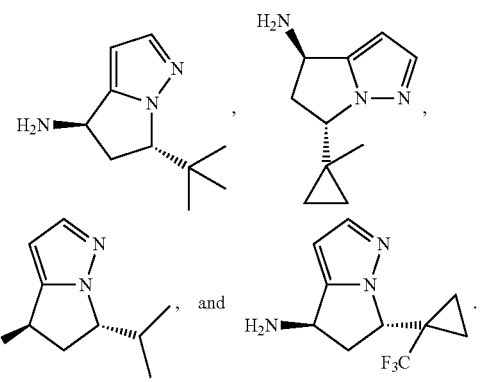

In some embodiments, the compound as shown in Formula (I-1b) is selected from the following structures:

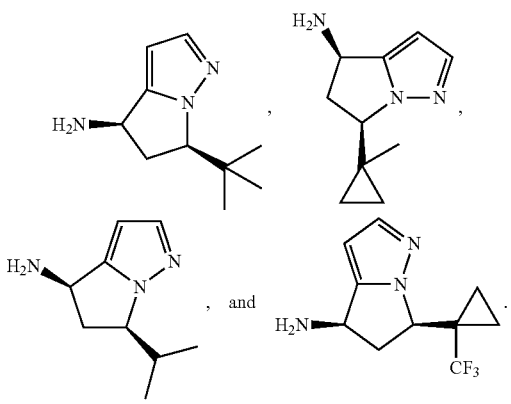

In some embodiments, the compound as shown in Formula (II-1a) is selected from the following structures:

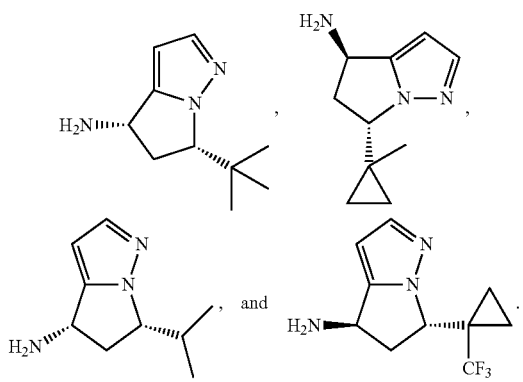

In some embodiments, the compound as shown in Formula (II-1b) is selected from the following structures:

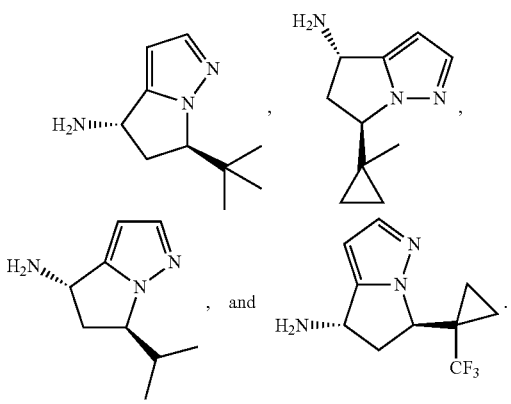

The present disclosure also relates to methods for preparing the compounds as shown in Formula (I-a), Formula (I-b), Formula (II-a), and Formula (II-b), or salts thereof, and thus, substantially optically pure oxaspiro-substituted pyrrolopyrazole derivatives are synthesized, the derivative substantially does not contain other stereoisomers. It is desired to prepare such compounds in the form of substantially pure stereoisomer with an isomeric purity of at least 98% ee, most preferably at least 99% ee. The isomeric excess value is defined as a quantitative measurement of the percentage of the major isomer in excess of the percentage of the minor isomers that exist with the major isomer at the same time, and can be readily measured by appropriate methods established and known in the art, such as chiral high pressure liquid chromatography (HPLC), chiral gas chromatography (GC), and nuclear magnetic resonance (NMR) using chiral shift reagents.

It should be understood that within the scope of the present disclosure, the above technical features of the present disclosure and the technical features specifically described below (e.g., the embodiments) can be combined with each other to constitute new or preferred technical solutions. For space limitations, they will not be repeated herein.

DESCRIPTION OF EMBODIMENTS

Figure 1:
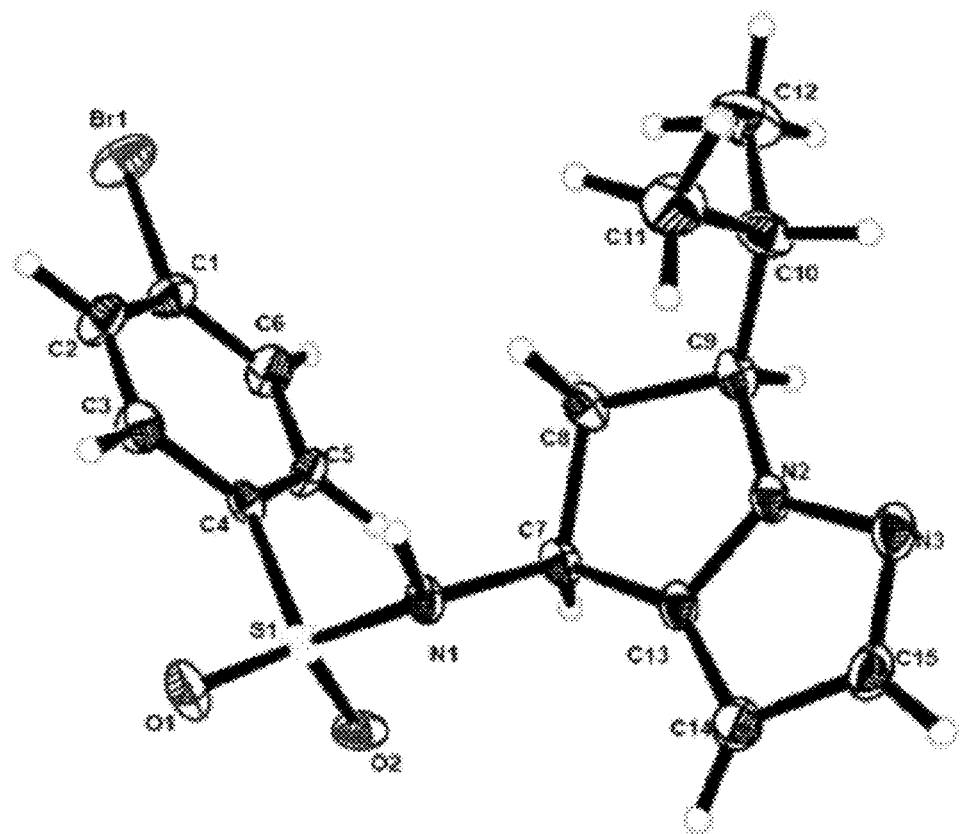
FIG. 1 is a structural diagram of single crystals of Compound V5.

By extensive and in-depth studies, the inventors have unexpectedly discovered such optically pure oxaspiro-substituted pyrrolopyrazole derivatives, which have not only excellent analgesic effects, but also good bias. In addition, the compounds of the present disclosure have excellent pharmacokinetic properties. Therefore, these compounds are expected to be developed into drugs for treating and preventing pain and pain-associated diseases. On this basis, the inventors have completed the present disclosure.

Term Definition

As used herein, "alkyl" refers to a linear and branched saturated aliphatic hydrocarbyl group. $C_{1-10}$ alkyl refers to an alkyl group having 1 to 10 carbon atoms, $C_{1-6}$ alkyl is preferred, and $C_{1-3}$ alkyl is more preferred, which are similarly defined. Examples of the alkyl more preferably include, but are not limited to, methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethylpentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl, 2-methyl-2-ethylpentyl, 2-methyl-3-ethylpentyl, n-nonyl, 2-methyl-2-ethylhexyl, 2-methyl-3-ethylhexyl, 2,2-diethylpentyl, n-decyl, 3,3-diethylhexyl, 2,2-diethylhexyl, various branched isomers thereof, etc.

As used herein, "alkenyl" refers to a linear or branched unsaturated aliphatic hydrocarbyl group having carbon-carbon double bonds (C=C), which preferably contains 2 to carbon atoms ($C_{2-10}$), more preferably contains 2 to 6 carbon atoms ($C_{2-6}$), and further more preferably contains 2 to 4 carbon atoms ($C_{2-4}$). Examples of the alkenyl include, but are not limited to, vinyl, propenyl, isopropenyl, n-butenyl, isobutenyl, pentenyl, hexenyl, etc.

As used herein, "alkynyl" refers to a linear and branched unsaturated aliphatic hydrocarbyl group having carbon-carbon triple bonds, which preferably contains 2 to 10 carbon atoms ($C_{2-10}$), more preferably contains 2 to 6 carbon atoms ($C_{2-6}$), and further more preferably contains 2 to 4 carbon atoms ($C_{2-4}$). Examples of the alkynyl include, but are not limited to, ethynyl, propynyl, n-butynyl, isobutynyl, pentynyl, hexynyl, etc.

As used herein, "cycloalkyl" and "cycloalkyl ring" can be used interchangeably, and both refer to saturated or partially unsaturated monocyclic or polycyclic hydrocarbyl groups. "$C_{3-8}$ cycloalkyl" refers to a cyclic hydrocarbyl group having 3 to 8 carbon atoms, and $C_{3-6}$ cycloalkyl is preferred, which is similarly defined. Examples of the cycloalkyl include, but are not limited to, cyclopropyl, cyclobutyl, cyclopentyl, cyclopentenyl, cyclohexyl, cyclohexenyl, cyclohexadienyl, cycloheptyl, cycloheptatrienyl, cyclooctyl, etc., and cyclopropyl, cyclopentyl, and cyclohexenyl are preferred.

As used herein, "spiro ring" refers to a polycyclic group in which monocyclic rings have one common carbon atom (called a spiro atom), these monocyclic rings may contain one or more double bonds, but none of the rings have a fully conjugated 7-electron system. According to the number of rings, the spiro rings are divided into spirobicyclic rings and spiropolycyclic rings, and the spirobicyclic rings are preferred. Four-membered/five-membered, five-membered/five-membered or five-membered/six-membered spirobicyclic ring is more preferred. For example:

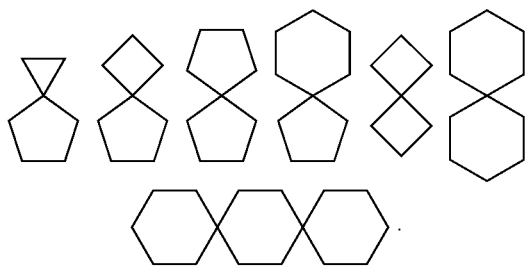

As used herein, "spiroheterocyclic ring" refers to polycyclic hydrocarbon in which monocyclic rings share one common atom (called a spiro atom), one or two ring atoms are heteroatoms selected from nitrogen, oxygen, or S(O). (where n is an integer from 0 to 2), and other ring atoms are carbon atoms. These rings may contain one or more double bonds, but none of the rings have a fully conjugated 7r-electron system. According to the number of rings, the spiroheterocyclic rings are divided into bicyclic spiroheterocyclic rings and polycyclic spiroheterocyclic rings, and the bicyclic spiroheterocyclic rings are preferred. Four-membered/five-membered, five-membered/five-membered, or five-membered/six-membered bicyclic spiroheterocyclic ring is more preferred. For example:

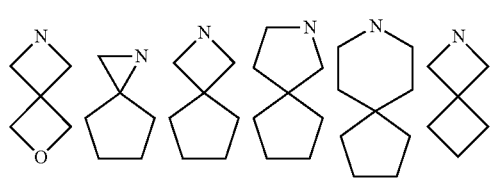

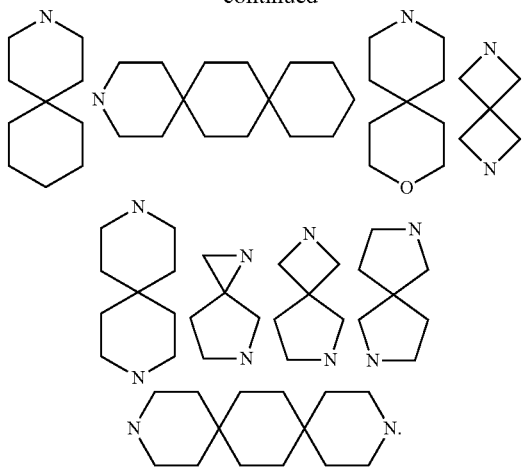

As used herein, "bridged ring" refers to a polycyclic group in which two or more common carbon atoms are shared, the common carbon atoms are called bridgehead carbon atoms, and two bridgehead carbon atoms may be linked by a carbon chain or a bond, which is called a bridge. The bridged ring may contain one or more double bonds, but none of the rings have a fully conjugated 7r-electron system. Bicyclic or tricyclic bridged rings are preferred. For example:

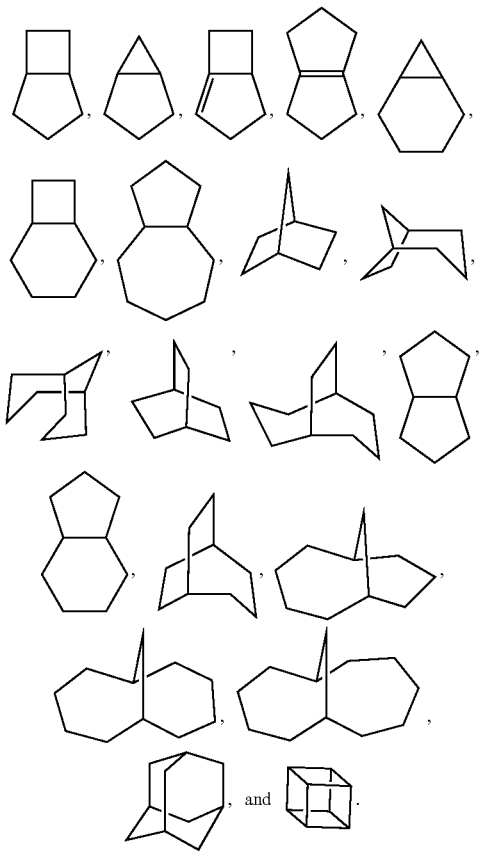

As used herein, "bridged heterocyclic ring" refers to a polycyclic group in which two or more common atoms are shared, one or more ring atoms are heteroatoms selected from nitrogen, oxygen, or S(O)n (where n is an integer from 0 to 2), and other ring atoms are carbon atoms. Bridged heterocyclic ring may contain one or more double bonds, but none of the rings have a fully conjugated 7r-electron system. Bridged heterobicyclic or heterotricyclic rings are preferred. For example:

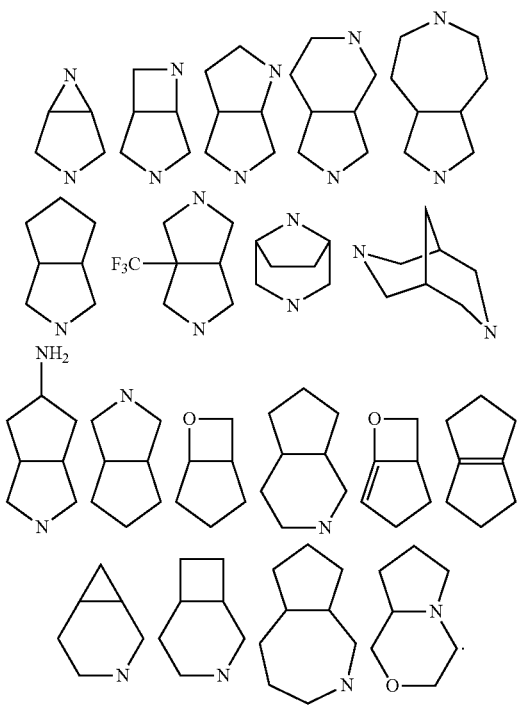

As used herein, "eight- to ten-membered bicyclic ring" refers to a bridged ring having two rings with 8 to 10 ring atoms, and the bicyclic ring may be a saturated all-carbon bicyclic ring or partially unsaturated all-carbon bicyclic ring. Examples of the eight- to ten-membered bicyclic ring include, but are not limited to,

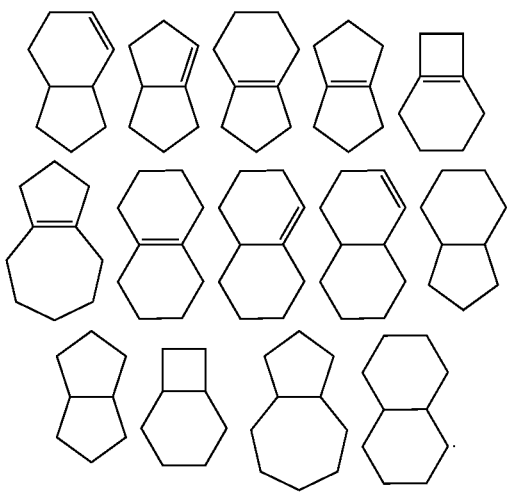

As used herein, "eight- to ten-membered heterobicyclic ring" refers to a bridged heterocyclic ring having two rings with 8 to 10 ring atoms, in which one, two, three, four or five ring carbon atoms are substituted by heteroatoms selected from nitrogen, oxygen, or sulfur. Examples of the eight- to ten-membered heterobicyclic ring include, but are not limited to, a tetrahydroquinoline ring, a tetrahydroisoquinoline ring, a decahydroquinoline ring, etc.

As used herein, "$C_{1-8}$ alkoxyl" refers to —O—($C_{1-8}$ alkyl), in which the alkyl is defined as above. $C_{1-6}$ alkoxyl is preferred, $C_{1-4}$ alkoxyl is preferred, and $C_{1-3}$ alkoxyl is more preferred. Examples of the alkoxyl include, but are not limited to, methoxy, ethoxy, propoxy, isopropoxy, butoxy, tert-butoxy, isobutoxy, pentyloxy, etc.

As used herein, "$C_{3-8}$ cycloalkoxyl" refers to —O—($C_{3-8}$ cycloalkyl), in which the cycloalkyl is defined as above. $C_{3-6}$ cycloalkoxyl is preferred. Examples of the cycloalkoxyl include, but are not limited to, cyclopropoxy, cyclobutoxy, cyclopentyloxy, cyclohexyloxy, etc.

As used herein, "$C_{6-10}$ aryl" and "$C_{6-10}$ aromatic ring" can be used interchangeably, both refer to an all-carbon monocyclic or fused polycyclic (that is, rings share adjacent carbon atom pairs) group having a conjugated 7-electron system, and refer to an aryl group having 6 to 10 carbon atoms. Phenyl and naphthyl are preferred, and phenyl is more preferred.

As used herein, "one bond" refers to a covalent bond by which two groups are linked.

As used herein, "halogen" refers to fluorine, chlorine, bromine, or iodine.

As used herein, "halogenated" refers to that one or more (e.g., one, two, three, four, or five) hydrogen atoms in a group are substituted by halogen.

For example, "halogenated $C_{1-10}$ alkyl" refers to that an alkyl group is substituted with one or more (e.g., one, two, three, four, or five) halogen atoms, in which the alkyl is defined as above. Halogenated $C_{1-8}$ alkyl is preferred, halogenated $C_{1-6}$ alkyl is more preferred, halogenated $C_{1-4}$ alkyl is more preferred, and halogenated $C_{1-3}$ alkyl is further more preferred. Examples of halogenated $C_{1-6}$ alkyl include, but are not limited to, monochloromethyl, dichloromethyl, trichloromethyl, monochloroethyl, 1,2-dichloroethyl, trichloroethyl, monobromoethyl, monofluoromethyl, difluoromethyl, trifluoromethyl, monofluoroethyl, difluoroethyl, trifluoroethyl, etc.

For another example, "halogenated $C_{1-10}$ alkoxyl" refers to that an alkoxyl group is substituted with one or more (e.g., one, two, three, four, or five) halogen atoms, in which the alkoxyl is defined as above. Halogenated $C_{1-8}$ alkoxyl is preferred, halogenated $C_{1-6}$ alkoxyl is more preferred, halogenated $C_{1-4}$ alkoxyl is more preferred, and halogenated $C_{1-3}$ alkoxyl is further more preferred. Halogenated alkoxyl groups include, but are not limited to, trifluoromethoxy, trifluoroethoxy, monofluoromethoxy, monofluoroethoxy, difluoromethoxy, difluoroethoxy, etc.

For another example, "halogenated $C_{3-8}$ cycloalkyl" refers to that a cycloalkyl group is substituted with one or more (e.g., one, two, three, four, or five) halogen atoms, in which the cycloalkyl is defined as above. Halogenated $C_{3-6}$ cycloalkyl is preferred. Examples include, but are not limited to, trifluorocyclopropyl, monofluorocyclopropyl, monofluorocyclohexyl, difluorocyclopropyl, difluorocyclohexyl, etc.

As used herein, "deuterated $C_{1-8}$ alkyl" refers to that an alkyl group is substituted with one or more (e.g., one, two, three, four, or five) deuterium atoms, in which the alkyl is defined as above. Deuterated $C_{1-6}$ alkyl is preferred, and deuterated $C_{1-3}$ alkyl is more preferred. Examples of the deuterated alkyl group include, but are not limited to, mono-deuteromethyl, mono-deuteroethyl, di-deuteromethyl, di-deuteroethyl, tri-deuteromethyl, tri-deuteroethyl, etc.

As used herein, "amino" refers to NH$_2$, "cyano" refers to CN, "nitro" refers to NO$_2$, "benzyl" refers to —CH$_2$-phenyl, "oxo group" refers to =O, "carboxyl" refers to —C(O)OH, "acetyl" refers to —C(O)CH$_3$, "hydroxymethyl" refers to —CH$_2$OH, "hydroxyethyl" refers to —CH$_2$CH$_2$OH or —CHOHCH$_3$, "hydroxyl" refers to —OH, "thiol" refers to SH, and "cyclopropylidene" has the following structure:

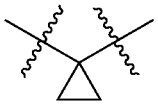

As used herein, "heteroaryl ring" and "heteroaryl" can be used interchangeably, both refer to a group having 5 to 10 ring atoms, 6, 10 or 14 common R electrons in the ring array, and 1 to 5 heteroatoms in addition to carbon atoms. "Heteroatom" refers to nitrogen, oxygen, or sulfur. Five- or six-membered monocyclic heteroaryl or eight- to ten-membered bicyclic heteroaryl is preferred.

As used herein, "three- to seven-membered (four- to seven-membered) saturated monocyclic ring" refers to a saturated all-carbon monocyclic ring having 3 to 7 ring atoms, and three- to six-membered saturated monocyclic ring is preferred. Examples of the saturated monocyclic ring include, but are not limited to, a cyclopropyl ring, a cyclobutyl ring, a cyclopentyl ring, a cyclohexyl ring, a cycloheptyl ring, a cyclooctyl ring, etc.

As used herein, "three- to seven-membered (four- to seven-membered) saturated monoheterocyclic ring" refers to that one, two, or three carbon atoms in the three- to seven-membered saturated monocyclic ring are substituted by heteroatoms selected from nitrogen, oxygen, or S(O)$_t$ (where t is an integer from 0 to 2), an —O—O—, —O—S— or —S—S— ring moiety is not included, and other ring atoms are carbon atoms. Four- to six-membered saturated monoheterocyclic ring is preferred, and five- or six-membered saturated monoheterocyclic ring is more preferred. Example of the saturated monoheterocyclic ring include, but are not limited to, propylene oxide, azetidine, oxetane, tetrahydrofuran, tetrahydrothiophene, tetrahydropyrrole, piperidine, pyrroline, oxazolidine, piperazine, dioxolane, dioxane, morpholine, thiomorpholine, thiomorpholine-1,1-dioxide, tetrahydropyran, etc.

As used herein, "five- or six-membered monocyclic heteroaryl ring" and "five- or six-membered monocyclic heteroaryl" can be used interchangeably, and both refer to a monocyclic heteroaryl ring having 5 or 6 ring atoms, which include, but are not limited to, a thiophene ring, a furan ring, a thiazole ring, an imidazole ring, an oxazole ring, a pyrrole ring, a pyrazole ring, a triazole ring, a 1,2,3-triazole ring, a 1,2,4-triazole ring, a 1,2,5-triazole ring, a 1,3,4-triazole ring, a tetrazole ring, an isoxazole ring, an oxadiazole ring, a 1,2,3-oxadiazole ring, a 1,2,4-oxadiazole ring, a 1,2,5-oxadiazole ring, a 1,3,4-oxadiazole ring, athiadiazole ring, a pyridine ring, a pyridazine ring, a pyrimidine ring, a pyrazine ring, etc.

As used herein, "eight- to ten-membered bicyclic heteroaryl ring" and "eight- to ten-membered bicyclic heteroaryl" can be used interchangeably, and both refer to a bicyclic heteroaryl ring having 8 to 10 ring atoms, which include, but are not limited to, benzofuran, benzothiophene, indole, isoindole, quinoline, isoquinoline, indazole, benzothiazole, benzimidazole, quinazoline, quinoxaline, cinnoline, phthalazine, pyrido[3,2-d]pyrimidine, pyrido[2,3-d]pyrimidine, pyrido[3,4-d]pyrimidine, pyrido[4,3-d]pyrimidine, 1,8-naphthyridine, 1,7-naphthyridine, 1,6-naphthyridine, and 1,5-naphthyridine.

As used herein, "substituted" refers to that one or more hydrogen atoms, preferably one to five hydrogen atoms, and more preferably one to three hydrogen atoms, in a group are each independently replaced by the corresponding number of substituent groups, That is, the substituent groups are only in their possible chemical positions, and those skilled in the art can determine (either experimentally or theoretically) possible or impossible substitutions without involving any effort. For example, the binding of an amino or hydroxyl group having free hydrogen atoms to carbon atoms having unsaturated (e.g., olefinic) bonds may be unstable.

Unless otherwise defined, the "substituent groups are each independently selected from . . . " used herein refers to that when more than one hydrogen atoms in a group are substituted by substituent groups, the substituent groups may be of the same type or different types, and the selected substituent groups are independent in term of their types.

Unless otherwise defined, the " . . . are the same or different, and are each independently . . . " used herein refers to that when more than one same substituent groups exist in a general formula, the groups may be the same or different, and are independent in their types. For example, provided that L is (CR$_{01}$R$_{02}$)$_s$, when s is 2, that is, L is (CR$_{01}$R$_{02}$)-(CR$_{01}$R$_{02}$), where the two R$_{01}$ or R$_{02}$ groups may be the same or different, and are independent in their types. For example, L may be C(CH$_3$)(CN)—C(CH$_2$CH$_3$)(OH), C(CH$_3$)(CN)—C(CH$_3$)(OH) or C(CN)(CH$_2$CH$_3$)—C(OH)(CH$_2$CH$_3$).

Unless otherwise defined, any one group described herein may be substituted or unsubstituted. If the above group is substituted, substituent groups are preferably one to five groups each independently selected from CN, halogen, C$_{1-10}$ alkyl (preferably C$_{1-6}$ alkyl, and more preferably C$_{1-3}$ alkyl), C$_{1-10}$ alkoxyl (preferably C$_{1-6}$ alkoxyl, and more preferably C$_{1-3}$ alkoxyl), halogenated C$_{1-8}$ alkyl (preferably halogenated C$_{1-6}$ alkyl, and more preferably halogenated C$_{1-3}$ alkyl), C$_{3-8}$ cycloalkyl (preferably C$_{3-6}$ cycloalkyl), halogenated C$_{1-8}$ alkoxyl (preferably halogenated C$_{1-6}$ alkoxyl, and more preferably halogenated C$_{1-3}$ alkoxyl), C$_{1-8}$ alkyl-substituted amido, amido, halogenated C$_{1-8}$ alkyl-substituted amido, acetyl, hydroxyl, hydroxymethyl, hydroxyethyl, carboxyl, nitro, C$_{6-10}$ aryl (preferably phenyl), C$_{3-8}$ cycloalkoxyl (preferably C$_{3-6}$ cycloalkoxyl), C$_{2-10}$ alkenyl (preferably C$_{2-6}$ alkenyl, and more preferably C$_{2-4}$ alkenyl), C$_{2-10}$ alkynyl (preferably C$_{2-6}$ alkynyl, and more preferably C$_{2-4}$ alkynyl), —CONR$_{a0}$R$_{b0}$, —C(O)O(C$_{1-10}$ alkyl) (preferably —C(O)O(C$_{1-6}$ alkyl), and more preferably —C(O)O (C$_{1-3}$ alkyl)), —CHO, —OC(O)(C$_{1-10}$ alkyl) (preferably —OC(O)(C$_{1-6}$ alkyl), and more preferably —OC(O)(C$_{1-3}$ alkyl)), —SO$_2$(C$_{1-10}$ alkyl) (preferably —SO$_2$(C$_{1-6}$ alkyl), and more preferably —SO$_2$(C$_{1-3}$ alkyl)), —SO$_2$(C$_{6-10}$ aryl) (preferably —SO$_2$(C$_6$ aryl), such as —SO$_2$-phenyl), —CO (C$_{6-10}$ aryl) (preferably —CO(C$_6$ aryl), such as —CO-phenyl), a four- to six-membered saturated or unsaturated monoheterocyclic ring, a four- to six-membered saturated or unsaturated monocyclic ring, a five- or six-membered monocyclic heteroaryl ring, an eight- to ten-membered bicyclic heteroaryl ring, a spiro ring, a spiroheterocyclic ring, a bridged ring, and a bridged heterocyclic ring, where R$_{a0}$ and R$_{b0}$ are each independently hydrogen or C$_{1-3}$ alkyl.

Each substituent group described above itself can also be substituted with the groups described herein.

When the four- to six-membered (five- or six-membered) saturated monoheterocyclic ring described herein is substituted, substituent groups can be in their possible chemical positions. Representative substitutions of exemplary monoheterocyclic rings are shown below:

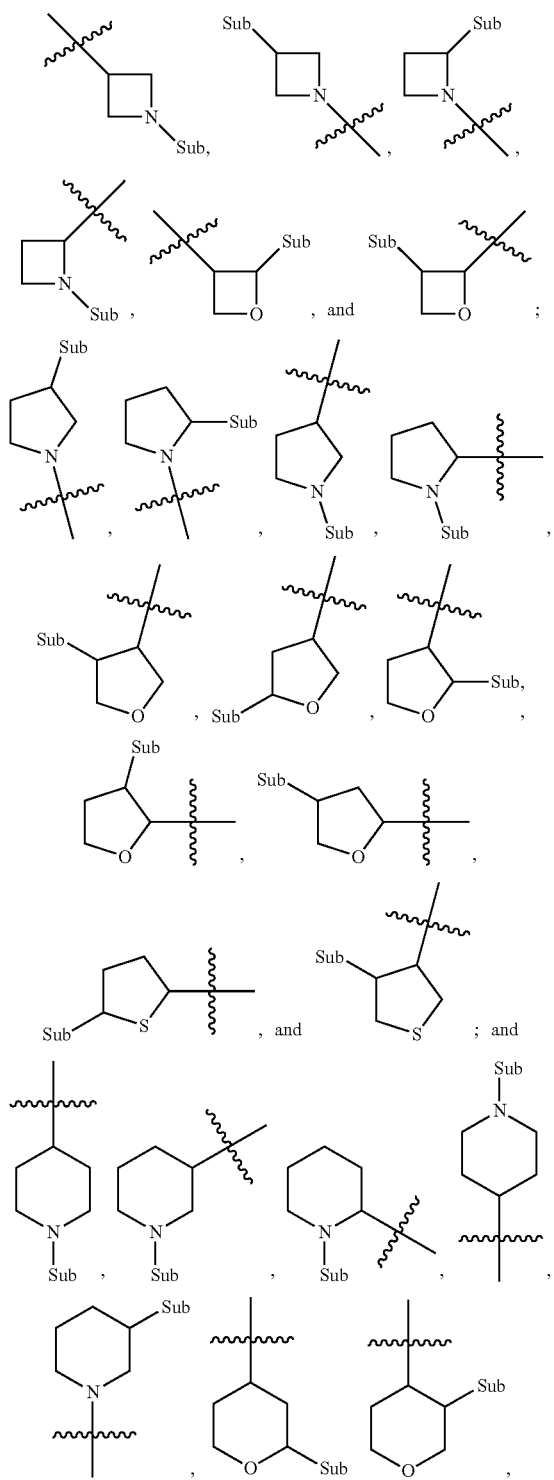

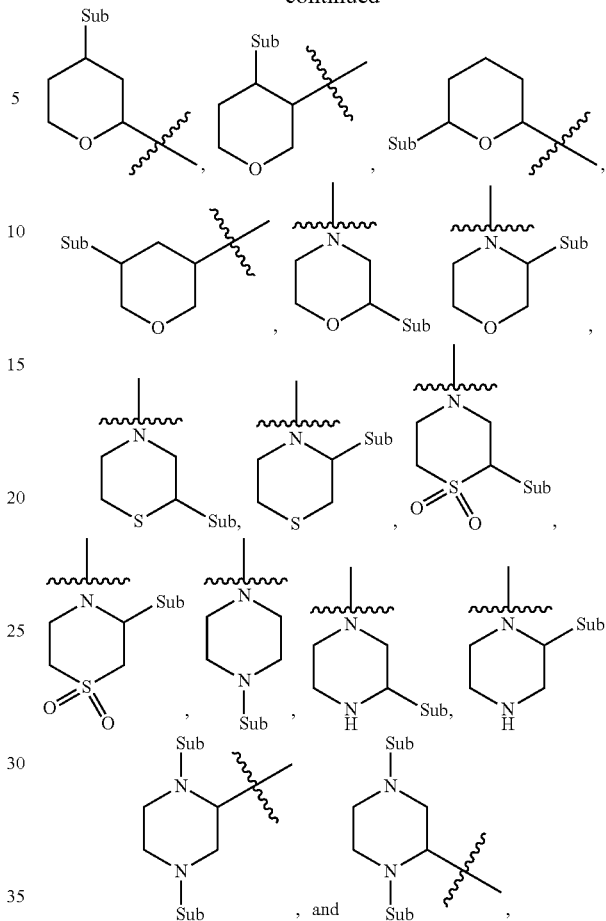

where "Sub" refers to various substituent groups described herein, and "⁓" refers to the linkage to other atoms.

Unless otherwise defined, when the four- to six-membered saturated monoheterocyclic ring described herein is a substituent group, it can also be substituted or substituted with one, two, or three substituent groups selected from the group consisting of halogen, hydroxyl, $C_{1-3}$ alkyl, O=, $NR_{a0}R_{b0}$, hydroxymethyl, hydroxyethyl, carboxyl, —C(O)O($C_{1-3}$ alkyl), acetyl, halogenated $C_{1-3}$ alkyl, $C_{1-3}$ alkoxyl, $C_{3-6}$ cycloalkyl, azetidine, oxetane, tetrahydrofuran, tetrahydrothiophene, tetrahydropyrrole, piperidine, oxazolidine, piperazine, dioxolane, dioxane, morpholine, thiomorpholine, thiomorpholine-1,1-dioxide, tetrahydropyran, a thiophene ring, an N-alkylpyrrole ring, a furan ring, a thiazole ring, an imidazole ring, an oxazole ring, a pyrrole ring, a pyrazole ring, a triazole ring, a tetrazole ring, an isoxazole ring, an oxadiazole ring, a thiadiazole ring, a pyridine ring, a pyridazine ring, a pyrimidine ring, and a pyrazine ring, in which $R_{a0}$ and $R_{b0}$ are each independently hydrogen or $C_{1-3}$ alkyl.

"Pharmaceutically acceptable salt" include pharmaceutically acceptable acid addition salts and pharmaceutically acceptable base addition salts.

"Pharmaceutically acceptable acid addition salts" refer to salts formed with inorganic or organic acids, which can retain the biological effectiveness of free alkali without producing other side effects.

"Pharmaceutically acceptable base addition salts" include, but are not limited to, salts, such as sodium salts, potassium salts, calcium salt, and magnesium salts, of inorganic alkalis, and salts, such as ammonium salts, triethylamine salts, lysine salts, and arginine salts, of organic alkalis.

"Solvate" described herein refers to a complex formed by the compound of the present disclosure and a solvent. The compounds either react in the solvents or are precipitated or crystallized from the solvents. For example, a complex formed by the compound and water is called a "hydrate". The solvates of the compound as shown in Formula (I) fall within the scope of the present disclosure.

The present disclosure further relates to prodrugs of the above compounds. Prodrugs include known amino-protecting groups and carboxyl-protecting groups, which are hydrolyzed under physiological conditions or released via enzymatic reactions to obtain mother compounds. For specific preparation methods of prodrugs, please refer to Saulnier, M. G.; Frennesson, D. B.; Deshpande, M. S.; Hansel, S. B and Vysa, D. M. Bioorg. Med. Chem Lett. 1994, 4, 1985-1990; and Greenwald. R. B.; Choe, Y. H.; Conover, C. D.; Shum, K.; Wu, D.; Royzen, M. J. Med. Chem. 2000, 43, 475.

Usually, the compound, or the pharmaceutically acceptable salt, solvate, or prodrug thereof of the present disclosure and one or more pharmaceutical carriers can be prepared into suitable formulations for administration. These formulations are suitable for oral administration, rectal administration, local administration, intraoral administration, and other parenteral (e.g., subcutaneous, intramuscular, and intravenous) administration. For example, the formulations suitable for oral administration include capsules, tablets, granules, syrups, etc. The compound of the present disclosure contained in these formulations may be solid powder or particles, a solution or suspension in an aqueous or non-aqueous liquid, or a water-in-oil or oil-in-water emulsion. The above formulations can be prepared from the active compound and one or more carriers or excipients by universal pharmacy methods. The above carriers are required to be compatible with the active compound or other excipients. For solid formulations, commonly used non-toxic carriers include, but are not limited to, mannitol, lactose, starch, magnesium stearate, cellulose, glucose, sucrose, etc. For liquid formulations, commonly used carriers include water, saline, aqueous glucose solution, ethylene glycol, polyethylene glycol, etc. The active compound can form a solution or suspension with the above carrier.

The compositions of the present disclosure are prepared, dosed, and administered in accordance with the medical practice guideline. A "therapeutically effective amount" of administrated compound is determined by factors such as a specific disorder to be treated, an individual to be treated, causes of the disorder, a target of the drug, an administration method, etc.

As used herein, "therapeutically effective amount" refers to an amount of the compound of the present disclosure that will lead to a biological or medical response in an individual, such as reducing or inhibiting enzyme or protein activity or ameliorating symptoms, alleviating a disorder, slowing or delaying the disease progression, and preventing a disease.

Usually, although an effective dose of the compound of the present disclosure used for the treatment can vary greatly in the practice of the present disclosure, depending on the particular application, disease, or disease state involved, the dose can be readily determined by those skilled in the art. For each of the relevant compositions described herein, and in order to achieve a therapeutic effect on each of the diseases described herein, an appropriately therapeutically effective dose of the compound as shown in Formula (I) or Formula (II), or the therapeutically acceptable salt, solvate, or prodrug thereof of the present disclosure that is contained in the pharmaceutical composition of the present disclosure is typically 0.1 μg to 5 g per kilogram of patient body weight per day, and preferably 1 mg to 1,000 mg per kilogram of body weight per day.

The required dose is preferably administered in two, three, four, five, six, or more sub-doses at appropriate intervals within a day. These sub-doses may be administered in the form of unit dose. For example, each unit dose contains 10 μg to 1,000 mg, preferably 50 μg to 500 mg, more preferably 50 μg to 250 mg, and most preferably 50 μg to 10 mg of the active ingredient. Or, the dose can be administrated through continuous infusion, depending on the need of the disease of a patient.

As used herein, "pharmaceutically acceptable carrier" refers to non-toxic, inert, and solid or semi-solid substances or liquid fillers, diluents, encapsulating materials or adjuvants or any type of excipients, which is compatible with patients, preferably mammals, and more preferably humans, and is suitable for delivering an active reagent to a target without terminating the activity of the reagent.

As used herein, "patient" refers to an animal, which is preferably a mammal, and more preferably a human being. The term "mammal" refers to warm-blooded vertebrate mammals, which include cats, dogs, rabbits, bears, foxes, wolves, monkeys, deer, mice or rats, pigs, and humans.

As used herein, "treatment" refers to alleviating, slowing down progression of, attenuating, preventing, or maintaining an existing disease or disorder (e.g., cancer). Treatment also includes curing one or more symptoms of a disease or disorder, preventing the development or alleviating to a certain degree.

Preparation Methods

The experimental method described in the following examples without introducing specific conditions generally follow conventional conditions, e.g., those described in Sambrook, et al., Molecular Cloning: Laboratory Manual (New York: Cold Spring Harbor Laboratory Press, 1989), or conditions recommended by manufacturers.

Unless otherwise defined, the terms used herein have the same meanings as those familiar to those skilled in the art. In addition, any methods and materials similar or equivalent to those described herein can be applicable to the present disclosure.

Preparation Methods of the Compounds of the Present Disclosure:

The compounds as shown in Formula (I) and Formula (II) can be prepared by the existing methods, such as the following methods, methods equivalent to the following methods, and methods described in the examples. In the following preparation methods, a raw material compound may be in the form of salt, and the salt may be any pharmaceutically acceptable salt as illustrated for the compounds as shown in Formula (I) and Formula (II) of the present disclosure.

Reaction scheme (a)

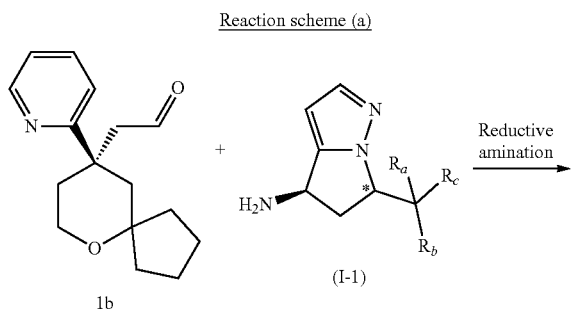

In each formula of the above reaction scheme, * represents a chiral carbon atom in an R or S configuration (the same hereinafter), and all groups are as defined in the description.

Specifically, the compound as shown in Formula (I) can be prepared by the following method: reductive amination is performed on a compound as shown in Formula (I-1) and a compound 1b to obtain the compound as shown in Formula (I). The reductive amination is performed in an inert solvent, the compound as shown in Formula (I-1), the compound Tb, and a reducing agent reacted at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (I). The inert solvent and the reducing agent are known in the art, the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

The compound as shown in (I-1) can be prepared by a reaction scheme (a-1) or a reaction scheme (a-2).

Reaction scheme (a-1)

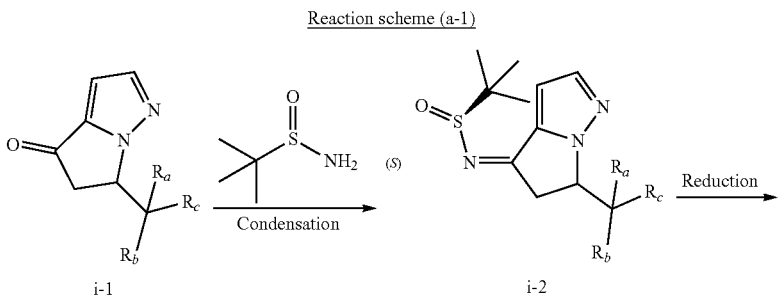

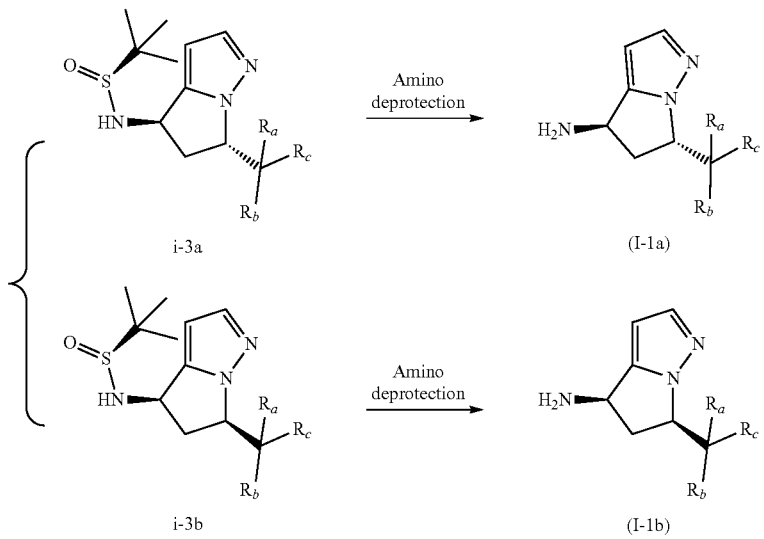

In each formula of the above scheme, all groups are as defined in the description.

Specifically, a compound as shown in Formula (i-2) can be prepared by condensation of a compound as shown in Formula (i-1) and (S)-2-methylpropane-2-sulfinamide (in the presence of a catalyst such as titanium ethoxide and titanium isopropoxide); the compound as shown in Formula (ii-2) is reduced with a reducing agent (e.g., sodium borohydride, lithium tri-sec-butylborohydride, sodium cyanoborohydride, and diisobutylaluminium hydride), and separated by preparative high-performance liquid chromatography to obtain two single isomers, i.e., compounds as shown in Formula (i-3a) and Formula (i-3b); and the compounds as shown in Formula (i-3a) and Formula (i-3b) are subjected to amino deprotection by using an acid (e.g., chlorine hydride) to obtain compounds as shown in Formula (I-1a) and Formula (I-Tb), respectively.

agents (e.g., sodium borohydride, lithium tri-sec-butylborohydride, sodium cyanoborohydride, and diisobutylaluminium hydride) to obtain compounds as shown in Formula (i-3a) and Formula (i-3b); and the compounds as shown in Formula (i-3a) and Formula (i-3b) are subjected to amino deprotection by using an acid (e.g., chlorine hydride) to obtain compounds as shown in Formula (I-1a) and Formula (I-Tb), respectively.

The chiral auxiliary, i.e., (S)-2-methylpropane-2-sulfinamide, in the reaction schemes (a-1) and (a-2) can be replaced with other chiral auxiliaries having the same chiral induction function, such as (S)-methylbenzylamine.

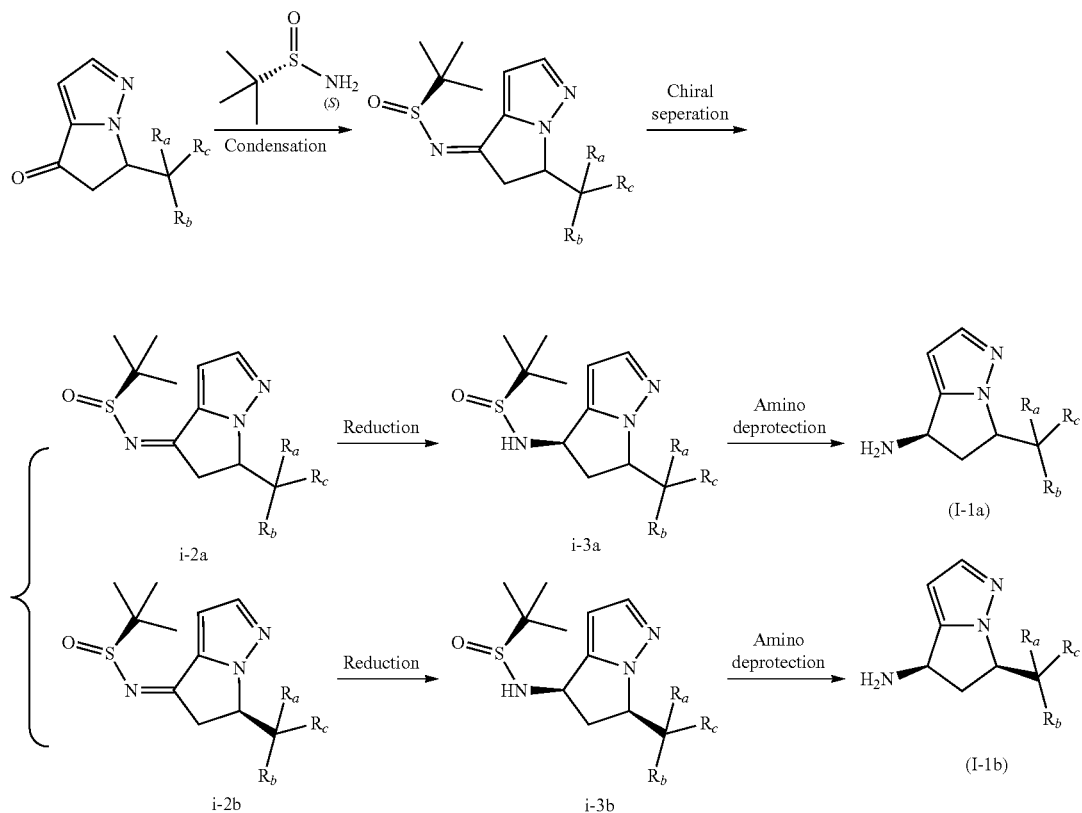

In each formula of the above scheme, all groups are as defined as in the description.

Specifically, a compound as shown in Formula (i-2) can be prepared by condensation of a compound as shown in Formula (i-1) and (S)-2-methylpropane-2-sulfinamide (in the presence of a catalyst such as titanium ethoxide and titanium isopropoxide); chiral separation is performed on the compound as shown in Formula (i-2) to obtain two single isomers, i.e., compounds as shown in Formula (i-2a) and Formula (i-2b); the compounds as shown in Formula (i-2a) and Formula (i-2b) are respectively reduced with reducing

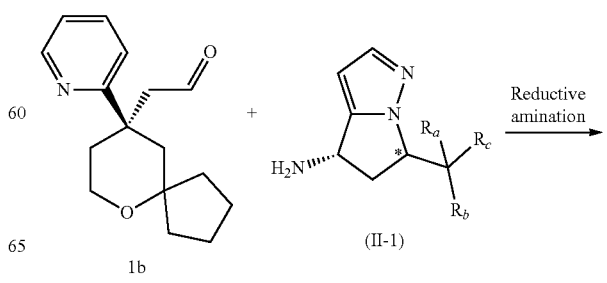

-continued

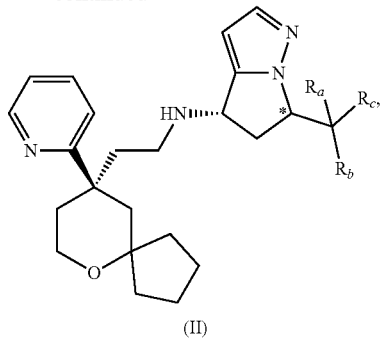

(II)

In each formula of the above scheme, * indicates an R or S configuration, and all groups are as defined in the description.

Specifically, the compound as shown in Formula (II) can be prepared by the following method: reductive amination is performed on a compound as shown in Formula (II-1) and the compound 1b to obtain the compound as shown in Formula (II). The reductive amination is performed in an inert solvent, and the compound as shown in Formula (II-1), the compound Tb, and a reducing agent react at a certain temperature (e.g., −20° C. to 80° C., preferably 0° C. to 60° C., and more preferably 20° C. to 60° C.) for a period of time (e.g., 0.5 h to 48 h, preferably 0.5 h to 5 h), to obtain the compound as shown in Formula (II). The inert solvent and the reducing agent are known in the art, the reducing agent may be selected from tetrabutylammonium borohydride, sodium malonyloxyborohydride, sodium triacetoxyborohydride, sodium cyanoborohydride, sodium borohydride, lithium borohydride, potassium borohydride, borane, etc. The inert solvent may be selected from $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, N,N-dimethylformamide, or a combination thereof.

The compound as shown in Formula (II-1) can be prepared by a reaction scheme (b-1) or a reaction scheme (b-2).

Reaction scheme (b-1)

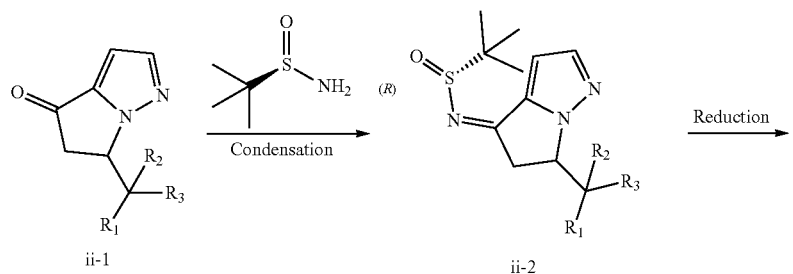

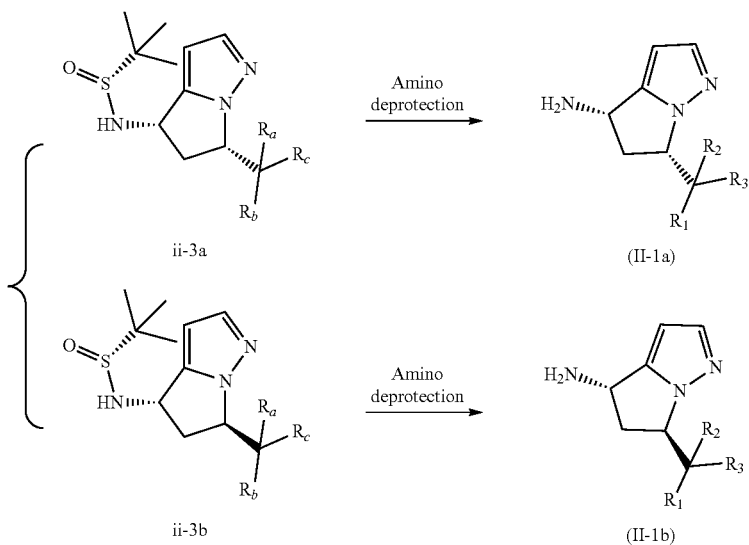

In each formula of the above scheme, all groups are as defined in the description.

Specifically, a compound as shown in Formula (ii-2) can be prepared by condensation of a compound as shown in Formula (ii-1) and (R)-2-methylpropane-2-sulfinamide (in the presence of a catalyst such as titanium ethoxide and titanium isopropoxide); the compound as shown in Formula (ii-2) is reduced with a reducing agent (e.g., sodium borohydride, lithium tri-sec-butylborohydride, sodium cyanoborohydride, and diisobutylaluminium hydride), and separated by preparative high-performance liquid chromatography to obtain compounds as shown in Formula (ii-3a) and Formula (ii-3b); and the compounds as shown in Formula (ii-3a) and Formula (ii-3b) are subjected to amino protection by using an acid (e.g., chlorine hydride), to obtain compounds as shown in Formula (II-1a) and Formula (II-1b), respectively.

agents (e.g., sodium borohydride, lithium tri-sec-butylborohydride, sodium cyanoborohydride, diisobutylaluminium hydride) to obtain compounds as shown in Formula (ii-3a) and Formula (ii-3b); and the compounds as shown in Formula (ii-3a) and Formula (ii-3b) are subjected to amino deprotection by using an acid (e.g., chlorine hydride), to obtain compounds as shown in Formula (II-1a) and Formula (II-1b), respectively.

The chiral auxiliary, i.e., (R)-2-methylpropane-2-sulfinamide, in the reaction schemes (b-1) and (b-2) can be replaced with other chiral auxiliaries having the same chiral induction function, such as (R)-methylbenzylamine.

The compounds having an amino group, carboxyl group, or hydroxyl group that are used in the present disclosure can be prepared from compounds that has been protected by protecting groups commonly used for the groups as neces-

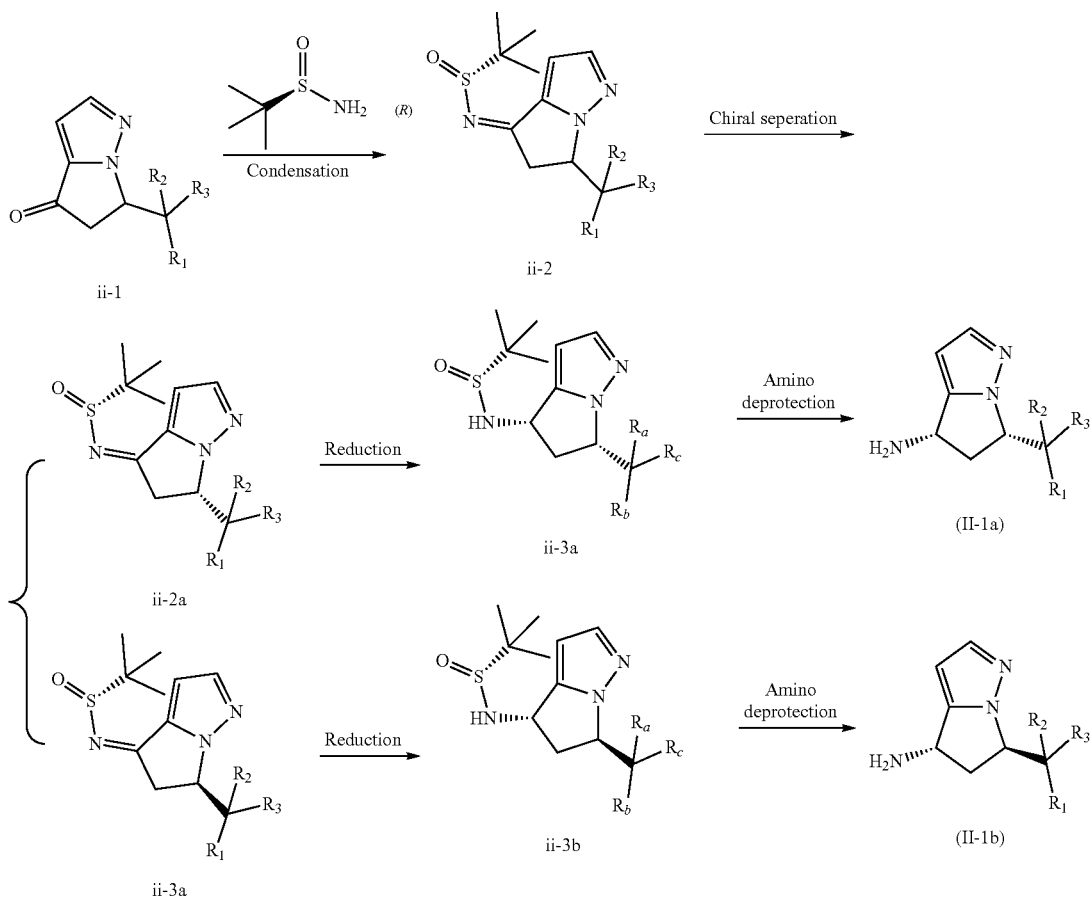

Reaction scheme (b-2)

In each formula of the above scheme, all groups are as defined in the description.

Specifically, a compound as shown in Formula (ii-2) can be prepared by condensation of a compound as shown in Formula (ii-1) and (R)-2-methylpropane-2-sulfinamide (in the presence of a catalyst such as titanium ethoxide and titanium isopropoxide); chiral separation is performed on the compound as shown in Formula (ii-2) to obtain two single isomers, i.e., compounds as shown in Formula (ii-2a) and Formula (ii-2b); the compounds as shown in Formula (ii-2a) and Formula (ii-2b) are respectively reduced with reducing sary, and subsequent to the reaction process of the above reaction scheme, known deprotection can be performed.

Compared with the prior art, the present disclosure mainly has the following advantages.

The present disclosure provides a series of optically pure oxaspiro-substituted pyrrolopyrazole derivatives with novel structures, which have high inhibitory activity (EC$_{50}$ is 1 nM to 50 nM, more preferably 1 nM to 30 nM, and most preferably 1 nM to 10 nM) against cAMP, with great Emax values (greater than 50%, preferably greater than 80%), and have excellent analgesic effects. In addition, the compounds of the present disclosure have small Emax values against β-arrestin (less than 50%, more preferably less than 20%, and most preferably less than 10%), and have good bias. Therefore, the compounds of the present disclosure can be developed into drugs for treating and preventing pain and pain-associated diseases.

The present disclosure will be further described below with reference to specific examples. It should be understood that these examples are only for the purpose of description of the present disclosure rather than limitation to the scope of the present disclosure. The experimental method described in the following examples without introducing specific conditions generally follows conventional conditions or conditions recommended by manufacturers. Unless otherwise defined, the percentage and parts are calculated based on the weight. Unless otherwise defined, the terms used herein have the same meanings as those familiar to those skilled in the art. In addition, any methods and materials similar or equivalent to those described herein can be applicable to the present disclosure.

Reagents and Instruments $^{1}$HNMR: Bruker AVANCE-400 NMR spectrometer, the internal standard: tetramethylsilane (TMS);

LC-MS: Agilent 1290 HPLC System/6130/6150 MS LC/MS spectrometer (manufacturer: Agilent), column: Waters BEH/CHS, 50×2.1 mm, 1.7 μm.

Single crystal detection was performed by using Bruker D8 VENTURE single crystal X-ray diffraction instrument.

Preparative high-performance liquid chromatography (pre-HPLC): GX-281 (manufacturer: Gilson).

ISCO CombiFlash Rf75 or Rf200 automatic chromatography instrument was used, with Agela 4 g, 12 g, 20 g, 40 g, 80 g, and 120 g disposable silica gel columns.

The known starting materials can be synthesized by the existing methods in the art, or can be purchased from ABCR GmbH&Co.KG, Acros Organics, Aldrich Chemical Company, Accela ChemBio Inc, Chembee Chemicals, etc.

In the examples, the reaction process can be monitored by thin layer chromatography (TLC), and the compounds can be purified by column chromatography. A developing solvent system used for column chromatography or TLC may be selected from a dichloromethane-methanol system, an n-hexane-ethyl acetate system, a petroleum ether-ethyl acetate system, an acetone system, etc., and a volume ratio of the solvents was adjusted according to the polarity of the compound.

As used herein, DCE refers to 1,2-dichloroethane, THF refers to tetrahydrofuran, EA refers to ethyl acetate, PE refers to petroleum ether, DCM refers to dichloromethane, n-BuLi refers to n-butyllithium, HATU refers to 2-(7-azabenzotriazole)-N,N,N',N'-tetramethyl uronium hexafluorophosphate, DMF refers to dimethylformamide, DMSO refers to dimethyl sulfoxide, DIEA or DIPEA refers to N,N-diisopropylethylamine, DBU refers to 1,8-diazabicyclo[5.4.0]undec-7-ene, and DIBAL-H refers to diisobutylaluminium hydride.

As used herein, the room temperature refers to about 20° C. to 25° C.

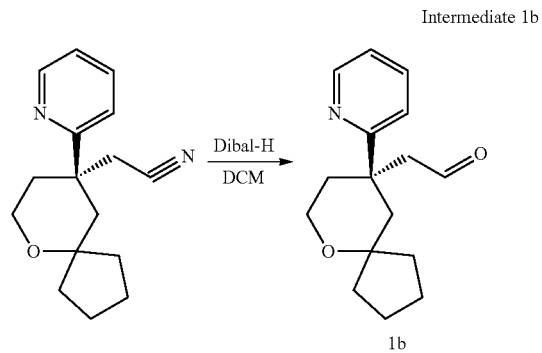 [SMILES: N#CC[C@@]1(c2ccccn2)CCOC2(CCCC2)C1 ; O=CC[C@@]1(c2ccccn2)CCOC2(CCCC2)C1]

Intermediate 1b (R)-2-(9-(pyridin-2-yl)-6-oxaspiro[4.5]decan-9-yl)acetonitrile (11 g, 43 mmol, purchased from Shanghai Yucheng Pharmaceutical Technology Co., Ltd., CAS No. 1401031-38-6) was dissolved in a DCM (100 mL) solution, a diisobutylaluminium hydride solution (1.0 M, 86 mL) was added dropwise at −78° C., and the reaction solution was stirred at −78° C. for 1 h. Sodium sulfate decahydrate (30 g) was added, the reaction solution was stirred at the room temperature for 0.5 h and filtered, an obtained filtrate was concentrated under reduced pressure to obtain a yellow oily intermediate. The intermediate was dissolved in an ethanol solution (100 mL), a hydrochloric acid solution (6 N, 100 mL) was added, and the reaction solution was stirred at 100° C. for 36 h. The reaction solution was concentrated under reduced pressure, and an obtained residue was purified by preparative liquid chromatography to obtain (R)-2-(9-(pyridin-2-yl)-6-oxaspiro[4.5]decan-9-yl)acetaldehyde (intermediate 1b, 6.5 g) with a yield of 59%. MS m/z (ESI): 260.2 [M+1].

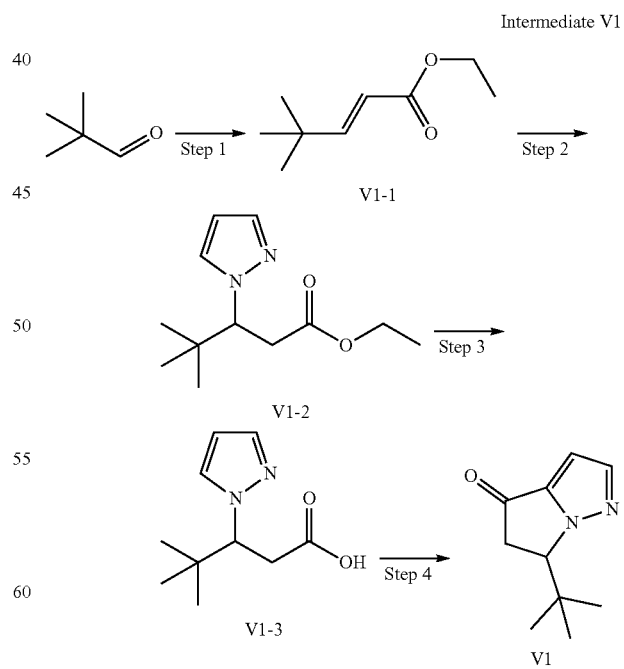

Intermediate V1

At step 1: neovaleraldehyde (17.2 g, 0.2 mol) was dissolved in acetonitrile (400 mL), triethyl phosphonoacetate (48 g, 0.21 mol) and lithium chloride (8.8 g, 0.21 mol) were added, the reaction solution was cooled to 2-5° C., DBU (30.4 g, 0.2 mol) was slowly added, and the reaction solution was placed at the room temperature for 18 h. The reaction solution was concentrated, an obtained residue was diluted with EA (300 mL), washed with water (100 mL×2), washed with a saturated saline solution (80 mL×1), dried with anhydrous sodium sulfate, and filtered, and an obtained filtrate was concentrated under reduced pressure. An obtained residue was purified by silica gel column chromatography (PE/EA=10/1) to obtain a compound V1-1 (25.6 g, a yellow oily liquid) with a yield of 82%. MS m/z (ESI): 157.2 [M+1].

At step 2: an acetonitrile solution (80 mL) and DBU (11.4 g, 75 mmol) were added to a sealed tube in which the compound V1-1 (7.8 g, 50 mmol) and pyrazole (5.1 g, 75 mmol) were placed, the reaction solution was stirred at 100° C. for 48 h, cooled to the room temperature, and concentrated, an obtained residue was diluted with EA (150 mL), washed with water (60 mL×1), washed with a saturated saline solution (30 mL×1), dried with anhydrous sodium sulfate, and filtered, and an obtained filtrate was concentrated under reduced pressure. An obtained residue was purified by silica gel column chromatography (PE/EA=6/1) to obtain a compound V1-2 (8.96 g, a yellow oily liquid) with a yield of 80%. MS m/z (ESI): 225.1 [M+1].

At step 3: the compound V1-2 (8.96 g, 40 mmol) was dissolved in a mixture of methanol (100 mL) and water (20 mL), sodium hydroxide (3.2 g, 80 mmol) was added, and the reaction solution was stirred at the room temperature for 1 h until the reaction was completed. The reaction solution was concentrated, an obtained residue was dissolved in water (70 mL), 2 M hydrochloric acid was added to adjust a pH value of the mixture to 3-4, the mixture was extracted with DCM (90 mL×3), a combined organic phase was dried with anhydrous sodium sulfate and filtered, and an obtained filtrate was concentrated under reduced pressure to obtain a compound V1-3 (7 g, a yellow oily liquid) with a yield of 90%. MS m/z (ESI): 197.2 [M+1].

At step 4: the compound V1-3 (7 g, 35.7 mmol) was dissolved in dry THF (120 mL), the reaction solution was cooled to −70° C. under the protection of nitrogen gas, and a THF solution of 2.5 M butyllithium (35.7 mL, 89.2 mmol) was slowly added dropwise. After the dropwise addition was completed, the reaction solution was slowly heated to −40° C. and stirred for 45 min. The reaction solution was quenched with water (3 mL) and filtered, and an obtained filtrate was concentrated. An obtained residue was purified by silica gel column chromatography (PE/EA=6/1) to obtain a compound V1 (4.76 g, a yellow oily liquid) with a yield of 15%. MS m/z (ESI): 179.2 [M+1].

Intermediate V2

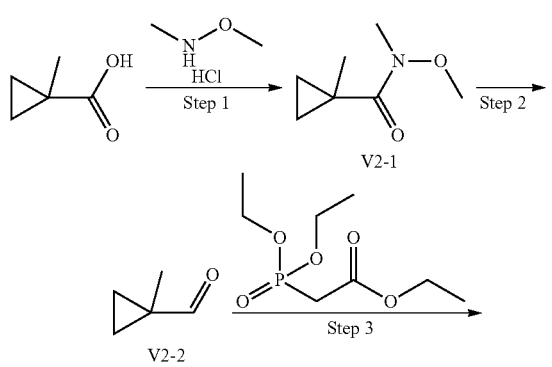

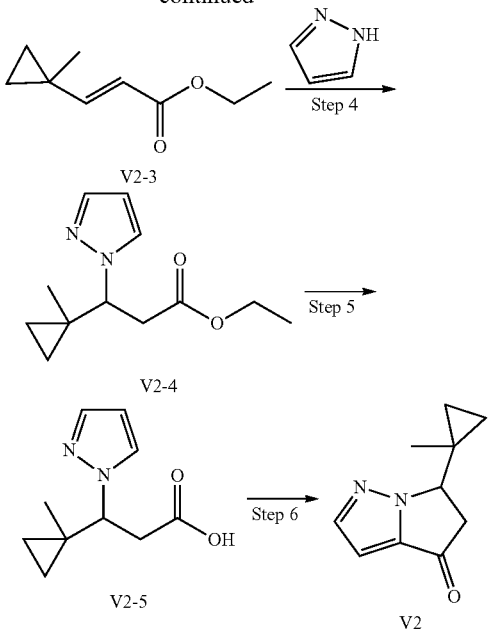

At step 1: 1-methylcyclopropanecarboxylic acid (10 mg, 0.10 mol) and N,O-dimethylhydroxylamine hydrochloride (14.6 g, 0.15 mol) were added to DMF (80 mL), and HATU (45.6 g, 0.12 mol) and DIEA (50 mL, 0.30 mol) were added in sequence, and the reaction solution was placed at the room temperature overnight. EA (500 mL) was added. An obtained organic phase was washed with 1 N hydrochloric acid (100 mL×2) and a saturated sodium chloride solution (50 mL×2), dried with anhydrous sodium sulfate, and filtered, an obtained filtrate was concentrated under reduced pressure, and an obtained residue was purified by silica gel column chromatography using an eluent system (PE/EA=I/O to 1/1) to obtain a compound V2-1 (11.3 g, a pale yellow oily substance) with a yield of 79%. MS m/z (ESI): 144.1 [M+1].

At step 2: the compound V2-1 (14.5 g, 101 mmol) was dissolved in diethyl ether (90 mL), the reaction solution was cooled to −78° C., and 1 M diisobutylaluminium hydride (152 mL, 152 mmol) was slowly added dropwise. The reaction solution was placed at −78° C. for 2 h, 1 M HCl (16 mL) was added to quench the reaction, and after the reaction solution was heated to 0° C., 1 M HCl (16 mL) was added again. The obtained solution was dried with anhydrous sodium sulfate (70 g) and filtered to obtain a compound V2-2.

At step 3: lithium chloride (6.5 g, 153 mmol) was added to acetonitrile (60 mL), triethyl phosphonoacetate (24.5 mL, 122 mmol) and DBU (18.1 mL, 121 mmol) were added in sequence, after the reaction solution was cooled to 0° C., the compound V2-2 (8.5 g) was added dropwise, and the reaction solution was placed at the room temperature overnight. Water (150 mL) was added, the mixture was extracted with EA (150 mL×3), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=I/O—10/1) to obtain a compound V2-3 (10.5 g, a colorless oily liquid) with a yield of 68%. MS m/z (ESI): 155.0 [M+1].

At step 4: the compound V2-3 (10.5 g, 0.068 mol), pyrazole (9.3 g, 0.137 mol), and potassium carbonate (18.8 g, 0.136 mol) were added to DMF (50 mL), and the reaction solution was placed at 65° C. for 45 h. The reaction solution was cooled to the room temperature, EA (300 mL) was added, an obtained organic phase was washed with water (100 mL) and a saturated sodium chloride solution (100 mL×2), dried with anhydrous sodium sulfate, and filtered, an obtained filtrate was concentrated under reduced pressure, and an obtained residue was purified by silica gel column chromatography using eluents (PE/EA=I/O to 5/1) to obtain a compound V2-4 (12.3 g, a colorless oily liquid) with a yield of 82%. MS m/z (ESI): 223.1 [M+1].

At step 5: the compound V2-4 (12.3 g, 55.3 mmol) was dissolved in a mixture of THF (50 mL) and methanol (20 mL), lithium hydroxide monohydrate (3.6 g, 85.7 mmol) and water (30 mL) were added, and the reaction solution was stirred at the room temperature for 2 h. A 6 M hydrochloric acid solution was added to adjust a pH value of the reaction solution to 3, an organic solvent was removed by spinning under reduced pressure, an obtained aqueous phase was extracted with DCM (100 mL×3), obtained organic phases were combined, a combined organic phase was dried with anhydrous sodium sulfate and filtered, an obtained filtrate was concentrated under reduced pressure, and an obtained residue was purified by preparative liquid chromatography to obtain a compound V2-5 (9.2 g, a colorless oily liquid) with a yield of 86%. MS m/z (ESI): 195.0 [M+1].

At step 6: the compound V2-5 (3.05 g, 15.7 mmol) was dissolved in THF (80 mL), the reaction solution was cooled to −78° C., 2.5 M n-butyllithium (15.7 mL, 39.3 mmol) was slowly added dropwise, and the reaction solution reacted at −78° C. for 0.5 h and reacted at −45° C. for 1 h. A saturated ammonium chloride solution (30 mL) was added to quench the reaction, the reaction solution was extracted with EA (50 mL×4), obtained organic phases were combined, a combined organic phase was dried with anhydrous sodium sulfate and filtered, an obtained filtrate was concentrated under reduced pressure, and an obtained residue was purified by silica gel column chromatography using eluents (PE/EA=I/O to 3/1) to obtain a compound V2 (460 mg, a colorless oily liquid) with a yield of 16.7%. MS m/z (ESI): 177.0 [M+1].

Intermediate V3

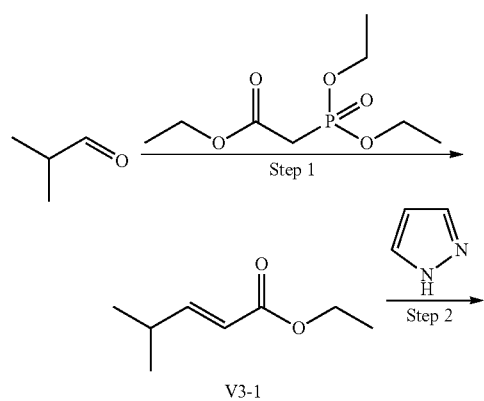

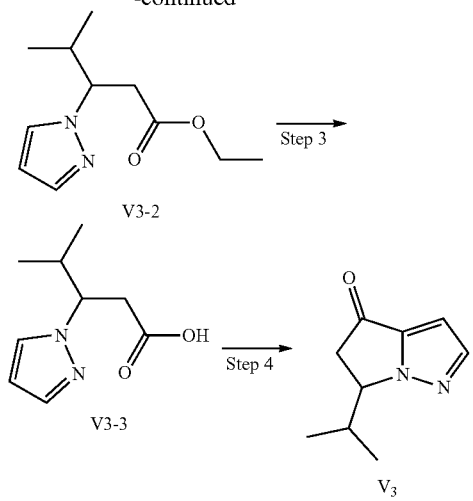

At step 1: triethyl phosphonoacetate (476 mL, 2.4 mol), DBU (365 g, 2.4 mol), lithium chloride (127 g, 3 mol), and acetonitrile (1.2 L) were added to a 3 L single-neck flask, and the reaction solution was stirred at the room temperature for 20 min under the protection of argon gas. The reaction solution was cooled to 0° C. (inner temperature), and isobutyraldehyde (144 g, 2 mol) was slowly added dropwise. The reaction solution was stirred at the room temperature for 12 h. After LCMS monitored that the reaction process was completed, the reaction solution was filtered, and an obtained filter cake was washed with EA (100 mL×2). Water (1 L) was added, followed by extraction with EA (1.5 L×2), washing with saturated sodium chloride, drying with anhydrous sodium sulfate, and drying by spinning, to obtain a compound V3-1 (175 g, a colorless liquid).

At step 2: DMF (1 L) was added to a 3 L single-neck flask in which the compound V3-1 (300 g, 2.1 mol) was placed, potassium carbonate (579 g, 4.2 mol) and pyrazole (287 g, 4.2 mol) were added while stirring, the reaction solution was stirred at 65° C. for 18 h, after LCMS monitored that the reaction process was completed, the reaction solution was directly dried by spinning, an obtained solid residue was mixed with acetonitrile (150 mL) to form a slurry, and the slurry was filtered to obtain a white solid. The white solid was filtered, and an obtained filter cake was washed with EA (500 mL×2), followed by washing with a saturated saline solution (300 mL×3), drying with anhydrous sodium sulfate, and drying by spinning, and purification by column chromatography (the mobile phase was PE containing 5% EA) to obtain a compound V3-2 (258 g, a colorless liquid) with a yield of 58%. MS m/z (ESI): 211.1 [M+1].

At step 3: water (200 mL) was added to potassium hydroxide (133 g, 3.32 mol) for dissolution, and the aqueous solution was pre-cooled to 5° C. The compound V3-2 (465 g, 2.21 mol), methanol (0.5 L), and THF (0.5 L) were added to a 3 L flask, the pre-cooled aqueous solution of potassium hydroxide was added, the reaction solution was stirred for 2 h, concentrated hydrochloric acid was added to adjust a pH value of the reaction solution to about 3, the reaction solution was extracted with DCM (800 mL×2), all obtained organic phases were combined, a combined organic phase was washed with a saturated saline solution, dried, and concentrated to obtain a compound V3-3 (410.5 g, a white solid) with a yield of 100%. MS m/z (ESI): 183.1 [M+1].

At step 4: under the protection of nitrogen gas, the compound V3-3 (10.2 g, 0.055 mol) and THF (200 mL) were added to a three-neck flask (500 mL), and the reaction solution was cooled to −75° C. A THF solution of 2.5 M n-butyllithium (55 mL, 0.137 mol) was slowly added dropwise, and after the dropwise addition was completed, the reaction solution was slowly heated to −10° C. and stirred again for 3 h. Saturated ammonium chloride was added to quench the reaction, water (100 mL) was added, the reaction solution was extracted with EA (400 mL×2), obtained organic phases were combined, a combined organic phase was washed with a saturated saline solution, dried, and concentrated to obtain a brown liquid. The brown liquid was purified by column chromatography (the mobile phase was PE containing 30% EA) to obtain a compound V3 (4 g, a white solid) with a yield of 22.2%. MS m/z (ESI): 165.1 [M+1].

Intermediate V4

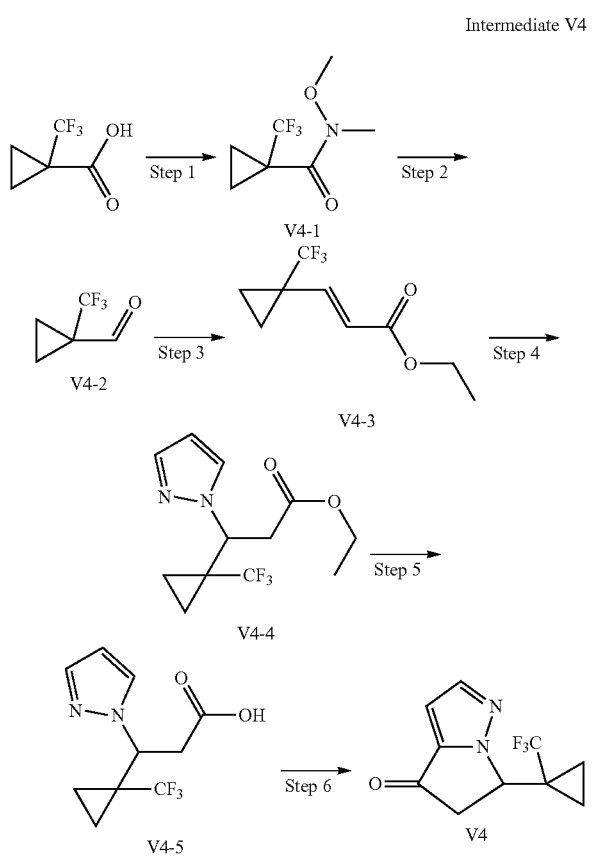

At step 1: 1-(trifluoromethyl)cyclopropane-1-carboxylic acid (6.8 g, 44 mmol) was dissolved in a DMF solution (100 mL), a solution of dimethylhydroxylamine hydrochloride (5.14 g, 53 mmol), HATU (25 g, 66 mmol), and triethylamine (13.3 g, 132 mmol) was added, and the reaction solution was stirred at the room temperature overnight. EA (400 mL) was added, followed by washing with a saturated sodium bicarbonate solution and drying with anhydrous sodium sulfate, the obtained organic phase was concentrated under reduced pressure, and an obtained residue was purified by thin layer chromatography using eluents (PE: EA=1: 1) to obtain a compound V4-1 (8 g) with a yield of 92%. MS m/z (ESI): 198.1 [M+1].

At step 2: the compound V4-1 (8 g, 4.06 mmol) was dissolved in a THF solution (100 mL), DIBAL-H (1.0 M, 60 mL, 6.1 mmol) was added at −78° C., and the reaction solution was stirred at −78° C. for 1 h. Sodium sulfate decahydrate was added, the obtained solution was stirred for 30 min and filtered, an obtained filtrate was concentrated under reduced pressure to obtain a compound V4-2.

At step 3: the compound V4-2 (5.6 g, 40.6 mmol) was dissolved in an acetonitrile solution (100 mL), ethyl diethoxyphosphinylformate (13.64 g, 60.9 mmol), DBU (12.34 g, 81.2 mmol), and lithium chloride (3.4 g, 81.2 mmol) were added, and the reaction solution was stirred at the room temperature overnight. EA (300 mL) was added, followed by washing with a saturated saline solution, and drying with anhydrous sodium sulfate, the obtained organic phase was concentrated under reduced pressure, and an obtained residue was purified by thin layer chromatography using eluents (PE: EA=2: 1) to obtain a compound V4-3 (4 g) with a yield of 47%. MS m/z (ESI): 209.1 [M+1].

At step 4: pyrazole (2.61 g, 38.5 mmol) was dissolved in a DMF solution (100 mL), the compound V4-3 (4 g, 19.2 mmol) and potassium carbonate (7.95 g, 57.6 mmol) were added, and the reaction solution was stirred at 60° C. overnight. EA (300 mL) was added, followed by washing with a saturated sodium bicarbonate solution and drying with anhydrous sodium sulfate, an obtained organic phase was concentrated under reduced pressure, and an obtained residue was purified by thin layer chromatography using eluents (PE: EA=1: 1) to obtain a compound V4-4 (3.3 g) with a yield of 62%. MS m/z (ESI): 277.1 [M+1].

At step 5: the compound V4-4 (3.3 g, 12 mmol) was dissolved in a solution of methanol (20 mL) and water (5 mL), lithium hydroxide (0.55 g, 24 mmol) was added, and the reaction solution was stirred at the room temperature for 2 h. A hydrochloric acid solution (3 N) was added to adjust a pH value of the reaction solution to 2, the reaction solution was extracted with a mixture of DCM and methanol (10/1), an obtained organic phase was distilled under reduced pressure, and an obtained residue was purified by preparative liquid chromatography to obtain a compound V4-5 (1.8 g) with a yield of 61%. MS m/z (ESI): 249.1 [M+1].

At step 6: the compound V4-5 (1.8 g, 7.26 mmol) was dissolved in a THF solution (30 mL), a n-butyllithium solution (2.5 M, 7.3 mL, 18.1 mmol) was added at −78° C., and the reaction solution was stirred at −20° C. for 30 min. An aqueous solution of sodium chloride was added, the solution was extracted with EA, an obtained organic phase was concentrated under reduced pressure, and an obtained residue was purified by thin layer chromatography using eluents (PE: EA=1: 2) to obtain a compound V4 (700 mg) with a yield of 42%. MS m/z (ESI): 231.1 [M+1].

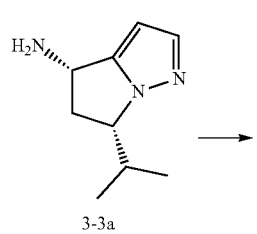

Compound V5

3-3a

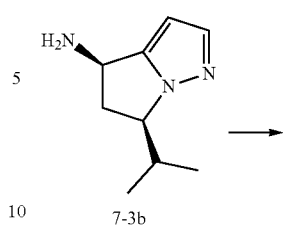

Compound V6

7-3b

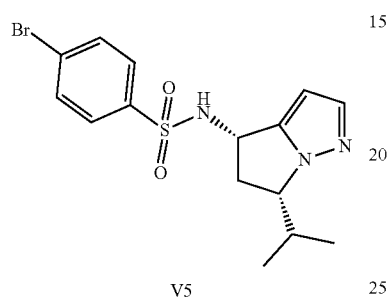

V5

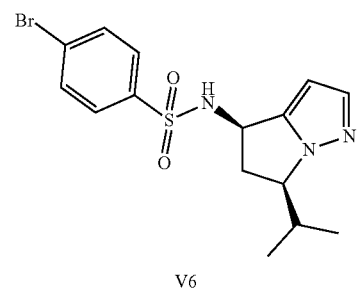

V6

The compound 3-3a (0.11 g, 0.67 mmol) was dissolved in dichloromethane (8 mL), triethylamine (0.2 g, 2 mmol) and 4-bromobenzenesulfonyl chloride (0.204 g, 0.804 mmol) were added at 0° C., the reaction solution was stirred at 0° C. for 1 h, dichloromethane (10 mL) was added, an obtained solution was washed with a saturated sodium chloride solution, dried with anhydrous sodium sulfate, and concentrated under reduced pressure, and an obtained residue was purified by preparative liquid chromatography to obtain 4-bromo-N-((4S,6S)-6-isopropyl-5,6-dihydro-4H-pyrrolo[1,2-b]pyrazol-4-yl)benzenesulfonamide (compound V5, 0.06 g, a white solid) with a yield 23.3%. MS m/z (ESI): 384.1 [M+1].

Preparation of single crystals of the compound V5: a small amount of compound V5 was placed into a small beaker, ethyl acetate was added for dissolution, the small beaker was sealed with a thin film, and the film was poked to form some small holes. Petroleum ether was placed into a big breaker, the small breaker was placed into the big breaker, the big breaker was sealed and placed at the room temperature for crystallization, and crystals were precipitated from the solution. Single crystal X-ray analysis was performed on the crystals by using a Bruker D8 VENTURE single crystal X-ray diffraction instrument, and it was determined that the absolute configuration of the crystals was the (4S, 6S) configuration. The structure is shown in FIG. 1. Therefore, based on the structure of the single crystals of the compound V5, it was determined that the absolute configuration of the compound 3-3a was the (4S, 6S) configuration.

Instrument parameters

| | |
|---|---|
| Light source: Mo target | Current and voltage: 50 kV, 1.4 mA |
| X-ray: Mo—K (=0.71032 Å) | Exposure time: 3 s |
| Detector: CMOS area detector | Distance between the area detector and a sample: 50 mm |
| Resolution: 0.80 Å | Test temperature: 170 (2) K |

A compound V6 was prepared with reference to the preparation method of the compound V5. MS m/z (ESI): 384.1 [M+1].

Figure 2:
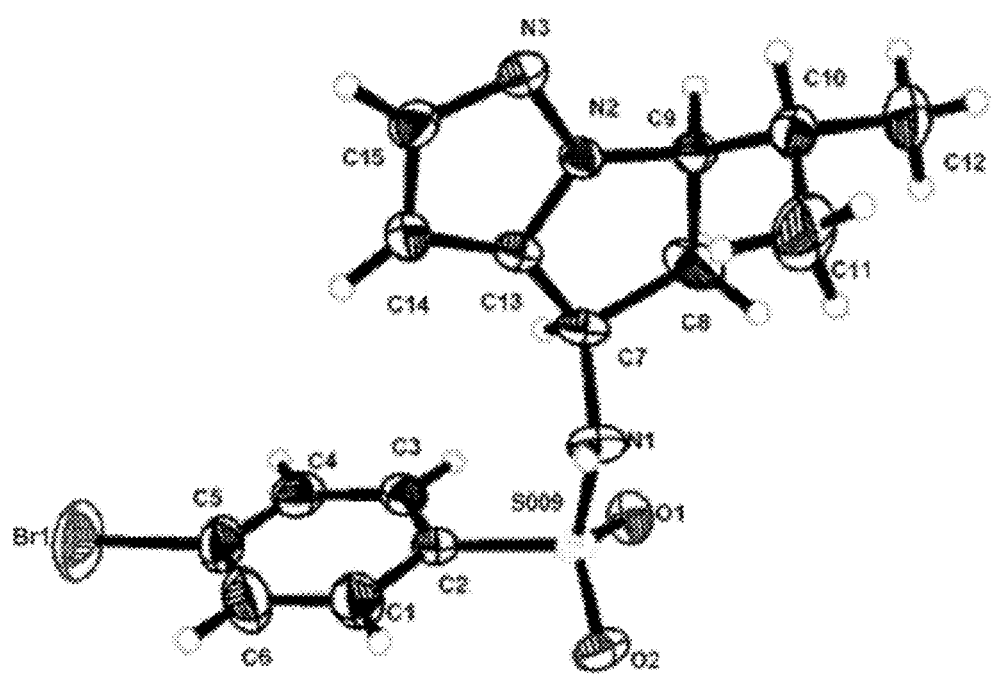
FIG. 2 is a structural diagram of single crystals of Compound V6.

Preparation of single crystals of the compound V6: a small amount of compound V6 was placed into a small beaker, ethyl acetate was added for dissolution, the small beaker was sealed with a thin film, and the film was poked to form some small holes. Petroleum ether was placed into a big breaker, the small breaker was placed into the big breaker, the big breaker was sealed and placed at the room temperature for crystallization, and crystals were precipitated from the solution. Single crystal X-ray analysis was performed on the crystals by using the Bruker D8 VENTURE single crystal X-ray diffraction instrument, and it was determined that the absolute configuration of the crystals was the (4R, 6R) configuration. The structure is shown in FIG. 2.

Instrument Parameters

| | |
|---|---|
| Light source: Mo target | Current and voltage: 50 kV, 1.4 A |
| X-ray: Mo—K (=0.71073 Å) | Exposure time: 5 s |
| Detector: CMOS area detector | Distance between the area detector and a sample: 40 mm |
| Resolution: 0.80 Å | Test temperature: 180 (2) K |

Example 1

(4S,6S)-6-tert-butyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-1a) and (4S,6R)-6-tert-butyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-1b)

chromatography (PE/EA=4/1) to obtain a compound 1-1 (1.26 g, a yellow solid) with a yield of 85%. MS m/z (ESI): 284.1 [M+1].

At step 2: the compound 1-1 (0.8 g) was purified by preparative chromatography (preparation conditions: preparative column: 21.2×250 mm C18 column; system: 10 mM NH$_4$HCO$_3$H$_2$O; wavelengths: 254/214 nm; gradients: 30%-60% changes in acetonitrile) to obtain a product 1-2a

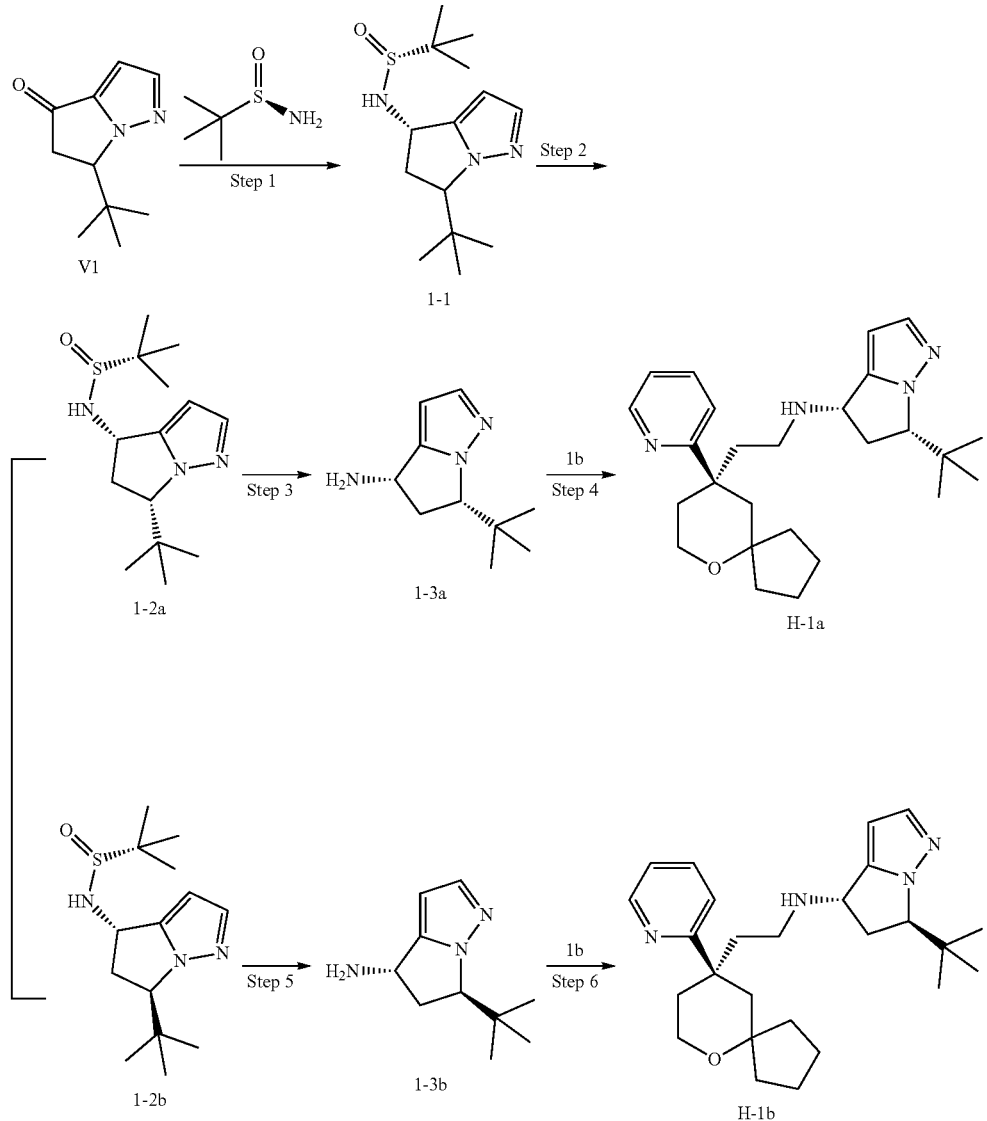

At step 1: the compound V1 (1 g 5.6 mmol) and (R)-2-methylpropane-2 sulfinamide (1 g, 8.4 mmol) were dissolved in toluene (70 mL), titanium isopropoxide (3 mL) was added, and the reaction solution was stirred at 120° C. for 1 h. The reaction solution was cooled to the room temperature, water (10 mL) was added, the mixture was stirred for 20 min and filtered, sodium borohydride (425 mg, 11.2 mmol) was added to an obtained filtrate, the mixture was stirred for 0.5 h, water (5 mL) was added to the reaction solution, the solution was stirred for 0.5 min and filtered, an obtained filtrate was concentrated under reduced pressure, and an obtained residue was purified by silica gel column with a single configuration (340 mg, the retention time was 9.5 min) and a product 1-2b with a single configuration (300 mg, the retention time was 10.5 min), respectively.

At step 3: the compound 1-2a (0.3 g, 1 mmol) was dissolved in DCM (15 mL), a 4 M dioxane hydrochloride solution was added, and the reaction solution was stirred at the room temperature for 1 h. The reaction solution was concentrated to obtain a compound 1-3a (179 mg, a yellow solid) with a yield of 100%. MS m/z (ESI): 180.1 [M+1].

At step 4: the compound 1-3a (179 mg, 1 mmol) and the compound 1b (259 mg, 1 mmol) were dissolved in methanol (30 mL), and the reaction solution was stirred at the room temperature for 1 h. Sodium cyanoborohydride (248 mg, 4 mmol) was added, the reaction solution was stirred for 5 h, water (5 mL) was added, the mixture was stirred for 0.5 min and filtered, an obtained filtrate was concentrated under reduced pressure, and an obtained residue was purified by preparative chromatography (preparation conditions: preparative column: 21.2×250 mm C18 column; system: 10 mM NH₄HCO₃H₂O; wavelengths: 254/214 nm; gradients: 30%-60% changes in acetonitrile) to obtain a compound H-1a with a single configuration (110 mg, a white solid) with a yield of 31%. MS m/z (ESI): 423.2 [M+1]; ¹H NMR (400 MHz, DMSO-d6) δ 8.52-8.50 (m, 1H), 7.70-7.68 (m, 1H), 7.45-7.42 (m, 1H), 7.30 (d, J=1.8 Hz, 1H), 7.17-7.15 (m, 1H), 5.71 (d, J=1.7 Hz, 1H), 3.85-3.81 (m, 2H), 3.57-3.55 (m, 2H), 2.57-2.55 (m, 1H), 2.46-2.38 (m, 2H), 2.32-2.30 (m, 1H), 2.01-1.88 (m, 1H), 1.91-1.63 (m, 4H), 1.67-1.21 (m, 9H), 0.91 (s, 9H), 0.62-0.59 (m, 1H).

8.51-8.48 (m, 1H), 7.71-7.69 (m, 1H), 7.45-7.43 (m, 1H), 7.29 (d, J=1.8 Hz, 1H), 7.18-7.16 (m, 1H), 5.64 (d, J=1.8 Hz, 1H), 3.83-3.81 (m, 2H), 3.58 (d, J=3.0 Hz, 2H), 2.54-2.51 (m, 1H), 2.45-2.26 (m, 3H), 1.99-1.97(m, 1H), 1.89-1.64 (m, 4H), 1.65-1.23 (m, 9H), 0.91 (s, 9H), 0.58-0.56 (m, 1H).

Example 2

(4S,6S)-6-(1-methylcyclopropyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-2a) and (4S,6R)-6-(1-methylcyclopropyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-2b)

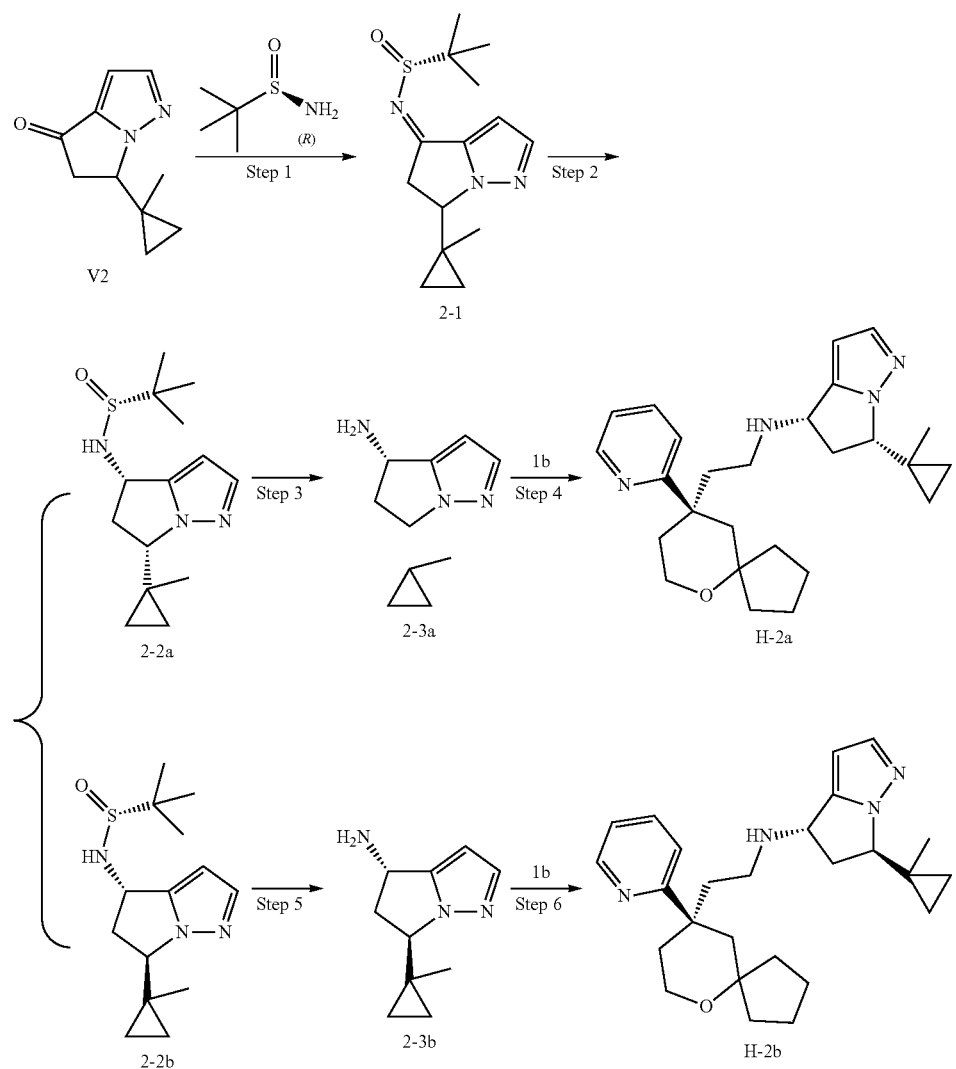

At step 5: a compound 1-3b was prepared from the compound 1-2b with reference to the preparation method of step 3.

At step 6: a compound H-1b (110 mg, a white solid) was prepared from the compound 1-3b with reference to the preparation method of step 4, with a yield of 31%. MS m/z (ESI): 423.2 [M+1]; ¹H NMR (400 MHz, DMSO-d6) δ

At step 1: the compound V2 (460 mg, 2.61 mmol) and (R)-2-methylpropane-2-sulfinamide (475 mg, 3.92 mmol) were added to toluene (20 mL), titanium ethoxide (2 mL, 9.54 mmol) was added, and the reaction solution was stirred at 120° C. for 2 h. water (5 mL) was added to quench the reaction, the reaction solution was filtered, an obtained filtrate was concentrated under reduced pressure, and an obtained residue was purified by silica gel column chromatography using eluents (PE/EA=1/0 to 1/1) to obtain a compound 2-1 (612 mg, a yellow oily liquid) with a yield of 84%. MS m/z (ESI): 280.1 [M+1].

At step 2: the compound 2-1 (612 mg, 2.19 mmol) was added to methanol (50 mL). After the mixture was cooled to 0° C., sodium borohydride (166 mg, 4.39 mmol) was added, the reaction solution was stirred at the room temperature for 2 h. The reaction solution was concentrated under reduced pressure, and an obtained residue was purified by preparative liquid chromatography (preparative column: 21.2×250 mm C18 column; system: 10 mM $NH_4HCO_3$ H2O; wavelengths: 254/214 nm; gradients: 30%-60% changes in acetonitrile) to obtain a single isomer 2-2a (254 mg, a colorless oily liquid, the retention time was 9 min) with a yield of 41% and a single isomer 2-2b (242 mg, a colorless oily liquid, the retention time was 10 min) with a yield of 39%, respectively. MS m/z (ESI): 282.1 [M+1].

At step 3: the compound 2-2a (254 mg, 0.90 mmol) was added to methanol (20 mL). A 1,4-dioxane solution of 4 M hydrochloric acid (4.5 mL, 18 mmol) was added, and the reaction solution was stirred at the room temperature for 1 h. The reaction solution was concentrated under reduced pressure, a saturated sodium bicarbonate solution (30 mL) was added, the mixture was extracted with a mixture of DCM and methanol (15: 1) (50 mL×4), obtained organic phases were combined, a combined organic phases was dried with anhydrous sodium sulfate and filtered, and an obtained filtrate was concentrated under reduced pressure to obtain a single isomeric compound 2-3a (151 mg, a pale yellow oily liquid) with a yield of 94%. MS m/z (ESI): 178.1 [M+1].

At step 4: the compound 2-3a (151 mg, 0.85 mmol), the compound 1b (243 mg, 0.94 mmol), and sodium cyanoborohydride (268 mg, 4.26 mmol) were added to methanol (20 mL). The reaction solution reacted at 40° C. for 4 h and stirred at the room temperature overnight. The reaction solution was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-2a (186.25 mg, a white solid) with a yield of 52%. MS m/z (ESI): 421.1 [M+1]; $^1H$ NMR (400 MHz, $CD_3OD$) δ 8.53-8.48 (m, 1H), 7.79-7.72 (m, 1H), 7.50 (d, J=8.1 Hz, 1H), 7.43 (d, J=1.8 Hz, 1H), 7.24-7.21 (m, 1H), 5.89 (dd, J=1.9, 0.7 Hz, 1H), 4.02 (t, J=7.8 Hz, 1H), 3.77-3.71 (m, 2H), 3.49 (t, J=7.8 Hz, 1H), 2.81-2.73 (m, 1H), 2.70-2.59 (m, 1H), 2.53 (d, J=11.7 Hz, 1H), 2.41 (dd, J=13.7, 1.9 Hz, 1H), 2.11-2.00 (m, 3H), 1.91 (d, J=13.8 Hz, 1H), 1.77-1.38 (m, 8H), 1.13-1.06 (m, 1H), 0.84 (s, 3H), 0.76-0.69 (m, 2H), 0.60-0.55 (m, 1H), 0.51-0.42 (m, 1H), 0.38-0.29 (m, 1H).

At step 5: the compound 2-2b (242 mg, 0.86 mmol) was added to methanol (20 mL). A 1,4-dioxane solution of 4 M hydrochloric acid (4.3 mL, 17.2 mmol) was added, and the reaction solution was stirred at the room temperature for 1 h. The reaction solution was concentrated under reduced pressure, a saturated sodium bicarbonate solution (30 mL) was added, the mixture was extracted with a mixture of DCM and methanol (15:1) (50 mL×4), obtained organic phases were combined, a combined organic phase was dried with anhydrous sodium sulfate and filtered, and an obtained filtrate was concentrated under reduced pressure to obtain a single isomeric compound 2-3b (151 mg, a pale yellow oily liquid) with a yield of 99%. MS m/z (ESI): 178.1 [M+1].

At step 6: the compound 2-3b (151 mg, 0.85 mmol), the compound 1b (243 mg, 0.94 mmol), and sodium cyanoborohydride (267 mg, 4.25 mmol) were added to methanol (10 mL). The reaction solution reacted at 40° C. for 4 h and stirred at the room temperature overnight. The reaction solution was concentrated under reduced pressure, and an obtained residue was purified by preparative liquid chromatography (preparative column: 21.2×250 mm C18 column; system: 10 mM $NH_4HCO_3H_2O$; wavelengths: 254/214 nm; gradients: 30%-60% changes in acetonitrile) to obtain a compound H-2b (215.62 mg, a white solid) with a yield of 60%. MS m/z (ESI): 421.1 [M+1]; NMR (400 MHz, $CD_3OD$) δ 8.54-8.49 (m, 1H), 7.78-7.74 (m, 1H), 7.51 (d, J=8.1 Hz, 1H), 7.42 (d, J=1.9 Hz, 1H), 7.25-7.22 (m, 1H), 5.91-5.80 (m, 1H), 4.02 (t, J=7.8 Hz, 1H), 3.82-3.66 (m, 2H), 3.49 (t, J=7.8 Hz, 1H), 2.79-2.72 (m, 1H), 2.63-2.47 (m, 2H), 2.41 (dd, J=13.7, 1.9 Hz, 1H), 2.16-1.97 (m, 3H), 1.91 (d, J=13.8 Hz, 1H), 1.79-1.35 (m, 9H), 1.12-1.06 (m, 1H), 0.83 (s, 3H), 0.74-0.69 (m, 2H), 0.61-0.53 (m, 1H), 0.49-0.44 (m, 1H), 0.38-0.29 (m, 1H).

Example 3

(4S,6S)-6-isopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-3a) and (4S,6R)-6-isopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-3b)

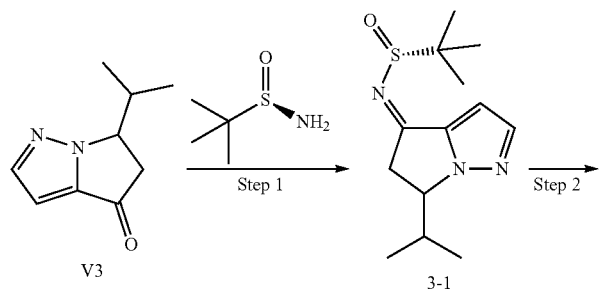

-continued

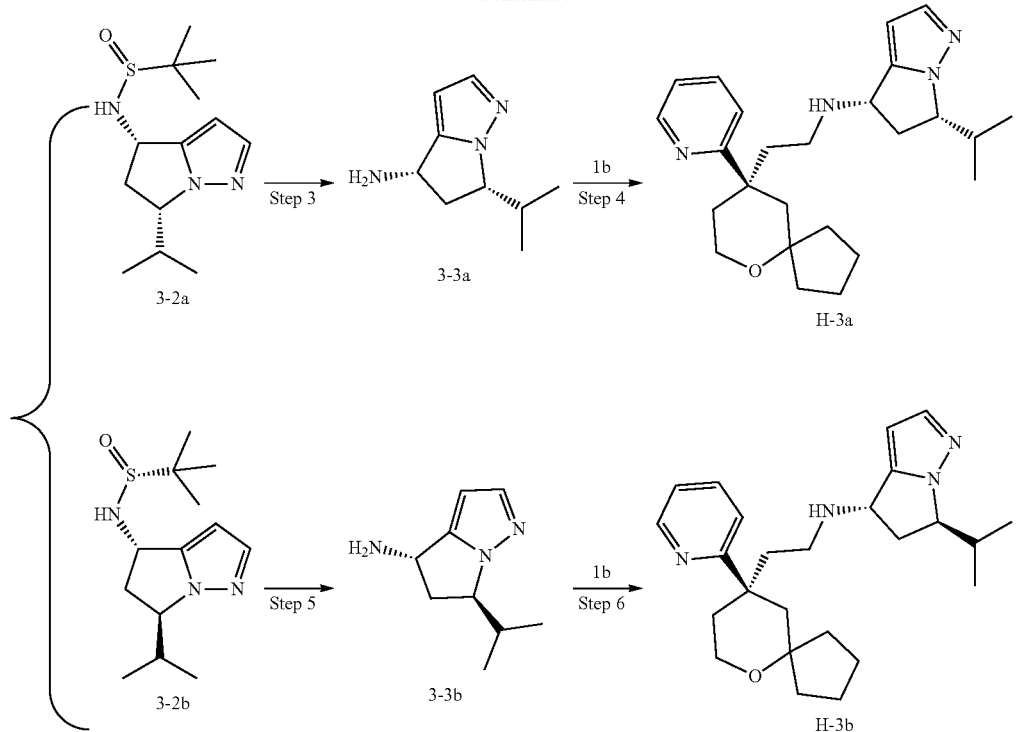

At step 1: the compound V3 (17 g, 103.5 mmol) was dissolved in toluene (250 mL), (R)-2-methylpropane-2-sulfinamide (18.8 g, 155 mmol) and titanium isopropoxide (117 g, 414 mmol) were added, and the reaction solution was stirred at 110° C. for 16 h. The reaction solution was cooled to the room temperature, water (80 mL) was added, DCM (600 mL) was added, the mixture was filtered, an obtained filter cake was washed with DCM (100 mL) and stratificated, an obtained organic phase was washed with a saturated saline solution (100 mL), dried with anhydrous sodium sulfate, and concentrated under reduced pressure, and an obtained concentrate was purified by column chromatography (the mobile phase was PE containing 30% EA) to obtain a compound 3-1 (20.3 g, a brown liquid) with a yield of 73.5%. MS m/z (ESI): 268.1 [M+1].

At step 2: the compound 3-1 (0.39 g, 1.45 mmol) and methanol (5 mL) were added into a single-neck flask, the mixture was cooled to 0° C., and sodium borohydride (0.11 g, 2.9 mmol) was slowly added. The reaction solution was stirred at the room temperature for 1.5 h. After the reaction solution was cooled to 0° C., ice water (20 mL) was added, and the mixture was extracted with DCM (50 mL×2). A combined organic phase was washed with a saturated saline solution (20 mL), dried with anhydrous sodium sulfate, and dried by spinning, and an obtained residue was purified by preparative chromatography (preparative column: 21.2×250 mm C18 column; system: 10 mM $NH_4HCO_3H_2O$; wavelengths: 254/214 nm; gradients: 28%-30% changes in acetonitrile) to obtain a single diastereoisomeric compound 3-2a (150 mg, a white solid, the retention time was 9.5 min) with a yield of 38.4%: MS m/z (ESI):270.0 [M+1], and a single diastereoisomeric compound 3-2b (100 mg, a white solid, the retention time was 10.5 min) with a yield of 25.6%: MS m/z (ESI):270.0 [M+1].

At step 3: the compound 3-2a (120 mg, 0.45 mmol) and methanol (3 mL) were added into a single-neck flask, the mixture was cooled to 0° C., and a hydrogen chloride-methanol solution (1.2 mL, 4.5 mmol, 4 mol/L) was slowly added. The reaction solution was stirred at the room temperature for 1.5 h. Saturated sodium bicarbonate was added to adjust a pH value of the reaction solution to about 8, the mixture was extracted with DCM (50 mL×2), all obtained organic phases were combined, a combined organic phase was washed with a saturated saline solution, dried, and concentrated to obtain a compound 3-3a (70 mg, a yellow liquid) with a yield of 95.12%. MS m/z (ESI): 166.1 [M+1].

At step 4: the compound 3-3a (50 mg, 0.3 mmol) was dissolved in methanol (5 mL), the compound 1b (78.3 mg, 0.3 mmol), and sodium cyanoborohydride (94 mg, 1.5 mmol) were added, and the reaction solution was stirred at 20° C. for 3 h. Water (20 mL) was added, the mixture was extracted with DCM (30 mL×2), a combined organic phase was dried with anhydrous sodium sulfate and concentrated under reduced pressure, and an obtained concentrate was purified by preparative chromatography (preparative column: 21.2×250 mm C18 column; system: 10 mM $NH_4HCO_3$ H2O; wavelengths: 254/214 nm; gradients: 30%-60% changes in acetonitrile) to obtain a compound H-3a with a single configuration (10.12 mg, a white solid) with a yield of 8.26%. The absolute configuration of the compound H-3a was determined by inferring based on the absolute configuration of the compound V5. MS m/z (ESI):409.2 [M+1]; $^1$H NMR (400 MHz, $CD_3OD$) δ 8.51 (ddd, J=4.9, 1.8, 0.8 Hz, 1H), 7.79-7.71 (m, 1H), 7.50 (d, J=8.1 Hz, 1H), 7.41 (d, J=1.9 Hz, 1H), 7.22 (ddd, J=7.5, 4.9, 1.0 Hz, 1H), 5.87 (dd, J=1.9, 0.6 Hz, 1H), 4.07 (ddd, J=21.0, 11.7, 6.2 Hz, 2H), 3.81-3.69 (m, 2H), 2.73-2.58 (m, 2H), 2.52 (dd, J=14.0, 2.3 Hz, 1H), 2.48-2.35 (m, 2H), 2.12-1.97 (m, 2H), 1.95-1.82 (m, 2H), 1.78-1.65 (m, 3H), 1.64-1.36 (m, 5H), 1.14-1.04 (m, 1H), 0.99 (d, J=7.0 Hz, 3H), 0.79-0.65 (m, 4H).

At step 5: the compound 3-2b (100 mg, 0.37 mmol) and methanol (3 mL) were added into a single-neck flask, the mixture was cooled to 0° C., and a hydrogen chloride-methanol solution (0.93 mL, 3.7 mmol, 4 mol/L) was slowly added. The reaction solution was stirred at the room temperature for 1.5 h. Saturated sodium bicarbonate was added to adjust a pH value of the reaction solution to about 8, the mixture was extracted with DCM (50 mL×2), all obtained organic phases were combined, a combined organic phase was washed with a saturated saline solution, dried, and concentrated to obtain a compound 3-3b (50 mg, a yellow liquid) with a yield of 81.2%. MS m/z (ESI): 166.1 [M+1].

At step 6: the compound 3-3b (50 mg, 0.3 mmol) was dissolved in methanol (5 mL), the compound 1b (78.3 mg, 0.3 mmol), and sodium cyanoborohydride (94 mg, 1.5 mmol) were added, and the reaction solution was stirred at 20° C. for 3 h. Water (20 mL) was added to the reaction solution, the mixture was extracted with DCM (30 mL×2), a combined organic phase was dried with anhydrous sodium sulfate and concentrated under reduced pressure, and an obtained concentrate was purified by preparative chromatography (preparative column: 21.2×250 mm C18 column; system: 10 mM NH$_4$HCO$_3$H$_2$O; wavelengths: 254/214 nm; gradients: 30%-60% changes in acetonitrile) to obtain a compound H-3b with a single configuration (30.01 mg, a white solid) with a yield of 24.5%. MS m/z (ESI):409.3 [M+1]; $^1$H NMR (400 MHz, CD$_3$OD) δ 8.59-8.52 (m, 1H), 7.79 (td, J=8.0, 1.9 Hz, 1H), 7.54 (d, J=8.1 Hz, 1H), 7.43 (d, J=1.8 Hz, 1H), 7.27 (ddd, J=7.4, 4.9, 0.9 Hz, 1H), 5.86 (dd, J=1.9, 0.7 Hz, 1H), 4.11 (ddd, J=15.3, 10.4, 6.3 Hz, 2H), 3.86-3.71 (m, 2H), 2.69 (dt, J=13.1, 7.8 Hz, 1H), 2.63-2.51 (m, 2H), 2.50-2.39 (m, 2H), 2.15 (td, J=11.4, 4.7 Hz, 1H), 2.09-1.98 (m, 1H), 1.91 (ddd, J=15.3, 13.5, 8.6 Hz, 2H), 1.83-1.38 (m, 8H), 1.16-1.08 (m, 1H), 1.02 (d, J=7.0 Hz, 3H), 0.81-0.64 (m, 4H).

Example 4

(4S,6S)-N-(2-((R)-9-(pyridin-2-yl)-6-oxaspiro[4.5]decan-9-yl)ethyl)-6-(1-(trifluoromethyl)cyclopropyl)-5,6-dihydro-4H-pyrrolo[1,2-b]pyrazol-4-amine (H-4a) and (4S,6R)-N-(2-((R)-9-(pyridin-2-yl)-6-oxaspiro[4.5]decan-9-yl)ethyl)-6-(1-(trifluoromethyl)cyclopropyl)-5,6-dihydro-4H-pyrrolo[1 2-b]pyrazol-4-amine (H-4b)

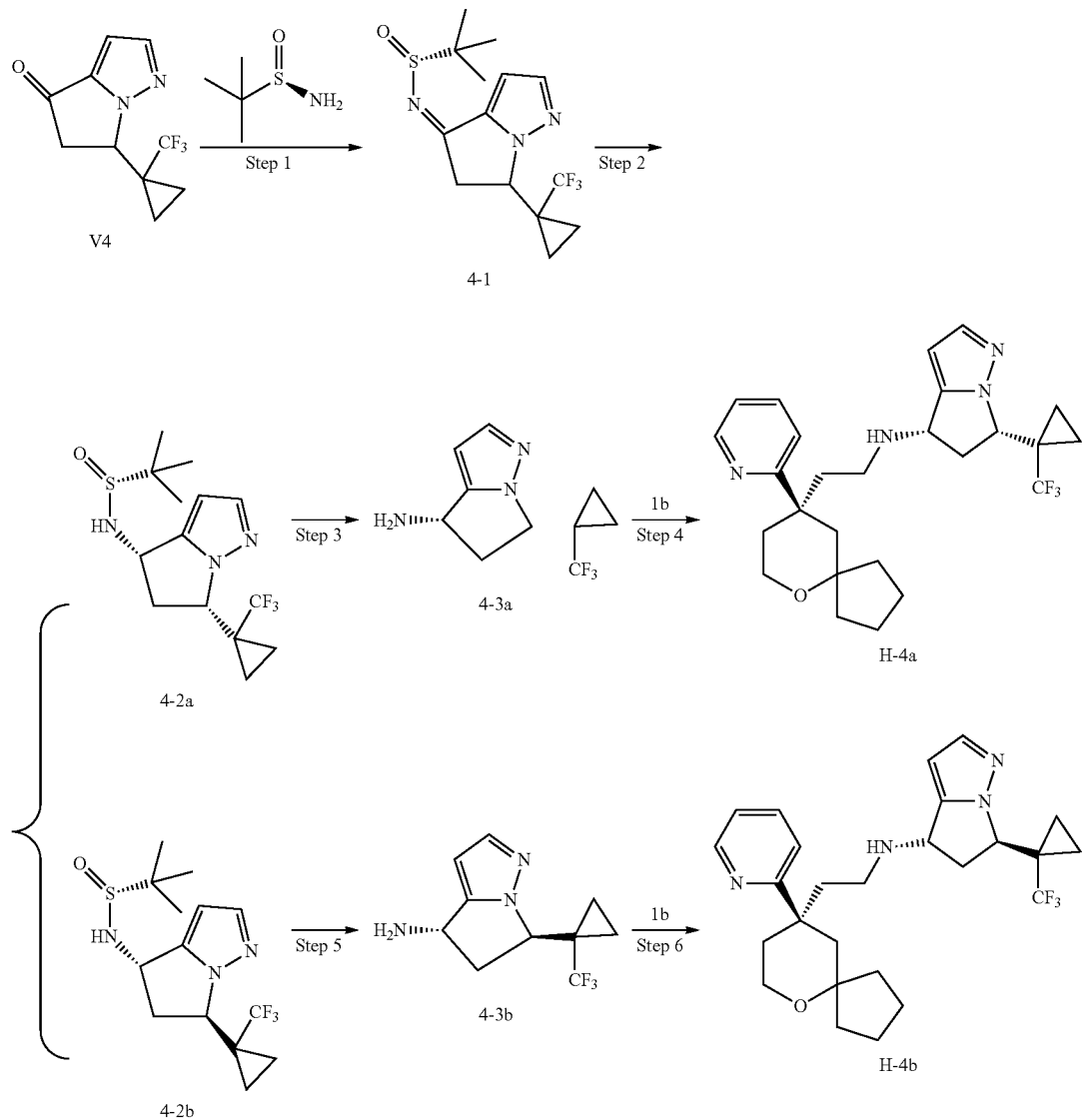

At step 1: the compound V4 (700 mg, 3.04 mmol) was dissolved in a toluene solution (10 mL), (R)-2-methylpropane-2-sulfinamide (442 mg, 3.65 mmol), and titanium isopropoxide (0.5 mL) were added, and the reaction solution was stirred at 120° C. for 2 h. An obtained organic phase was concentrated under reduced pressure, and an obtained residue was purified by thin layer chromatography using eluents (PE: EA=3: 7) to obtain a compound 4-1 (600 mg) with a yield of 49%. MS m/z (ESI): 334.1 [M+1].

At step 2: the compound 4-1 (600 mg, 1.8 mmol) was dissolved in a methanol solution (10 mL), sodium borohydride (205 mg, 5.4 mmol) was added at 0° C., and the reaction solution was stirred at the room temperature for 2 h. Water was added, the mixture was filtered, an obtained filtrate was concentrated under reduced pressure, and an obtained residue was purified by preparative liquid chromatography (preparation conditions: preparative column: 21.2× 250 mm C18 column; system: 10 mM $NH_4HCO_3H_2O$; wavelengths: 254/214 nm; gradients: 28%-30% changes in acetonitrile), to obtain a compound 4-2a with a single configuration (150 mg, the retention time was 8.5 min) with a yield of 25% and a compound 4-2b with a single configuration (150 mg, the retention time was 9.5 min) with a yield of 25%. MS m/z (ESI): 336.1 [M+1].

At step 3: the compound 4-2a (150 mg, 0.45 mmol) was dissolved in methanol (10 mL), a THF solution of hydrogen chloride (4 M, 2 mL) was added, and the reaction solution was stirred at the room temperature for 4 h. DCM (50 mL) was added, followed by washing with a saturated sodium bicarbonate solution and drying with anhydrous sodium sulfate, and the obtain organic phase was concentrated under reduced pressure to obtain a compound 4-3a (100 mg).

At step 4: the compound 1b (112 mg, 0.43 mmol) was dissolved in a methanol solution (10 mL), the compound 4-3a (100 mg, 0.43 mmol) and sodium cyanoborohydride (55 mg, 0.86 mmol) were added, and the reaction solution was stirred at 40° C. for 4 h. Water was added, the mixture was filtered, an obtained filtrate was concentrated under reduced pressure, and an obtained residue was purified by preparative liquid chromatography to obtain a compound H-4a (72.70 mg) with a yield of 36%. MS m/z (ESI): 475.1 [M+1]; $^1$H NMR (400 MHz, $CD_3OD$): δ 8.51-8.50 (m, 1H), 7.70-7.67 (m, 1H), 7.45-7.43 (d, J=8 Hz, 1H), 7.35 (s, 1H), 7.18-7.15 (m, 1H), 5.75 (d, J=1.2 Hz, 1H), 4.42-4.38 (t, J=8 Hz, 1H), 3.84-3.82 (m, 1H), 3.57-3.52 (m, 2H), 2.93-2.89 (m, 1H), 2.42-2.30 (m, 3H), 1.97-1.74 (m, 5H), 1.57-1.31 (m, 10H), 1.02-0.80 (m, 2H), 0.61-0.55 (m, 1H).

At step 5: a compound 4-3b was prepared from the compound 4-2b with reference to the preparation method of step 3.

At step 6: a compound H-4b (90.52 mg) was prepared from the compound 4-3b with reference to the preparation method of step 4, with a yield of 44%. MS m/z (ESI): 475.1 [M+1]; $^1$H NMR (400 MHz, $CD_3OD$): δ 8.51-8.49 (m, 1H), 7.72-7.68 (m, 1H), 7.44-7.42 (d, J=8 Hz, 1H), 7.34 (s, 1H), 7.18-7.16 (m, 1H), 5.70 (d, J=1.2 Hz, 1H), 4.41-4.37 (t, J=8 Hz, 1H), 3.86-3.84 (m, 1H), 3.58-3.56 (m, 2H), 2.90-2.87 (m, 1H), 2.32-2.29 (m, 3H), 2.00-1.74 (m, 5H), 1.64-1.30 (m, 9H), 0.97-0.90 (m, 3H), 0.81-0.78 (m, 1H).

Example 5

(4R,6S)-6-tert-butyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-5a) and (4R,6R)-6-tert-butyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-5b)

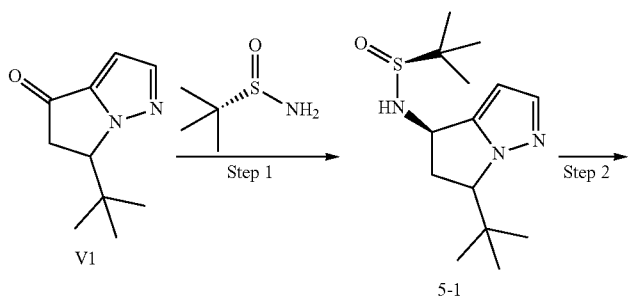

5-1

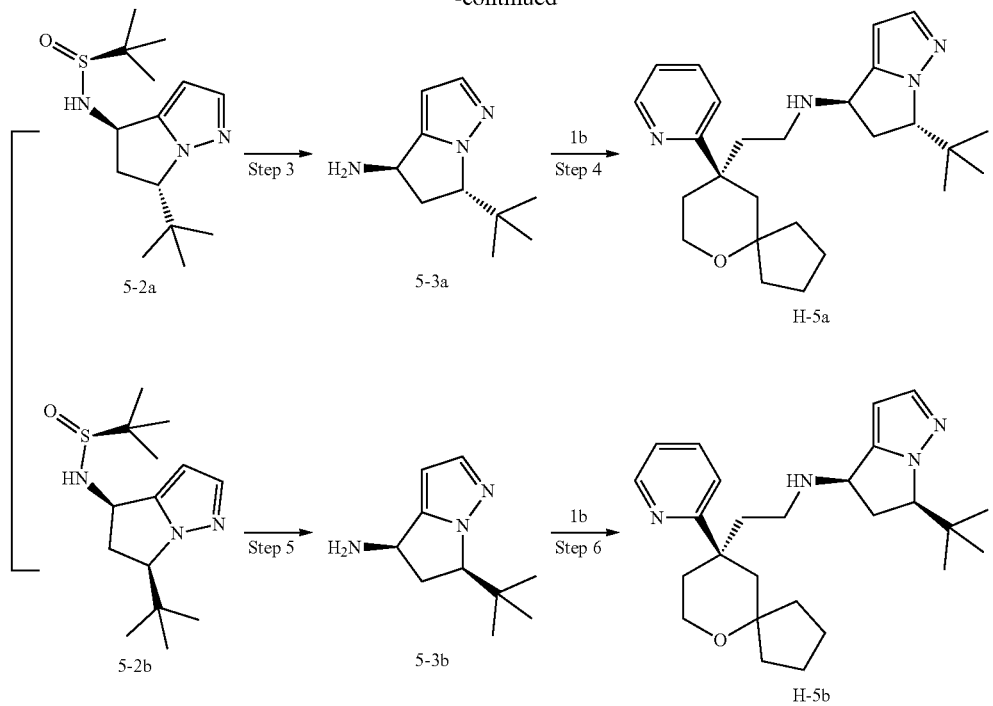

The two compounds were prepared with reference to the preparation methods of Example 1. A difference was that the compound (R)-2-methylpropane-2-sulfinamide was replaced with the compound (S)-2-methylpropane-2-sulfnamide, and a compound H-5a with a single configuration and a compound H-5b with a single configuration were obtained: MS m/z (ESI):423.2 [M+1].

Example 6

(4R,6S)-6-(1-methylcyclopropyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-6a) and (4R,6R)-6-(1-methylcyclopropyl)-N-(2-((R)-9-(pyridin-2-yl)-6-oxaspiro[4.5]decan-9-yl)ethyl)-5,6-dihydro-4H-pyrrolo[1,2-b]pyrazol-4-amine (H-6b)

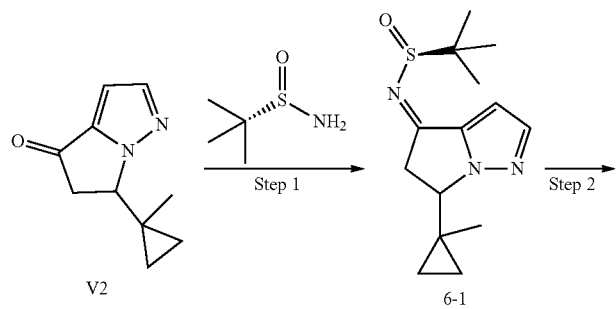

-continued

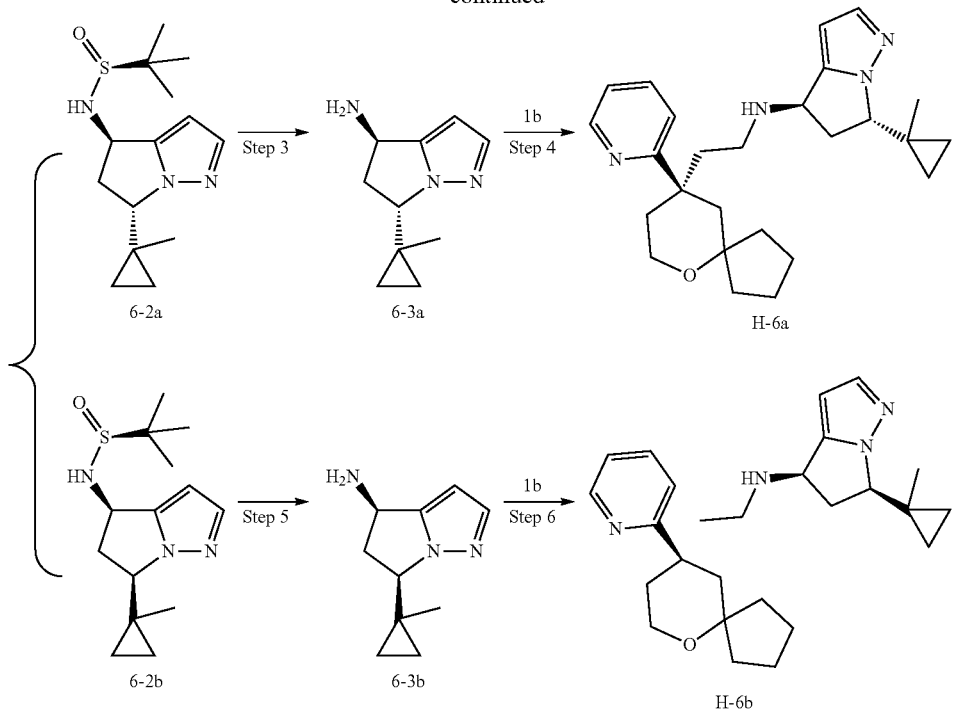

The two compounds were prepared with reference to the preparation methods of Example 2. A difference was that the compound (R)-2-methylpropane-2-sulfinamide was replaced with the compound (S)-2-methylpropane-2-sulfinamide, and a compound H-6a with a single configuration and a compound H-6b with a single configuration were obtained: MS m/z (ESI): 421.1 [M+1].

Example 7

(4R,6S)-6-isopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-7a) and (4R,6R)-6-isopropyl-N-(2-((R)-9-(pyridin-2-yl)-6-oxaspiro[4.5]decan-9-yl)ethyl)-5,6-dihydro-4H-pyrrolo[1,2-b]pyrazol-4-amine (H-7b)

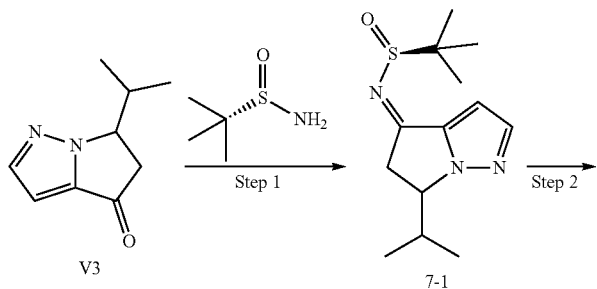

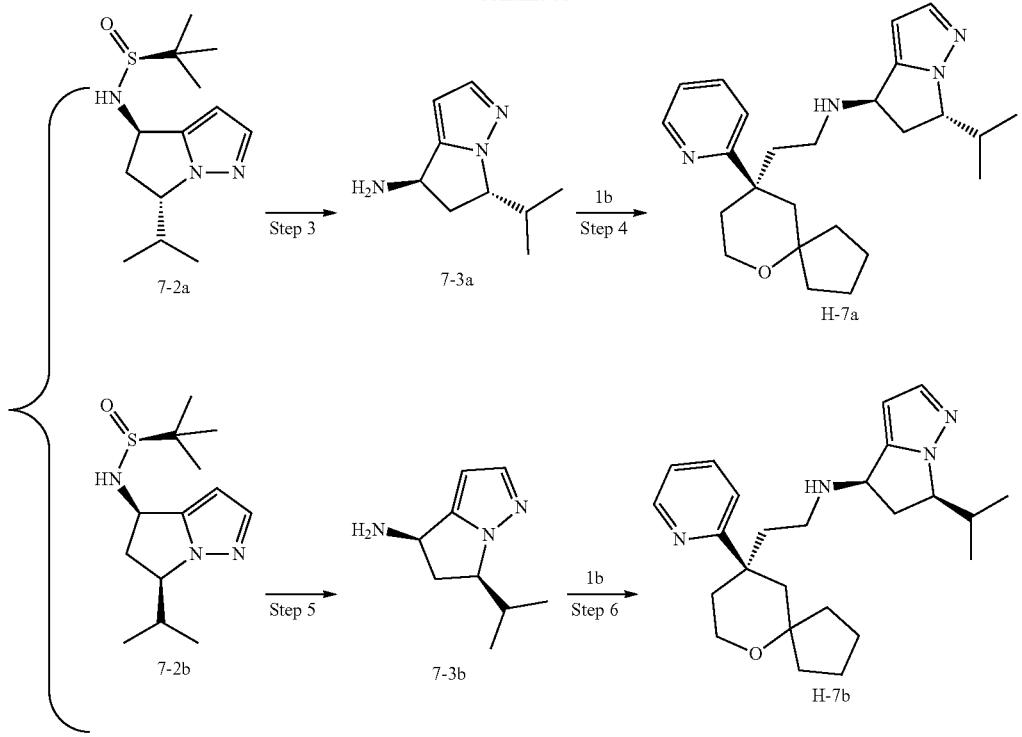

The two compounds were prepared with reference to the preparation methods of Example 3. A difference was that the compound (R)-2-methylpropane-2-sulfinamide was replaced with the compound (S)-2-methylpropane-2-sulfinamide, and a compound H-7a with a single configuration and a compound H-7b with a single configuration were obtained: MS m/z (ESI): 409.3 [M+1].

Example 8

(4R,6S)-N-(2-((R)-9-(pyridin-2-yl)-6-oxaspiro[4.5]decan-9-yl)ethyl)-6-(1-(trifluoromethyl)cyclopropyl)-5,6-dihydro-4H-pyrrolo[1,2-b]pyrazol-4-amine (H-8a) and (4R,6R)-N-(2-((R)-9-(pyridin-2-yl)-6-oxaspiro[4.5]decan-9-yl)ethyl)-6-(1-(trifluoromethyl)cyclopropyl)-5,6-dihydro-4H-pyrrolo[1,2-b]pyrazol-4-amine (H-8b)

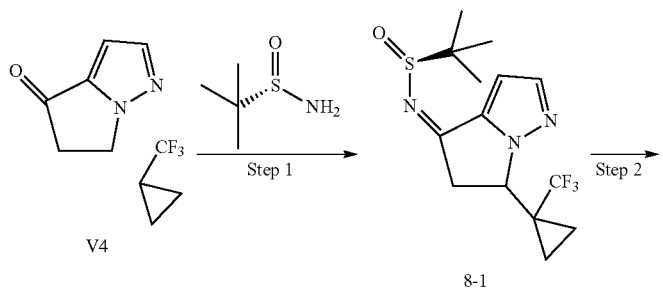

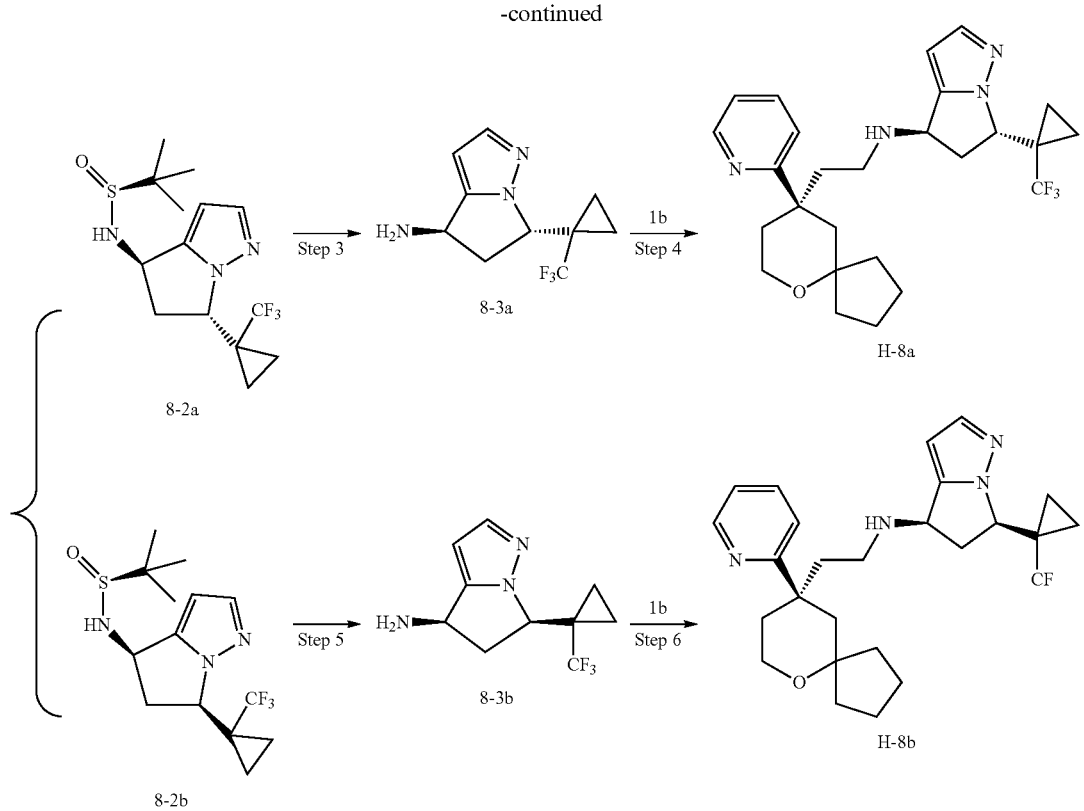

The two compounds were prepared with reference to the preparation methods of Example 4. A difference was that the compound (R)-2-methylpropane-2-sulfinamide was replaced with the compound (S)-2-methylpropane-2-sulfinamide, and a compound H-8a with a single configuration and a compound H-8b with a single configuration were obtained: MS m/z (ESI): 475.1 [M+1].

Bioassay

Cell lines used in the following assays are PathHunter® CHO-K1 OPRM1 β-Arrestin Cell Line, from DiscoverX, catalog No. 93-0213C2, lot No. 13K0402.

Reagents used, suppliers, catalog No., and storage temperature are as follows:
Assay Complete™ Cell Culture Kit 107, DiscoverX, 92-3107G, −20° C.;
Assay Complete™ Thawing Reagent, DiscoverX, 92-4002TR, −20° C.;
Assay Complete™ Cell Detachment Reagent, DiscoverX, 92-0009, −20° C.;
Assay Complete™ Cell Plating Reagent, DiscoverX, 93-0563R2, −20° C.;
Pathhunter Detection Kit, DiscoverX, 93-0001, −20° C.;
PBS (1×) 0.0067M (P04), Hyclone, SH30256.01, 4° C.;
DMSO, Sigma, D5879-100ML, room temperature;
NKH477, Sigma, 1603, −20° C.; and
IBMX, Tocris, 15879, −20° C.

Instruments used, models, and suppliers are as follows:
Countsatr BioMed, IM1200, ALIT;
Microscope, IX51, OLYMPUS;
Centrifuge, 5804, Eppendorf,
Thermostatic Water Bath, DK-S420, Shanghai Shenxian thermostatic equipment factory;
Cell Incubator, 3111, Thermo;
Biological Safety Cabinet, BSC-1300IIA2, AIRTECH;
OptiPlate-384 White Opaque, 6007290, Perkin Elmer;
Multimode plate Reader, Victor X5, PerkinElmer; and
Culture Plate-384 White Opaque, TC-treated, 6007680, PerkinElmer.

Test example 1 HTRF-cAMP cell experiment
Experimental methods and steps
I. Resuscitation of Cells
1. A resuscitation solution was taken out of a refrigerator at 4° C. and pre-heated in a water bath kettle at 37° C. for 15 min.
2. P6 generation cells were taken out of a liquid nitrogen container, the frozen cell cryopreservation tube was immediately placed into the water bath kettle at 37° C. and gently shaken for 30 sec to 1 min until small ice crystals were seen or the cells were about to thaw completely.
3. The cryopreservation tube was thoroughly sterilized with 70% alcohol and dried by wiping.
4. The cells were centrifuged to remove the cryoprotectant, and resuspended with a pre-heated fresh resuscitation solution.
   a. 3 mL of pre-heated cell resuscitation solution was taken by suction and placed into a 15 mL centrifuge tube.
   b. The cells were centrifuged at 1,300 rpm for 3 min.
   c. A supernatant cryoprotectant was removed, and the cells were resuspended with 4 mL of pre-heated resuscitation solution.
5. The cell suspension was transferred into a T25 cell culture flask and cultured with 5% $CO_2$ at 37° C. for 24 h.
6. After the cells were cultured for 24 h, the resuscitation solution in the cell culture flask was replaced with a pre-heated cell culture medium.

II. Subculture of Cells
1. After the cell growth density in the T25 culture flask was greater than 70%, the cells were digested with a cell dissociation solution for subculture.
   a. The medium in the culture flask was removed by suction, 4 mL of pre-heated PBS was added, the culture flask was gently shaken to rinse the cells, and PBS was removed by suction.
   b. 1 mL of cell dissociation solution was taken by suction and added to the T25 culture flask.
   c. The culture flask was repeatedly shaken to allow the dissociation solution to thoroughly cover the culture flask, and placed into an incubator with 5% $CO_2$ at 37° C. for 5 min.
   d. The cell culture flask was taken out, and the cells were observed under a microscope to see if the cells were dissociated.
   e. 3 mL of pre-heated cell culture medium was added to terminate the digestion.
   f. The cell culture flask was repeatedly rinsed with the cell culture medium gently, and a cell suspension was collected and placed into a 15 mL centrifuge tube.
   g. The cells were centrifuged at 1,300 rpm for 3 min, and a supernatant was removed.
   h. The cells were resuspended with 3 mL of cell culture medium.
2. Subculture of the cells was performed according to a ratio of 1: 3 (that is, 1 mL of cell resuspension solution and 3 mL of cell culture medium were placed into each T25 cell culture flask).

III. Inoculation of Cells into Plate
1. Step 2.2.1 (a to h) was repeated until P8 generation cells were obtained. The cells were counted and resuspended with 2×/1 mM IBMX stimulation buffer solution until the cell density was $1.2 \times 10^6$ cells/mL.
2. The cell solution at the density of $1.2 \times 10^6$ cells/mL was inoculated into a 384-well plate by a multichannel pipette, 10 μL/well (i.e., 12,000 cells/well).

IV. c-AMP Assay
1. Relevant reagents were prepared, and the compounds were prepared according to drug dilution preparation tables.
   a. 1× Stimulation buffer solution: 1 mL of 5×Stimulation buffer stock solution was added to and uniformly mixed with 4 mL of distilled water.
   b. 2×/1 mM IBMX stimulation buffer solution (5 mL): 10 μL of 500 mM IBMX stock solution was added to 4,990 μL of cell culture medium and uniformly mixed by gentle pipetting.
   c. A gradient dilution preparation table for a positive drug morphine:

| Concentration of original solution/ μM | Volume from high gradient concentration (μL) | Volume of stimulation buffer (μL) | Concentration after dilution/ μM | Volume of sample to be added to the 384-well plate (μL) | Final reaction concentration/ μM |
|---|---|---|---|---|---|
| 26606 | — | — | — | — | — |
| Gradient | 1 | 19 | 1330.3 | — | — |
| 1) | 2 | 104.4 | 25 | 8 | 10.0000 |
| 2) | 20 | 40 | 8.3333 | 8 | 3.3333 |
| 3) | 20 | 40 | 2.7778 | 8 | 1.1111 |
| 4) | 20 | 40 | 0.9259 | 8 | 0.3704 |
| 5) | 20 | 40 | 0.3086 | 8 | 0.1235 |
| 6) | 20 | 40 | 0.1029 | 8 | 0.0412 |
| 7) | 20 | 40 | 0.0343 | 8 | 0.0137 |
| 8) | 20 | 40 | 0.0114 | 8 | 0.0046 |
| 9) | 20 | 40 | 0.0038 | 8 | 0.0015 |
| 10) | 20 | 40 | 0.0013 | 8 | 0.0005 |
| 11) | 20 | 40 | 0.0004 | 8 | 0.0002 | d. Before being diluted, the compound was dissolved in DMSO until the storage concentration was 10 mM. Dilution preparation table for a positive drug TRV130 and various compounds:

| Concentration of original solution/ μM | Volume from high gradient concentration (μL) | Volume of stimulation buffer (μL) | Concentration after dilution/ μM | Volume of sample to be added to the 384-well plate (μL) | Final reaction concentration/ μM |
|---|---|---|---|---|---|
| 10000 | — | — | — | — | — |
| 1) | 1 | 399 | 25 | 8 | 10.0000 |
| 2) | 20 | 40 | 8.3333 | 8 | 3.3333 |
| 3) | 20 | 40 | 2.7778 | 8 | 1.1111 |
| 4) | 20 | 40 | 0.9259 | 8 | 0.3704 |
| 5) | 20 | 40 | 0.3086 | 8 | 0.1235 |
| 6) | 20 | 40 | 0.1029 | 8 | 0.0412 |
| 7) | 20 | 40 | 0.0343 | 8 | 0.0137 |
| 8) | 20 | 40 | 0.0114 | 8 | 0.0046 |
| 9) | 20 | 40 | 0.0038 | 8 | 0.0015 |
| 10) | 20 | 40 | 0.0013 | 8 | 0.0005 |
| 11) | 20 | 40 | 0.0004 | 8 | 0.0002 | e. 50 uM NK477 (1 mL): 1 μL of 50 mM NKH477 stock solution was added to 999 μL of 1× Stimulation buffer solution, and uniformly mixed by shaking.

f. Detection reagents

A. cAMP-Cryptate (donor, lyophilized) reaction solution: 1 mL of 5× cAMP-Cryptate stock solution was added to 4 mL of 1× Lysis & Detection Buffer solution and uniformly mixed gently.

B. Anti-cAMP-d2 (acceptor, lyophilized) reaction solution: 1 mL of 5× Anti-cAMP-d2 stock solution was added to 4 mL of 1× Lysis & Detection Buffer solution and uniformly mixed gently.

2. cAMP Assay Steps a. 12,000 cells were inoculated into each well containing 10 μL of 2× IBMX stimulation buffer solution.

b. 8 μL of a diluted compound sample solution was added to the cells in each well.

c. 2 μL of prepared 10× NKH477 solution was added to each well.

d. The cells were incubated at 37° C. for 45 min.

e. 10 μL of cAMP-d2 and 10 μL of anti-cAMP Cryptate reaction solution were added.

f. The cells were incubated in the dark at the room temperature for 60 min.

g. The cell culture plate was read by HTRF.

3. RFU Detection and Plate Reading

After the cells were incubated for 60 min, the plate with all samples was detected and read by homogeneous time-resolved fluorescence.

Data Analysis

Data, which included two signal values respectively at 665 nm and 620 nm, were exported from corresponding software in a computer connected to the multimode plate reader. A ratio calculation formula was that: ratio=signal value at 665 nm/signal value at 620 nm×10000. The data were analyzed by using GraphPad Prism software. The best fitting curve was-log(agonist) vs. response. EC50 values of the compounds were determined by nonlinear regression analysis of computer-aided dose-response curves; PEC50=−logEC50 (the unit of EC50 values was mole); % the maximum effect value of morphine=(compound sample ratio-blank well ratio)/TOP×100 (note: TOP is a Top value of a curve of morphine sample ratio-blank well ratio, which was analyzed and fitted by using Graphpad Prism software). Results are shown in Table 1:

TABLE 1

Activity of compounds against cAMP

| Compound | cAMP $EC_{50}$ (nM) | cAMP Emax (%) Morphine was 100% | Compound | cAMP $EC_{50}$ (nM) | cAMP Emax Morphine was 100% |
|---|---|---|---|---|---|
| H-1a | 8.1 | 97.4 | H-1b | 42 | 94.2 |
| H-2a | 1.0 | 56.3 | H-2b | 26.2 | 68.2 |
| H-3a | 6.0 | 86.4 | H-3b | 26 | 68.5 |

Test Example 2 β-Arrestin Cell Experiment

Experimental Method and Steps

I. Resuscitation of Cells

1. A resuscitation solution was taken out of a refrigerator at 4° C. and pre-heated in a water bath kettle at 37° C. for 15 min.

2. P6 generation cells were taken out of a liquid nitrogen container, the frozen cell culture tube was immediately placed into the water bath kettle at 37° C. and gently shaken for 30 sec to 1 min until small ice crystals were seen or the cells were about to thaw completely.

3. The culture tube was thoroughly sterilized with 70% alcohol and dried by wiping.

4. The cells were centrifuged to remove the cryoprotectant, and resuspended with a pre-heated fresh resuscitation solution.

a. 3 mL of pre-heated cell resuscitation solution was taken by suction and placed into a 15 mL centrifuge tube.

b. The cells were centrifuged at 1,300 rpm for 3 min.

c. A supernatant was removed, and the cells were resuspended with 4 mL of pre-heated resuscitation solution.

5. The cell suspension was transferred into a T25 cell culture flask and cultured with 5% $CO_2$ at 37° C. for 24 h.

6. After the cells were cultured for 24 h, the resuscitation solution in the cell culture flask was replaced with a pre-heated cell culture medium.

II. Subculture of Cells

1. After the cell growth density in the T25 culture flask was greater than 70%, the cells were digested with a cell dissociation solution for subculture.

a. The medium in the culture flask was removed by suction, 4 mL of pre-heated PBS was added, the culture flask was gently shaken to rinse the cells, and PBS was removed by suction.

b. 1 mL of cell dissociation solution was taken by suction and added to the T25 culture flask.

c. The culture flask was repeatedly shaken to allow the dissociation solution to thoroughly cover the culture flask, and placed into an incubator with 5% $CO_2$ at 37° C. for 5 min.

d. The cell culture flask was taken out, and the cells were observed under a microscope to see if the cells were dissociated.

e. 3 mL of pre-heated cell culture medium was added to terminate the digestion.

f. The cell culture flask was repeatedly rinsed with the cell culture medium gently, and the cell suspension was finally transferred into a 15 mL centrifuge tube.

g. The cells were centrifuged at 1,300 rpm for 3 min, and a supernatant was removed.

h. The cells were resuspended with 3 mL of cell culture medium.

2. Subculture of the cells was performed according to a ratio of 1:3 (that is, 1 mL of cell resuspension solution and 3 mL of cell culture medium were placed into each T25 cell culture flask).

3. Step 2.2.1 (a to h) was repeated until P8 generation cells were obtained.

III. Inoculation of Cells into Plate 1. 20 μL of cell suspension was taken by using a pipette, and the number of the cells was measured by using a cell counter.

2. The cells were centrifuged at 1,300 rpm for 3 ma to settle the cells down.

3. A supernatant was removed, and a corresponding cell plating solution was added until the cell density was $2×10^5$ cells/mL.

4. The cell solution at the density of $2×10^5$ cells/mL was inoculated into a 384-well plate by a multichannel pipette, 20 μl/well (i.e., 4,000 cells/well).

5. The 384-well plate inoculated with the cells was placed into the incubator with 500 C2 at 372C for 24 h.

IV. β-Arrestin Assay

1. The compounds were prepared according to the following dilution tables.

a. A gradient dilution preparation table for a-positive drug morphine

| Concentration of original solution/μM | Volume from high gradient concentration (μL) | Volume of Plating Buffer added (μL) | Volume of DMSO added (μL) | Concentration after dilution/μM | Volume of sample to be added to the 384-well plate (μL) | Final reaction concentration/μM |
|---|---|---|---|---|---|---|
| 26606 | — | — | — | — | — | — |
| Prepare | 2 | 18 | 0 | 2660.6 | — | — |
| A | 2 | 101.763 | 2.661 | 50.000 | 5 | 10.000 |
| B | 20 | 39 | 1 | 16.667 | 5 | 3.333 |
| C | 20 | 39 | 1 | 5.556 | 5 | 1.111 |
| D | 20 | 39 | 1 | 1.852 | 5 | 0.370 |
| E | 20 | 39 | 1 | 0.617 | 5 | 0.123 |
| F | 20 | 39 | 1 | 0.206 | 5 | 0.041 |
| G | 20 | 39 | 1 | 0.069 | 5 | 0.014 |
| H | 20 | 39 | 1 | 0.023 | 5 | 0.005 | b. Before being diluted, the compound was dissolved in DMSO until the storage concentration was 10 mM.

A dilution preparation table for a positive drug TRV130 and various compounds

| Concentration of original solution/μM | Volume from high gradient concentration (μL) | Volume of DMSO added (μL) | Concentration after dilution/μM | Volume of diluted solution (μL) | Volume of Plating Buffer added (μL) | Final concentration of diluted solution/μM | Volume of sample to be added to the 384-well plate (μL) | Final reaction concentration/μM |
|---|---|---|---|---|---|---|---|---|
| 10000 | — | — | — | — | — | — | — | — |
| A | 12.5 | 50 | 2000 | 2.5 | 97.5 | 50.000 | 5 | 10.000 |
| B | 20 | 40 | 666.667 | 2.5 | 97.5 | 16.667 | 5 | 3.333 |
| C | 20 | 40 | 222.222 | 2.5 | 97.5 | 5.556 | 5 | 1.111 |
| D | 20 | 40 | 74.074 | 2.5 | 97.5 | 1.852 | 5 | 0.370 |
| E | 20 | 40 | 24.691 | 2.5 | 97.5 | 0.617 | 5 | 0.123 |
| F | 20 | 40 | 8.230 | 2.5 | 97.5 | 0.206 | 5 | 0.041 |
| G | 20 | 40 | 2.743 | 2.5 | 97.5 | 0.069 | 5 | 0.014 |
| H | 20 | 40 | 0.914 | 2.5 | 97.5 | 0.023 | 5 | 0.005 |

2. 5.L of each diluted compound sample solution was added to the 384-well plate.
3. After the samples were added, the 384-well plate was placed into the incubator with 500 $CO_2$ at 37° C. for 90 min.

V. RLU Detection

1. Before the incubation of the compound was completed, a Working Detection solution was prepared (in the dark) according to the following ratio. Then, 12.5 μL of Working Detection solution was added to each well, and the cells were incubated by shaking in the dark at the room temperature for 1 h.

| Ingredients | Ratio |
|---|---|
| Cell Assay Buffer | 19 |
| Substrate Reagent 1 | 5 |
| Substrate Reagent 2 | 1 |
| Total volume | 25 |

2. After the incubation of the compound was completed, 12.5 μL of the above working solution was added to each well, and the cells were incubated by shaking in the dark at the room temperature and 80 rpm for 1 h.
3. After the incubation was completed, the plate was read by using a multimode plate reader.

Data Analysis

Data were exported from corresponding software in a computer connected to the multimode plate reader, and analyzed by using GraphPad Prism software. The best fitting curve was log(agonist) vs. response. EC50 values of the compounds were determined by nonlinear regression analysis of computer-aided dose-response curves; PEC50=−logEC50 (the unit of EC50 values was mole); % the maximum effect value of morphine=(RLU value of compound sample-RLU value of blank well)/TOP×100 (note: TOP is a Top value of a curve of RLU value of morphine sample-RLU value of blank well, which was analyzed and fitted by using Graphpad Prism software). Results are shown in Table 2:

TABLE 2

Testing results of compounds on β-arrestin

| Compound | β-arrestin Emax (%), Morphine was 100% | Compound | β-arrestin Emax (%), Morphine was 100% |
|---|---|---|---|
| H-1a | 17.6 | H-1b | 12.0 |
| H-2a | 7.0 | H-2b | 5.7 |
| H-3a | 1.3 | H-3b | 4.7 |
| H-7b | 15 | | |

It can be seen from Table 1 and Table 2 that the representative compounds of the present disclosure have high inhibitory activity against cAMP, and have high Emax values. In addition, the compounds of the present disclosure have small Emax values against β-arrestin, and have good bias.

All documents mentioned in the present disclosure are incorporated by reference in the present disclosure as if each document was individually incorporated by reference. In addition, it should be understood that after reading the above teaching content of the present disclosure, those skilled in

What is claimed is:

1. A compound of Formula (I):

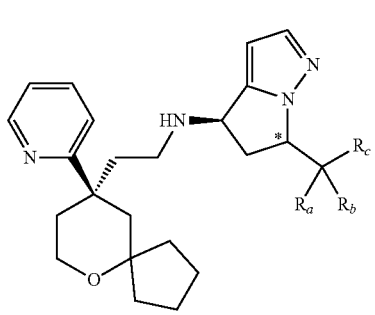

(I)

or a pharmaceutically acceptable salt thereof,
wherein:

$R_a$ is H, halogen, $C_{1-6}$ alkyl, $C_{1-6}$ haloalkyl, or $OC_{1-6}$ haloalkyl;

$R_b$ is H, halogen, $C_{1-6}$ alkyl, $C_{1-6}$ haloalkyl, or $OC_{1-6}$ haloalkyl; or $R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, OH, and $OC_{1-3}$ alkyl;

$R_c$ is H, halogen, $C_{1-6}$ alkyl, $C_{1-6}$ haloalkyl, $C_{2-6}$ alkenyl, $C_{2-6}$ alkynyl, $C(O)C_{1-6}$ alkyl, $C(O)NR_{a1}R_{b1}$, $NR_{a1}R_{b1}$, $NHC(O)C_{1-6}$ alkyl, $NHC(O)NR_{a1}R_{b1}$, $NHS(O)_2C_{1-3}$ alkyl, $NHS(O)_2NR_{a1}R_{1b}$, $NHS(O)_2 C_{3-6}$ cycloalkyl, $OC_{1-6}$ alkyl, $OC_{1-6}$ haloalkyl, $S(O)_2 C_{1-3}$ alkyl, $S(O)_2NR_{a1}R_{b1}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, OH, and $OC_{1-3}$ alkyl;

each $R_{a1}$ is independently H, $C_{1-6}$ alkyl, $C_{1-6}$ haloalkyl, $C_{3-6}$ cycloalkyl, or a saturated monocyclic 4- to 6-membered heterocyclyl;

each $R_{b1}$ is independently H, $C_{1-6}$ alkyl, $C_{1-6}$ haloalkyl, $C_{3-6}$ cycloalkyl, or a saturated monocyclic 4- to 6-membered heterocyclyl; or any $R_{a1}$ and $R_{b1}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-3}$ alkyl substituents; and

* indicates an (R)-configuration or (S)-configuration.

2. The compound according to claim 1, wherein the compound is of Formula (I-a) or Formula (I-b):

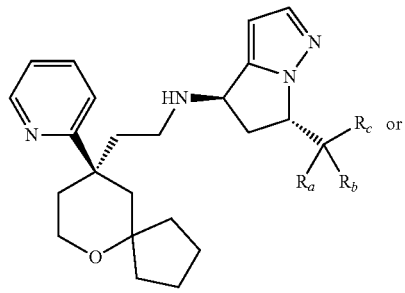

(I-a)

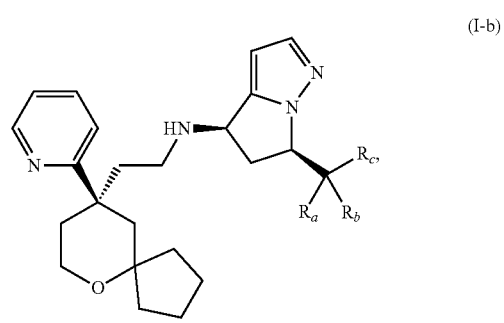

(I-b)

or a pharmaceutically acceptable salt thereof.

3. The compound according to claim 1, or a pharmaceutically acceptable salt thereof, wherein:

$R_a$ is H, F, $CH_3$, or $CH_2CH_3$; and $R_b$ is H, F, $CH_3$, or $CH_2CH_3$.

4. The compound according to claim 1, or a pharmaceutically acceptable salt thereof, wherein $R_c$ is H, F, $CH_3$, $CH_2CH_3$, $CF_3$, or $OCH_3$.

5. The compound according to claim 1, or a pharmaceutically acceptable salt thereof, wherein:

$R_a$ is $CH_3$;

$R_b$ is $CH_3$; and $R_c$ is H, F, $CH_3$, $CH_2CH_3$, $CF_3$, or $OCH_3$.

6. The compound according to claim 1, wherein the compound is selected from the group consisting of:

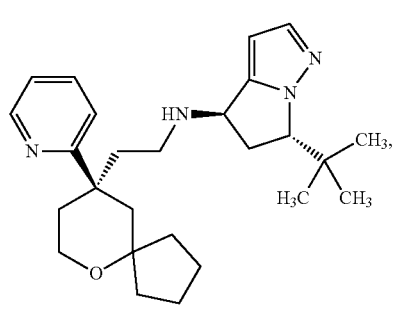

H-5a

H-5b
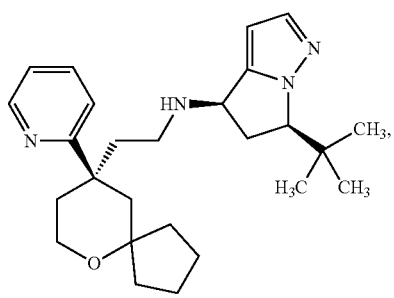

H-6a
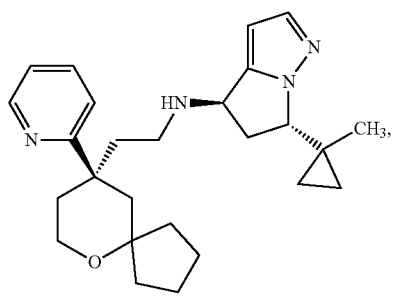

H-6b
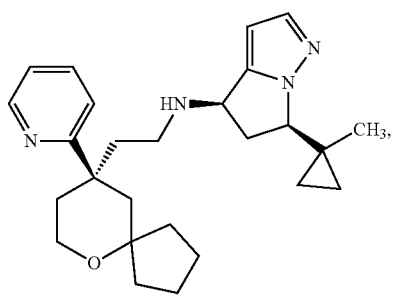

H-7a
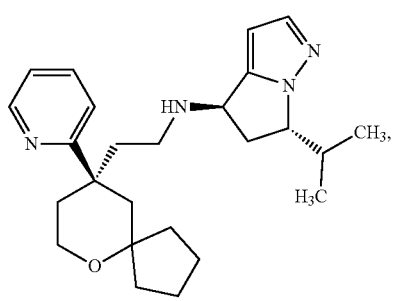

H-7b
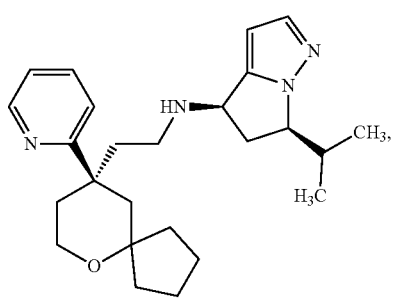

H-8a
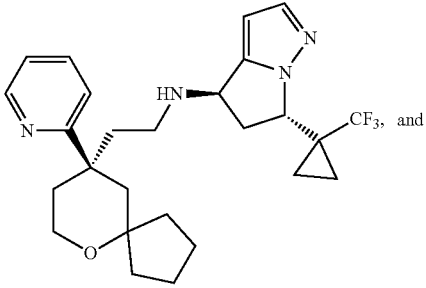

H-8b
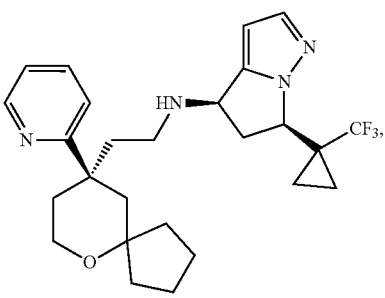

or a pharmaceutically acceptable salt thereof.

7. A pharmaceutical composition comprising a pharmaceutically acceptable carrier and the compound according to claim 1, or a pharmaceutically acceptable salt thereof.

8. A pharmaceutical composition comprising a pharmaceutically acceptable carrier and the compound according to claim 6, or a pharmaceutically acceptable salt thereof.

9. A method for activating or antagonizing a opioid receptor (MOR) receptor in a patient, wherein the method comprises administering to the patient in need thereof a therapeutically effective amount of a compound according to claim 1, or a pharmaceutically acceptable salt thereof.

10. The method according to claim 9, wherein the patient suffers from pain.

11. A process for preparing a compound of Formula (I) according to claim 1:

(I)
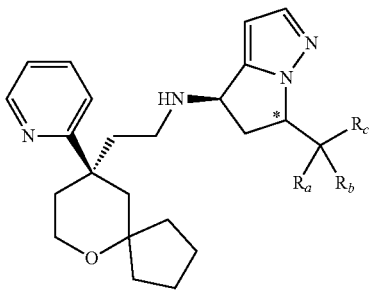

wherein:
$R_a$ is H, halogen, $C_{1-6}$ alkyl, $C_{1-6}$ haloalkyl, or $OC_{1-6}$ haloalkyl;
$R_b$ is H, halogen, $C_{1-6}$ alkyl, $C_{1-6}$ haloalkyl, or $OC_{1-6}$ haloalkyl; or
$R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, OH, and $OC_{1-3}$ alkyl;

$R_c$ is H, halogen, $C_{1-6}$ alkyl, $C_{1-6}$ haloalkyl, $C_{2-6}$ alkenyl, $C_{2-6}$ alkynyl, $C(O)C_{1-6}$ alkyl, $C(O)NR_{a1}R_{b1}$, $NR_{1a}R_{b1}$, $NHC(O)C_{1-6}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, $OC_{1-6}$ alkyl, $OC_{1-6}$ haloalkyl, $S(O)_2C_{1-3}$ alkyl, $S(O)_2NR_{a1}R_{b1}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{1a}R_{b1}$, $NHS(O)_2C_{3-6}$ cycloalkyl, OH, and $OC_{1-3}$ alkyl;

each $R_{a1}$ is independently H, $C_{1-6}$ alkyl, $C_{1-6}$ haloalkyl, $C_{3-6}$ cycloalkyl, or a saturated monocyclic 4- to 6-membered heterocyclyl;

each $R_{b1}$ is independently H, $C_{1-6}$ alkyl, $C_{1-6}$ haloalkyl, $C_{3-6}$ cycloalkyl, or a saturated monocyclic 4- to 6-membered heterocyclyl; or any $R_{a1}$ and $R_{b1}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-3}$ alkyl substituents; and

* indicates an (R)-configuration or (S)-configuration; wherein the process comprises:

reductively aminating a compound of Formula 1b:

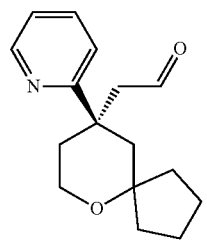

1b with a compound of Formula (I-1):

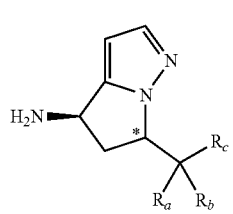

(I-1)

wherein:

$R_a$ is H, halogen, $C_{1-6}$ alkyl, $C_{1-6}$ haloalkyl, or $OC_{1-6}$ haloalkyl;

$R_b$ is H, halogen, $C_{1-6}$ alkyl, $C_{1-6}$ haloalkyl, or $OC_{1-6}$ haloalkyl; or $R_a$ and $R_b$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, OH, and $OC_{1-3}$ alkyl;

$R_c$ is H, halogen, $C_{1-6}$ alkyl, $C_{1-6}$ haloalkyl, $C_{2-6}$ alkenyl, $C_{2-6}$ alkynyl, $C(O)C_{1-6}$ alkyl, $C(O)NR_{a1}R_{b1}$, $NR_{a1}R_{b1}$, $NHC(O)C_{1-6}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, $OC_{1-6}$ alkyl, $OC_{1-6}$ haloalkyl, $S(O)_2C_{1-3}$ alkyl, $S(O)_2NR_{a1}R_{b1}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_6$-to aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{a1}R_{b1}$, $NHC(O)C_{1-3}$ alkyl, $NHC(O)NR_{a1}R_{b1}$, $NHS(O)_2C_{1-3}$ alkyl, $NHS(O)_2NR_{a1}R_{b1}$, $NHS(O)_2C_{3-6}$ cycloalkyl, OH, and $OC_{1-3}$ alkyl;

each $R_{a1}$ is independently H, $C_{1-6}$ alkyl, $C_{1-6}$ haloalkyl, $C_{3-6}$ cycloalkyl, or a saturated monocyclic 4- to 6-membered heterocyclyl;

each $R_{b1}$ is independently H, $C_{1-6}$ alkyl, $C_{1-6}$ haloalkyl, $C_{3-6}$ cycloalkyl, or a saturated monocyclic 4- to 6-membered heterocyclyl; or any $R_{a1}$ and $R_{b1}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-3}$ alkyl substituents; and

* indicates an (R)-configuration or (S)-configuration;

in the presence of:

(a) a reducing agent selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane; and (b) an inert solvent selected from the group consisting of a $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, and N,N-dimethylformamide, or a combination thereof;

to obtain the compound of Formula (I) above.

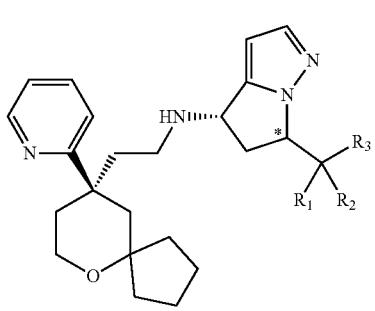

(II)

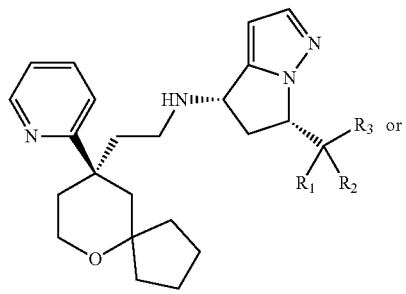

(II-a)

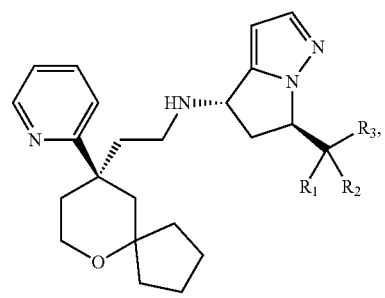

(II-b)

12. A compound of Formula (II):

or a pharmaceutically acceptable salt thereof, wherein:

$R_1$ is H, halogen, $C_{1-6}$ alkyl, $C_{1-6}$ haloalkyl, or $OC_{1-6}$ haloalkyl;

$R_2$ is H, halogen, $C_{1-6}$ alkyl, $C_{1-6}$ haloalkyl, or $OC_{1-6}$ haloalkyl; or $R_1$ and $R_2$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{11}R_{12}$, $NHC(O)C_{1-3}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, OH, and $OC_{1-3}$ alkyl;

$R_3$ is H, halogen, $C_{1-6}$ alkyl, $C_{1-6}$ haloalkyl, $C_{2-6}$ alkenyl, $C_{2-6}$ alkynyl, $C(O)C_{1-6}$ alkyl, $C(O)NR_{11}R_{12}$, $NR_{11}R_{12}$, $NHC(O)C_{1-6}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, $OC_{1-6}$ alkyl, $OC_{1-6}$ haloalkyl, $S(O)_2C_{1-3}$ alkyl, $S(O)_2NR_{11}R_{12}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{11}R_{12}$, $NR_{11}R_{12}$, $NHC(O)C_{1-3}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, OH, and $OC_{1-3}$ alkyl;

each $R_{11}$ is independently H, $C_{1-6}$ alkyl, $C_{1-6}$ haloalkyl, $C_{3-6}$ cycloalkyl, or a saturated monocyclic 4- to 6-membered heterocyclyl;

each $R_{12}$ is independently H, $C_{1-6}$ alkyl, $C_{1-6}$ haloalkyl, $C_{3-6}$ cycloalkyl, or a saturated monocyclic 4- to 6-membered heterocyclyl; or any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-3}$ alkyl substituents; and

* indicates an (R)-configuration or (S)-configuration.

13. The compound according to claim 2, wherein the compound is of Formula (II-a) or Formula (II-b):

or a pharmaceutically acceptable salt thereof.

14. The compound according to claim 12, or a pharmaceutically acceptable salt thereof, wherein:

$R_1$ is H, F, $CH_3$, or $CH_2CH_3$; and $R_2$ is H, F, $CH_3$, or $CH_2CH_3$.

15. The compound according to claim 12, or a pharmaceutically acceptable salt thereof, wherein $R_3$ is H, F, $CH_3$, $CH_2CH_3$, $CF_3$, or $OCH_3$.

16. The compound according to claim 12, or a pharmaceutically acceptable salt thereof, wherein:

$R_1$ is $CH_3$;

$R_2$ is $CH_3$; and $R_3$ is H, F, $CH_3$, $CH_2CH_3$, $CF_3$, or $OCH_3$.

17. The compound according to claim 12, wherein the compound is selected from the group consisting of:

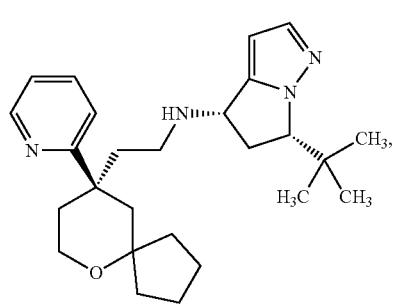

H-1a

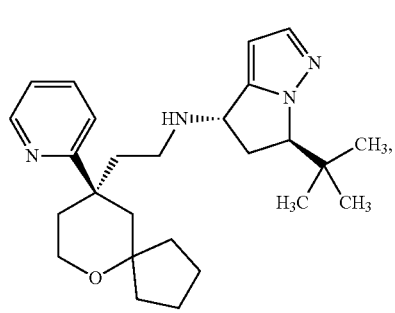

H-1b

83
-continued

H-2a 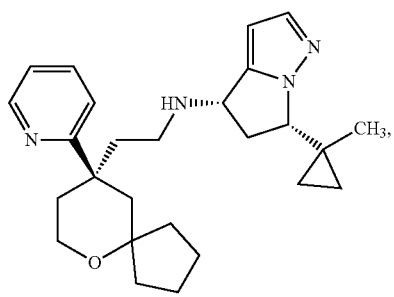

H-2b 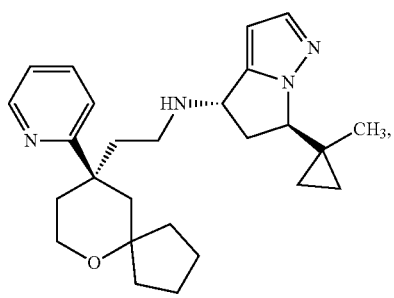

H-3a 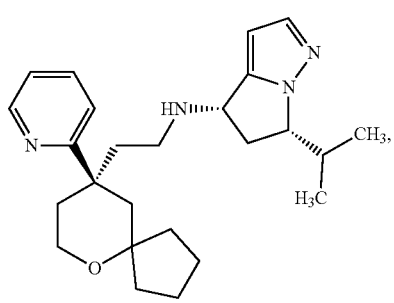

H-3b 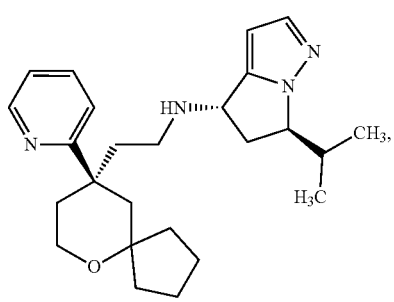

H-4a 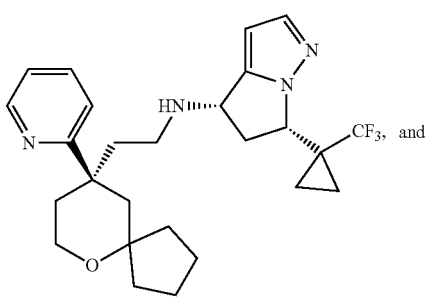

84
-continued

H-4b 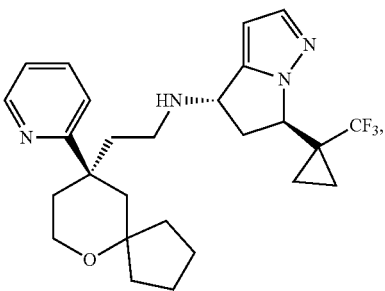

or a pharmaceutically acceptable salt thereof.

18. A pharmaceutical composition comprising a pharmaceutically acceptable carrier and the compound according to claim 12, or a pharmaceutically acceptable salt thereof.

19. A pharmaceutical composition comprising a pharmaceutically acceptable carrier and the compound according to claim 17, or a pharmaceutically acceptable salt thereof.

20. A method for activating or antagonizing a opioid receptor (MOR) receptor in a patient, wherein the method comprises administering to the patient in need thereof a therapeutically effective amount of a compound according to claim 12, or a pharmaceutically acceptable salt thereof.

21. The method according to claim 20 wherein the patient suffers from pain.

22. A process for preparing a compound of Formula (II) according to claim:

(I)

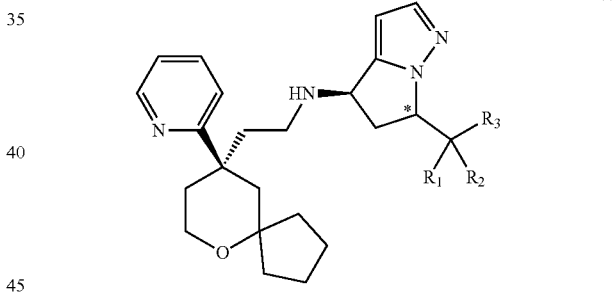

wherein:
R$_1$ is H, halogen, C$_{1-6}$ alkyl, C$_{1-6}$ haloalkyl, or OC$_{1-6}$ haloalkyl;
R$_2$ is H, halogen, C$_{1-6}$ alkyl, C$_{1-6}$ haloalkyl, or OC$_{1-6}$ haloalkyl; or
R$_1$ and R$_2$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, C$_{1-3}$ alkyl, CH$_2$CN, CH$_2$OH, C(O)C$_{1-3}$ alkyl, C(O)NR$_{a1}$R$_{b1}$, NR$_{11}$R$_{12}$, NHC(O)C$_{1-3}$ alkyl, NHC(O)NR$_{11}$R$_{12}$, NHS(O)$_2$C$_{1-3}$ alkyl, NHS(O)$_2$NR$_{11}$R$_{12}$, NHS(O)$_2$C$_{3-6}$ cycloalkyl, OH, and OC$_{1-3}$ alkyl;
R$_3$ is H, halogen, C$_{1-6}$ alkyl, C$_{1-6}$ haloalkyl, C$_{2-6}$ alkenyl, C$_{2-6}$ alkynyl, C(O)C$_{1-6}$ alkyl, C(O)NR$_{11}$R$_{12}$, NR$_{11}$R$_{12}$, NHC(O)C$_{1-6}$ alkyl, NHC(O)NR$_{11}$R$_{12}$, NHS(O)$_2$C$_{1-3}$ alkyl, NHS(O)$_2$NR$_{11}$R$_{12}$, NHS(O)$_2$C$_{3-6}$ cycloalkyl, OC$_{1-6}$ alkyl, OC$_{1-6}$ haloalkyl, S(O)$_2$C$_{1-3}$ alkyl, S(O)$_2$NR$_{11}$R$_{12}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{11}R_{12}$, $NR_{11}R_{12}$, $NHC(O)C_{1-3}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, OH, and $OC_{1-3}$ alkyl;

each $R_{11}$ is independently H, $C_{1-6}$ alkyl, $C_{1-6}$ haloalkyl, $C_{3-6}$ cycloalkyl, or a saturated monocyclic 4-to 6-membered heterocyclyl;

each Rn is independently H, $C_{1-6}$ alkyl, $C_{1-6}$ haloalkyl, $C_{3-6}$ cycloalkyl, or a saturated monocyclic 4-to 6-membered heterocyclyl; or any $R_{11}$ and $R_{12}$, together with the nitrogen atom to which they are attached, independently forms a saturated monocyclic 4- to 6-membered heterocyclyl, wherein the saturated monocyclic 4- to 6-membered heterocyclyl is optionally substituted with one, two, or three independently selected $C_{1-3}$ alkyl substituents; and

* indicates an (R)-configuration or (S)-configuration;

wherein the process comprises:
reductively aminating a compound of Formula 1b:

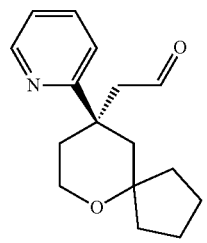

1b with a compound of Formula (II-1):

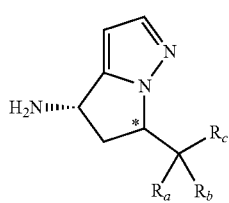

(II-1)

wherein:
$R_1$ is H, halogen, $C_{1-6}$ alkyl, $C_{1-6}$ haloalkyl, or $OC_{1-6}$ haloalkyl;

$R_2$ is H, halogen, $C_{1-6}$ alkyl, $C_{1-6}$ haloalkyl, or $OC_{1-6}$ haloalkyl; or $R_1$ and $R_2$, together with the carbon atom to which they are attached, form a saturated monocyclic 3- to 6-membered ring, wherein the saturated monocyclic 3- to 6-membered ring is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{a1}R_{b1}$, $NR_{11}R_{12}$, $NHC(O)C_{1-3}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, OH, and $OC_{1-3}$ alkyl;

$R_3$ is H, halogen, $C_{1-6}$ alkyl, $C_{1-6}$ haloalkyl, $C_{2-6}$ alkenyl, $C_{2-6}$ alkynyl, $C(O)C_{1-6}$ alkyl, $C(O)NR_{11}R_{12}$, $NR_{11}R_{12}$, $NHC(O)C_{1-6}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, $OC_{1-6}$ alkyl, $OC_{1-6}$ haloalkyl, $S(O)_2C_{1-3}$ alkyl, $S(O)_2NR_{11}R_{12}$, a saturated monocyclic 4- to 6-membered heterocyclyl, $C_{6-10}$ aryl, or a 5- or 6-membered heteroaryl, wherein the saturated monocyclic 4- to 6-membered heterocyclyl, $C_{6-10}$ aryl, or 5- or 6-membered heteroaryl is optionally substituted with one, two, or three substituents independently selected from the group consisting of halogen, CN, $C_{1-3}$ alkyl, $CH_2CN$, $CH_2OH$, $C(O)C_{1-3}$ alkyl, $C(O)NR_{11}R_{12}$, $NR_{11}R_{12}$, $NHC(O)C_{1-3}$ alkyl, $NHC(O)NR_{11}R_{12}$, $NHS(O)_2C_{1-3}$ alkyl, $NHS(O)_2NR_{11}R_{12}$, $NHS(O)_2C_{3-6}$ cycloalkyl, OH, and $OC_{1-3}$ alkyl;

each $R_1$ is independently H, $C_{1-6}$ alkyl, $C_{1-6}$ haloalkyl, $C_{3-6}$ cycloalkyl, or a saturated monocyclic 4- to 6-membered heterocyclyl;

each $R_2$ is independently H, $C_{1-6}$ alkyl, $C_{1-6}$ haloalkyl, $C_{3-6}$ cycloalkyl, or a saturated monocyclic 4- to 6-membered heterocyclyl; or any $R_1$ and $R_2$, together with the nitrogen atom to which they are attached, independently forms a saturated monocyclic 4- to 6-membered heterocyclyl, wherein the saturated monocyclic 4-to 6-membered heterocyclyl is optionally substituted with one, two, or three independently selected $C_{1-3}$ alkyl substituents; and

* indicates an (R)-configuration or (S)-configuration;

in the presence of:
(a) a reducing agent selected from the group consisting of tetrabutylammonium borohydride, sodium malonyloxyborohydride, sodium triacetoxyborohydride, sodium cyanoborohydride, sodium borohydride, lithium borohydride, potassium borohydride, and borane; and (b) an inert solvent selected from the group consisting of a $C_{1-4}$ alkyl alcohol, toluene, xylene, methyl tert-butyl ether, tetrahydrofuran, 1,4-dioxane, diethyl ether, dichloromethane, chloroform, 1,2-dichloroethane, ethyl acetate, acetonitrile, dimethyl sulfoxide, and N,N-dimethylformamide, or a combination thereof;

to obtain the compound of Formula (II) above.

* * * * *